US008448067B2

(12) United States Patent
Cerny et al.

(10) Patent No.: US 8,448,067 B2
(45) Date of Patent: May 21, 2013

(54) GRAPHICS COMMAND MANAGEMENT TOOL AND METHODS FOR ANALYZING PERFORMANCE FOR COMMAND CHANGES BEFORE APPLICATION MODIFICATION

(75) Inventors: Mark E. Cerny, Foster City, CA (US); Boris Batkin, Foster City, CA (US); Jonathan J. Olick, Foster City, CA (US)

(73) Assignee: Sony Computer Entertainment America, LLC, Foster City, CA (US)

( * ) Notice: Subject to any disclaimer, the term of this patent is extended or adjusted under 35 U.S.C. 154(b) by 1342 days.

(21) Appl. No.: 11/713,347

(22) Filed: Mar. 2, 2007

(65) Prior Publication Data
US 2008/0141131 A1 Jun. 12, 2008

Related U.S. Application Data

(60) Provisional application No. 60/869,018, filed on Dec. 7, 2006.

(51) Int. Cl.
*G06F 3/00* (2006.01)

(52) U.S. Cl.
USPC .......................................... 715/719; 715/723

(58) Field of Classification Search
USPC ................................. 715/719, 723
See application file for complete search history.

(56) References Cited

U.S. PATENT DOCUMENTS

| | | | |
|---|---|---|---|
| 6,917,373 B2 | 7/2005 | Vong et al. | |
| 7,088,374 B2 | 8/2006 | David et al. | |
| 7,227,511 B2 | 6/2007 | Adan et al. | |
| 2002/0067338 A1 | 6/2002 | Adan et al. | |
| 2002/0085045 A1 | 7/2002 | Vong et al. | |
| 2004/0189669 A1 | 9/2004 | David et al. | |
| 2004/0216059 A1 | 10/2004 | Vong et al. | |
| 2007/0035543 A1 | 2/2007 | David et al. | |
| 2007/0150810 A1 | 6/2007 | Katz et al. | |

FOREIGN PATENT DOCUMENTS

WO WO 2005/001658 1/2005

OTHER PUBLICATIONS

Nfactor, "*The Cell in the Playstation 3, Explained (with pictures) Part 1*", TV.com, p. 1-8, Feb. 15, 2005, http://www.tv.com/users/Nfactor/profile.php?action+show_blog&entry+m-100-19285021.
Eichenberger et al., "*Optimizing Compiler for a Cell Processor*", copyright 2005 IEEE, IBM T.J. Watson Research Center, Yorktown Heights, NY, IBM Toronto Lab, Ontario, Canada, and College of Computing, Georgia Tech, USA.

*Primary Examiner* — Namitha Pillai
(74) *Attorney, Agent, or Firm* — Martine Penilla Group, LLP

(57) ABSTRACT

Methods, systems, graphical computer interfaces, and computer readable media are disclosed to enable optimizing video frame rendering characteristics for an application. The method includes rendering a video frame and capturing push buffer settings representing the rendering of the video frame. The method also includes modifying an aspect of the push buffer settings while bypassing the application, and re-rendering the frame with the modified aspect. The method further enables comparing the rendering with the re-rendering, and presenting comparison results. Graphical user interfaces are provided to enable the functionality, without having to modify code of the application to appreciate what potential changes to the application can present in terms of performance rendering and processing efficiencies.

17 Claims, 66 Drawing Sheets

RAWVIEW

| Address | Command | Data | Comment |
|---|---|---|---|
| 01103000 | 00200200 | | |
| | | 05000000 | Render target left-width |
| | | | Left = 0 |
| | | | Width = 1280 |
| | | 02d00000 | Render target top-height |
| | | | Top = 0 |
| | | | Height = 720 |
| | | 00005148 | Render target format |
| | | | Color-buffer-format = RGB, ( R:8 G:0 B:0 ) |
| | | | Depth-buffer-format = D24S8 |
| | | | Multi-sample = 4X_ROTATED |
| | | | Is-swizzled = false |
| | | 00002800 | Color buffer pitch 0 |
| | | | pitch = 0x00002800 |
| | | 00790000 | Color buffer base address 0 |
| | | | Offset = 0x00790000 |
| | | 01690000 | Depth buffer base address |
| | | | Offset = 0x01690000 |
| | | 00790000 | Color buffer base address 1 |

| Address | Data | Error description |
|---|---|---|
| 00000017 | | Warning W3-0009: sequence failed, 'SetVertexProgram' is obsolete; use 'LoadVertexProgram'... |
| 80042310 | 00000000 | Error E-005d: render target crosses the boundary |
| 80042310 | 00000000 | Error E-005d: render target crosses the boundary |
| 80042310 | 00000000 | Error E-005d: render target crosses the boundary |
| 80042310 | 00000000 | Error E-005d: render target crosses the boundary |
| 80042a0c | | Warning W4-0001: fragment program reports different temporary register counter, 21=48 |
| 80042a60 | 00000000 | Error E-0042: render target has floating point format which is not permitted with alpha blending |
| 00000968 | | Warning W3-0009: sequence failed, 'SetVertexProgram' is obsolete; use 'LoadVertexProgram'... |
| 00000c0c | | Warning W3-0009: sequence failed, 'SetVertexProgram' is obsolete; use 'LoadVertexProgram'... |
| 000011e4 | | Warning W3-0009: sequence failed, 'SetVertexProgram' is obsolete; use 'LoadVertexProgram'... |
| 00001778 | | Warning W3-0009: sequence failed, 'SetVertexProgram' is obsolete; use 'LoadVertexProgram'... |
| 00001bc2 | | Warning W3-0009: sequence failed, 'SetVertexProgram' is obsolete; use 'LoadVertexProgram'... |
| 000025e5 | | Warning W3-0009: sequence failed, 'SetVertexProgram' is obsolete; use 'LoadVertexProgram'... |

PUSH BUFFER OVERVIEW

| Category | Size | Size minus redundancy | % of total size |
|---|---|---|---|
| Texture | 2872 | 520 | 0 |
| Render target | 512 | 204 | 1 |
| Vertex array | 2304 | 1360 | 3 |
| Vertex program | 17752 | 14068 | 24 |
| Vertex program constant | 41408 | 29932 | 55 |
| Fragment program | 288 | 64 | 0 |
| Fragment program constant | 7224 | 2392 | 10 |
| Draw | 2344 | 2208 | 3 |
| State change | 712 | 360 | 1 |
| System commands | 24 | 24 | 0 |
| Total | 75240 | 53192 | |

FIG. 11

DETAILED REDUNDANCY

| Category | Total switches | Redundant switches | % redundant | Size |
|---|---|---|---|---|
| Color buffer base address 3 | 5 | 1 | 20 | 20 |
| Render target origin | 5 | 4 | 80 | 40 |
| Alpha test enable | 274 | 273 | 99 | 2192 |
| Blend enable | 6 | 1 | 16 | 48 |
| Blend source factor | 2 | 1 | 50 | 16 |
| Blend destination factor | 2 | 1 | 50 | 8 |
| Color write mask | 3 | 1 | 33 | 24 |
| Stencil test enable unit 0 | 1 | 0 | 0 | 0 |

FIG. 12

MISC STATE

Misc State

Viewport left=0, top=0, width=16, height=11, depth min=0 max=1
Viewport translate=(8,5.5,0.5,0), scale=(8,5.5,0.5,0)
Scissor left=0, top=0, width=16, height=11
Window clip disabled Multiple render targets disabled
Color write            enabled (ARGB)
Alpha blend            disabled
Depth write disabled
Polygon mode=FILL Cull disabled
Depth test disabled
Alpha test disabled
Stencil disabled Alpha blend disabled
Fog disabled

Vertex Program Constants View

- Vertex constants used by the current Draw Context
- Internal analysis colour codes constants
  - *Blue* - newly modified
  - *Green* - inherited from previous
  - *Red* – redundant

*Potential need to optimise!*

| GPU Registers | | |
|---|---|---|
| Register annotation: Descriptive | | |
| Color Buffer 1 Context | | Value |
| Context | | feed0000 |
| Color Buffer 0 Context | | VIDEO MEMORY feed0000 |
| Context | | VIDEO MEMORY feed0000 |
| Depth Buffer Context | | VIDEO MEMORY feed0000 |
| Context | | VIDEO MEMORY feed0000 |
| Color Buffer 2 Context | | VIDEO MEMORY feed0000 |
| Context | | VIDEO MEMORY feed0000 |
| Color Buffer 3 Context | | VIDEO MEMORY feed0000 |
| Context | | VIDEO MEMORY 05000000 |
| Render target left-width | | 0 |
| Left | | |
| Width | | 1280 |

330

| Index | Post-transform vertex cache misses | Effective fill-rate, pixels per clock | Effective fill-rate, mega-pixels per second |
|---|---|---|---|
| 0 | 0 | 709.742 | 7302.23 |
| 1 | 281 | 0.006 | 2.09 |
| 2 | 879 | 0.257 | 127.21 |
| 3 | 860 | 0.151 | 75.73 |
| 4 | 602 | 0.108 | 44.3 |
| 5 | 446 | 0.033 | 12.81 |
| 6 | 1266 | 0.009 | 4.81 |
| 7 | 1209 | 0.063 | 31.95 |
| 8 | 286 | 0 | 0.04 |
| 9 | 744 | 0.011 | 5.55 |
| 10 | 751 | 0.037 | 18.58 |

| Condition | Comment | Gain % |
|---|---|---|
| Trimming all draw contexts | Number draw contexts trimmed: 4<br>Number primitives trimmed: 324 | +33.32 |
| TOTAL | | +33.32 |

FIG. 26A

| Context | Step 0, % gain of original | Step 1, % gain of original |
|---|---|---|
| Total | 3064353 | +105 |
| 0 | 465379 | +0.02 |
| 1 | 30875 | +0.02 |
| 2 | 305523 | -0.07 |
| 3 | 24624 | +0.03 |
| 4 | 33986 | +0.13 |
| 5 | 35460 | +0.09 |
| 6 | 42001 | +0.02 |

FIG. 26C

OBJECT SORT

- Change all streams interleaving
- Trim Triangles
- Trim Draw Contexts
- Depth-only pass
- Disable unused vertex attributes
- Disable unused interpolators
- Sort Draw contexts from to back where possible
- Replace FP with one that outputs single color
- Add Alpha Test (GREATER, Ref Value = 0) when standard alpha blend
- Perfect depth-cull optimization control settings
- Pack vertex program into available load slots
- Convert non indexed drawing to indexed drawing

FIG. 26D

Z ONLY PASS

- Convert all triangle lists to triangle strips
- Convert all strips to lists
- Change all streams interleaving
- Trim Triangles
- Trim Draw Contexts
- Depth-only pass
- Disable unused vertex attributes
- Disable unused interpolators
- Sort Draw contexts front to back, where possible
- Replace FP with one that outputs single color
- Add Alpha Test (GREATER, Ref Value = 0) when standard alpha b

FIG. 26E

TRIANGLE TRIM

- For each draw context
  - Optimize all triangle lists
  - Convert all triangle lists to triangle strips
  - Convert all strips to lists
  - Change all streams interleaving
  - Trim Triangles
  - Trim Draw Contexts
  - Depth-only pass
  - Disable unused vertex attributes
  - Disable unused interpolators
  - Sort Draw contexts front to back, where possible

FIG. 26F

FP CONSTANT SET

- Set texture filter to BILINEAR
- Set texture filter to POINT
- Set mipmap LOD bias
- For each vertex program
  - Vertex program redundancy
  - Get rid of vertex program static branches
- For each fragment program
  - Switch memory context
  - Fragment program redundancy
  - Set temp register count
  - PPU fragment program constant patching
- For each index array
  - Replace tri-strip degenerates with primitive restarts

FIG. 26I

CHANGE TRIANGLE FORMAT

- For each draw context
  - Optimize all triangle lists
  - Convert all triangle lists to triangle strips
  - Convert all strips to lists
  - Change all streams interleaving
  - Trim Triangles
  - Trim Draw Contexts
  - Depth-only pass
  - Disable unused vertex attributes
  - Disable unused interpolators
  - Sort Draw context front to back, where possible
  - Replace FP with one that outputs single color

FIG. 26M

OPTIMIZE TRIANGLES

- For each draw context
  - Optimize all triangle lists
  - Convert all triangle lists to triangle strips
  - Convert all strips to lists
  - Change all streams interleaving
  - Trim Triangles
  - Trim Draw Contexts
  - Depth-only pass
  - Disable unused vertex attributes
  - Disable unused interpolators
  - Sort Draw context front to back, where possible
  - Replace FP with one that outputs single color

GRAPHICS COMMAND MANAGEMENT TOOL AND METHODS FOR ANALYZING PERFORMANCE FOR COMMAND CHANGES BEFORE APPLICATION MODIFICATION

CROSS REFERENCE TO RELATED APPLICATIONS

This Application is related to U.S. patent application Ser. No. 11/681,629, entitled "HEADS:UP-DISPLAY SOFTWARE DEVELOPMENT TOOL", filed on the same day as this application, issued as U.S. Pat. No. 7,950,003, which claims priority to U.S. Provisional Patent Application No. 60/869,018, filed Dec. 7, 2006 and both identified applications are hereby incorporated by reference.

BACKGROUND OF THE INVENTION

Currently developers must optimize and debug a gaming application through a pains-taking process. The developers must modify application code and then rerun this application code, which can add a significant amount of time to the game development process. Furthermore, the process currently does not enable the developer to focus in on a particular rendering aspect of the application in order to investigate optimizations.

Thus, the developer is relegated to a trial and error debugging process and optimization process.

In view of these problems, developers need the ability to quickly and effectively optimize use of a graphics processor through intelligent optimization algorithms and analytical techniques. In addition, the developer requires the information necessary to efficiently locate and solve graphical related bugs or performance inefficiencies.

SUMMARY

Broadly speaking, the present invention fills these needs by providing a method and apparatus that enables a developer to efficiently optimize rendering aspects of an application. It should be appreciated that the present invention can be implemented in numerous ways, including as a method, a system, computer readable medium or a device. Several inventive embodiments of the present invention are described below.

In one embodiment, a system for conducting performance analysis on a frame of a multi-frame video sequence generated during execution of an application is provided. The system includes a hardware engine configured to execute the application, and a library capture module that is configured to obtain push buffer data from the hardware engine, where the push buffer data is for rendering the frame of the multi-frame video sequence. The system further includes a graphical user interface for presenting an interactive display of contents of the push buffer data. The contents define a plurality of commands and data associated with each of the plurality of commands. The graphical user interface enables access to make changes to the contents of the push buffer. The system also includes a replay module enabling re-execution of the push buffer data with any changes made through the graphical user interface. The graphical user interface provides a plurality of performance analysis measurements that quantify differences in execution of the push buffer when changes to the push buffer are made.

In one aspect of this embodiment, the graphical user interface provides access to make changes to the push buffer data without performing changes to the application. In a further aspect, the graphical user interface provides a plurality of menus and windows for representing the plurality of performance analysis measurements, and for selecting certain ones of the plurality of menus and windows to enable changes to the contents of the push buffer data, and then quantitatively view the results and visually display performances aspects.

In another embodiment a method for optimizing video frame rendering characteristics for an application is provided. The method includes rendering a video frame and capturing push buffer settings representing the rendering of the video frame. The method also includes modifying an aspect of the push buffer settings while bypassing the application, and re-rendering the frame with the modified aspect. The method further enables comparing the rendering with the re-rendering, and presenting comparison results.

In yet another embodiment a graphical user interface (GUI) for optimizing video frame rendering is provided. The GUI includes a display region illustrating contents of a push buffer and a performance display region illustrating graphical results for rendering the video frame according to the contents of the push buffer. The GUI also includes a push buffer content modification region.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIG. 9 is a simplified schematic diagram illustrating the raw view window 302 and its contents in accordance with one embodiment of the invention.

FIG. 10 illustrates a problems window summarizing all warnings and errors in accordance with one embodiment of the invention.

FIG. 11 illustrates a push buffer overview screen in accordance with one embodiment of the invention.

FIG. 12 illustrates a detailed redundancy window that includes a list of all state commands and the percentage of redundancy for each state command in accordance with one embodiment of the invention.

FIGS. 13A-B are simplified schematic diagrams having further information related to the render state window of FIG. 6.

FIG. 15 illustrates a memory dump window providing a memory view of a texture in accordance with one embodiment of the invention.

FIG. 17 illustrates index arrays used by the push buffer in accordance with one embodiment of the invention.

FIG. 19A illustrates a vertex program window that lists out all the programs used in the push buffer and provides an interpreted dump in accordance with one embodiment of the invention.

FIG. 19B illustrates a vertex program constants window in accordance with one embodiment of the invention.

FIG. 20A and FIG. 20B illustrate GPU register windows that provide a detailed view of the state of the registers in the GPU in accordance with one embodiment of the invention.

FIGS. 24A and 24B illustrate graphical user interfaces directed toward the performance counters available for analysis in accordance with one embodiment of the invention.

FIGS. 25A through 25D illustrate a culling process for optimizing the rendering of a frame in accordance with one embodiment of the invention.

Figure 27C:
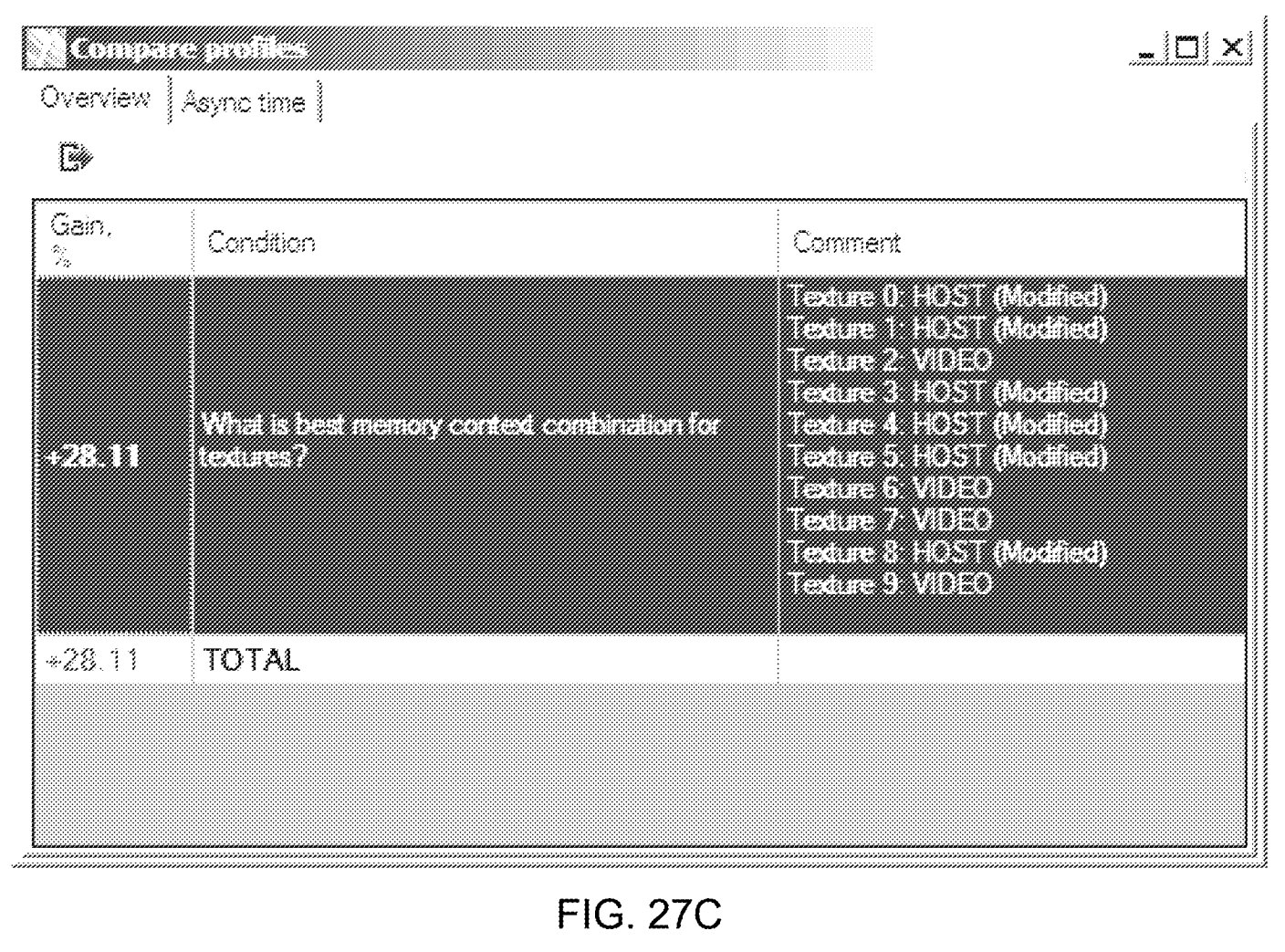
Figure 27E:
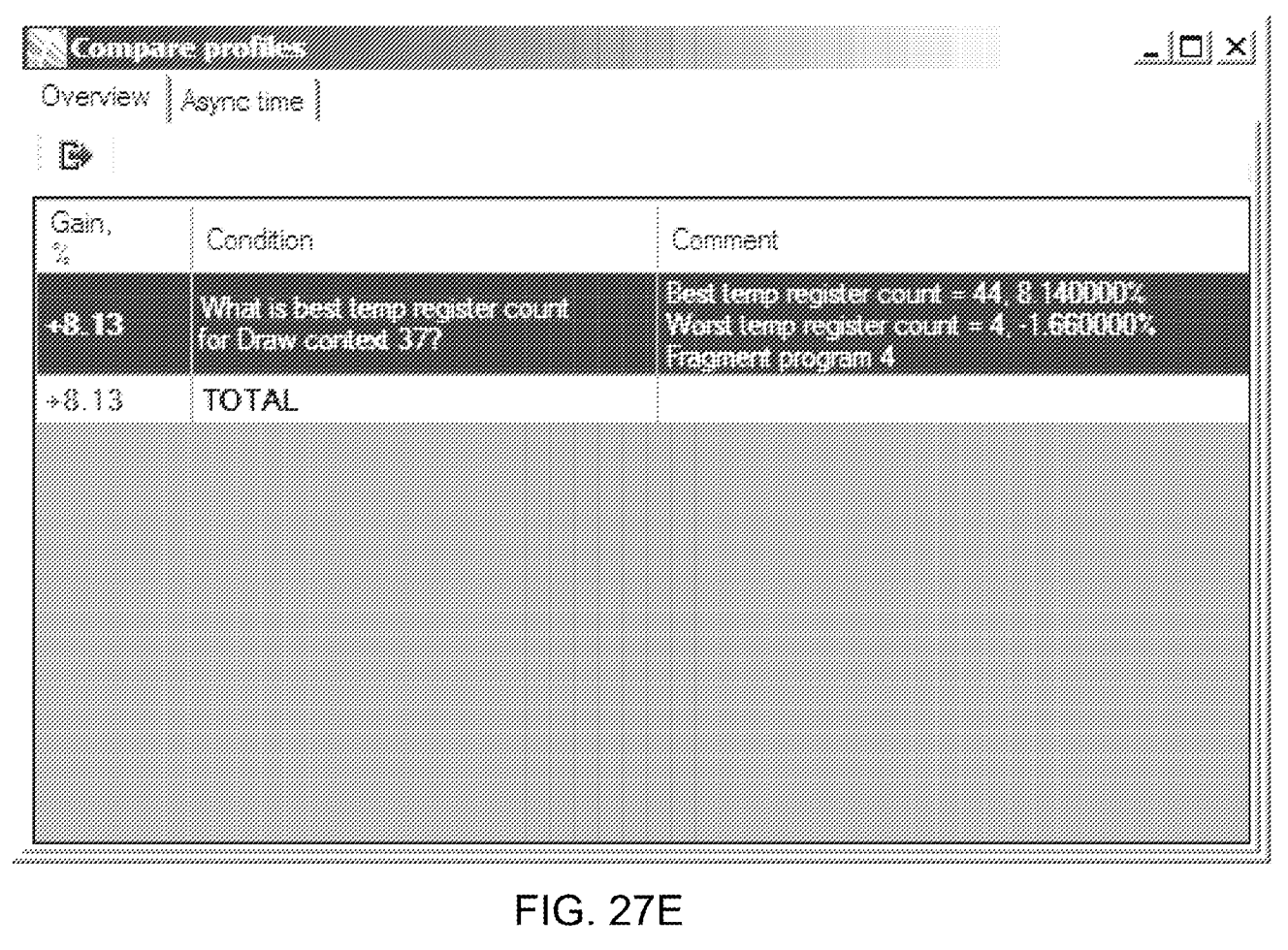

FIGS. 27A-E illustrate performance optimizations that may be referred to as experiments that may take one or more "what ifs" or performance optimizations to provide a recommendation for optimal settings for the game or application being rendered in accordance with one embodiment of the invention.

DETAILED DESCRIPTION

Figure 1:
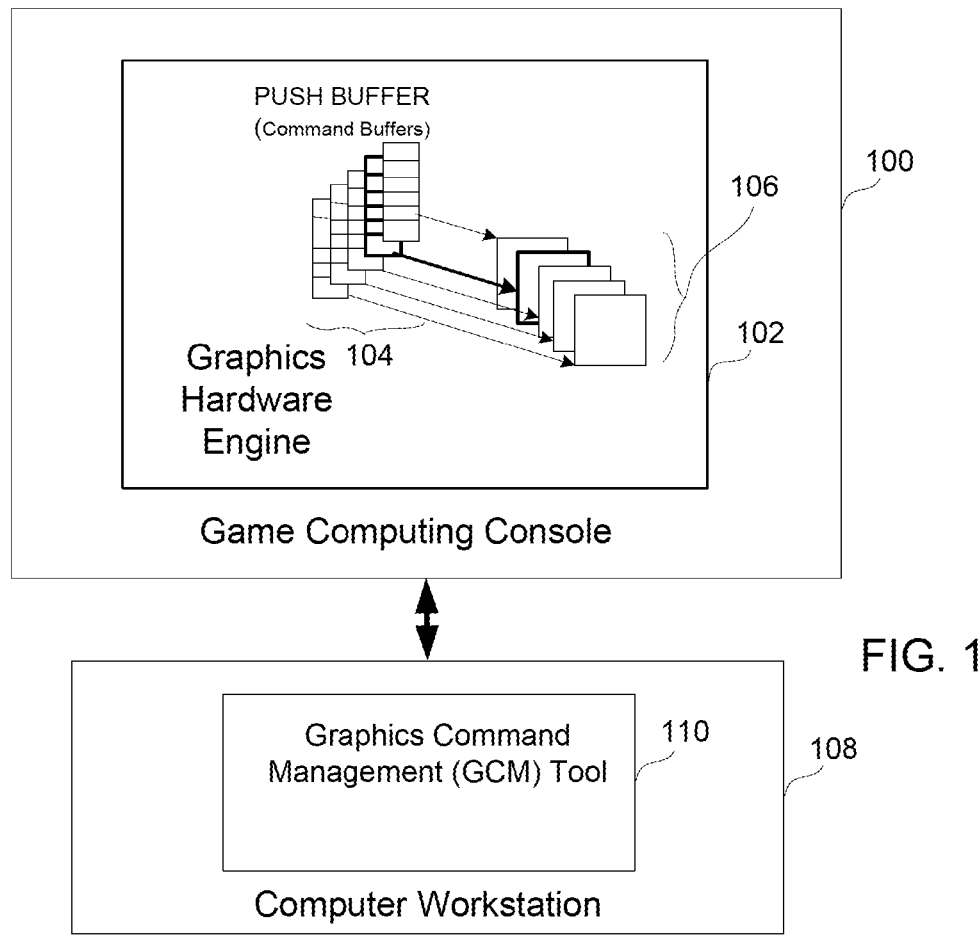
FIG. 1 illustrates a game computing console having a graphics hardware engine, defining a component of the various hardware and software elements of the game computing console in accordance with one embodiment of the invention.

An invention is disclosed for a graphics command management (GCM) tool that enables access to push buffer data generated by graphics hardware for the rendering of a frame. The GCM tool can be defined as a system, a method, and embodied on computer readable media. Broadly stated, the GCM tool includes functionality to enable push buffer data to be captured for a specific frame or frames, modified in some way, and then resubmitted to the graphics hardware for re-rendering, to determine what the performance impacts are, without having to modify the code of the application that caused the generation of the push buffer data.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

For clarity, the term "push buffer" shall define a buffer structure commonly used in computer architectures and may also be referred to as "command buffers." Also, the term "frame" shall refer to any given frame (or sets of frames) of a plurality of frames of a multi-frame dynamic video sequence, that is generated by the graphics hardware during the execution of an application. In one example, the plurality of frames are those generated during the execution of a video game application on hardware, such as that provided by video game consoles, or standard personal computers. The frame format can take any number of forms, whether they be high definition or not. In high definition frames, the definition of the frame content can be in any number of formats, for instance and without limitations HDTV formats of 1080i/p and other high definition video standards. The application, as discussed herein focuses on game-type applications, but it should be understood that these techniques are equally applicable to any application that renders data in response to push buffer data.

The GCM tool is able to capture all graphical resources used during one frame of an application. The tool can then execute performance analysis on the captured frame, modify the push buffer and other graphical resources to mimic what they would be if fundamental changes were made in the game application or game engine (e.g., middleware), and re-measure the performance. Broadly, the GCM tool can define how much performance would increase (or impact) if code changes were to be made to the game application or game engine, without actually making the laborious changes to the code of the game application or game engine. As an example, some changes to game applications and/or game engines can take days, weeks or months for an engineer to modify, and such changes are made with the hopes of testing whether performance increases could be obtained.

In accordance with the aspects of the present invention, the GCM tool enables the ability to make changes to push buffer data directly, without changing application or engine code, analyze if benefits in performance are obtained, and then define recommended code changes that can be engineered into the application and/or engine, knowing in advance the expected benefits, as predetermined and verified, before expending time and expensive resources to engineer the changes to the actual application.

The following application will be divided into two parts, namely a system overview in (I), and a functional screen description in (II).

I. System Overview of GCM Tool Structure

FIG. 1 illustrates a game computing console 100 having a graphics hardware engine 102, defining a component of the various hardware and software elements of the game computing console 100. The graphics hardware engine 102 is charged with processing push buffer 104 and rendering frames 106. For illustration purposes, a plurality of push buffers 104 are shown associate with the generated frames 106 that are rendered over time as different portions of an application (e.g., during interactive game play) are processed. Also shown is a computer workstation 108 being in communication with the game computing console 100.

Figure 3:
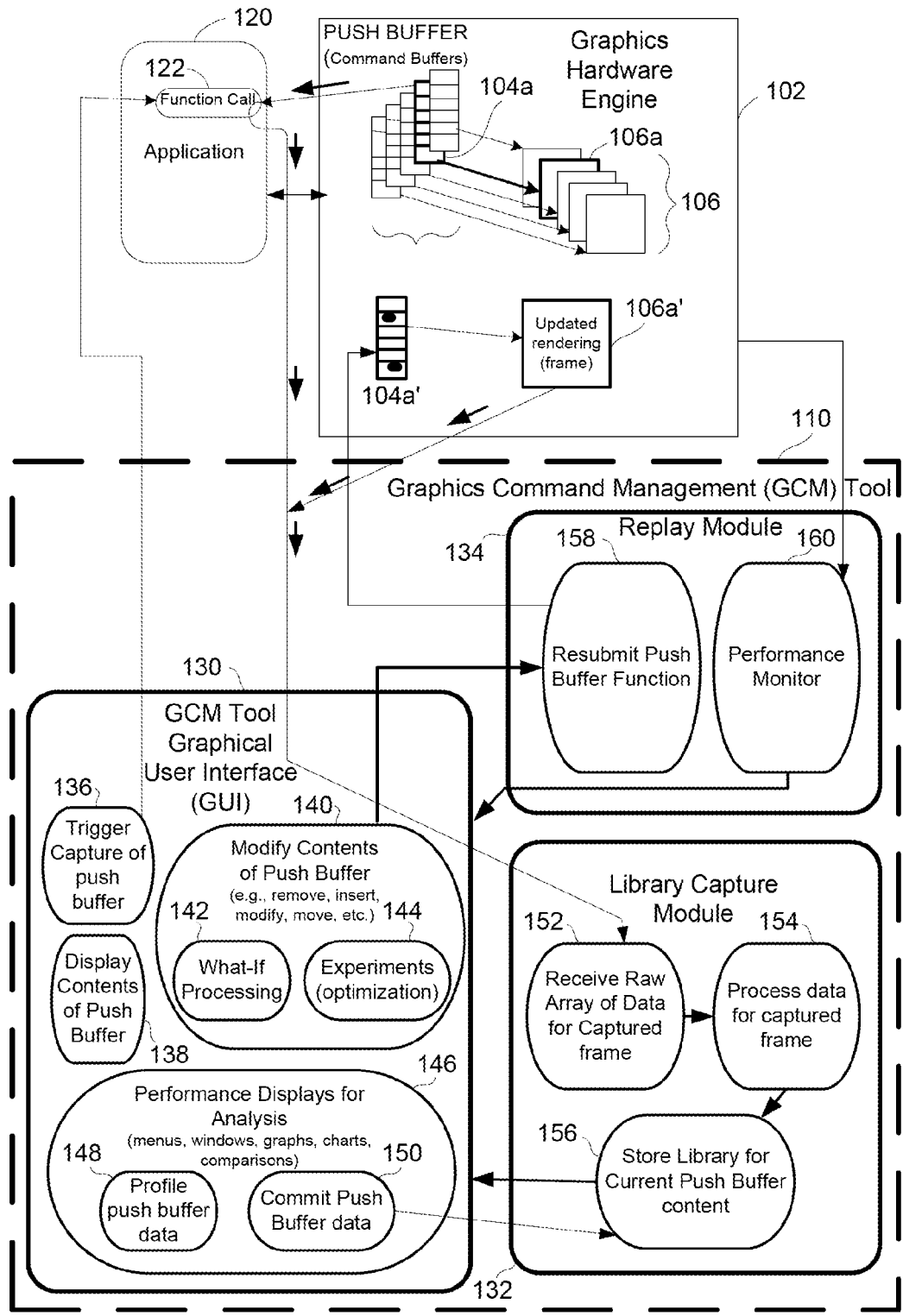
FIG. 3 illustrates a more detailed diagram of the graphics engine being interfaced with the CGM tool, in accordance with one embodiment of the present invention.

The computer workstation 108 (e.g., personal computer (PC)), in one embodiment of the present invention, has loaded thereon a graphics command management (GCM) tool 110 (e.g., utility program), that is designed to access specific push buffers 104 that are being processed by the graphics hardware engine 102 in order to render specific frames 106. As noted, three dimension (3D) rendering hardware is driven by push buffers (or command buffers), which are linear buffers containing a sequence of commands which control rendering state and specify the locations of resources, such as textures, vertex data, etc. The GCM tool 110 functions as a utility, defined by three main components (e.g., as shown in FIG. 3: a GUI 130, a library capture module 132, and a replay module 134). The GCM tool 110, upon capture of the specific push buffer 104a, is capable of performing modifications upon the push buffer data to then re-submit the modified push buffer data back to the graphics hardware engine 102, in order for re-rendering of the frame generated by the modified push buffer.

The GCM tool 110 is then able to monitor the performance impacts (increases or decreases) that result from the modified push buffer data that was re-submitted to the graphics hardware engine 102. This analysis of the performance characteristics of modified push buffer data can take place without actually modifying or requiring the application that created the push buffer data to be modified. More details regarding the GCM tool 110 will be described with reference to FIG. 3.

Figure 2:
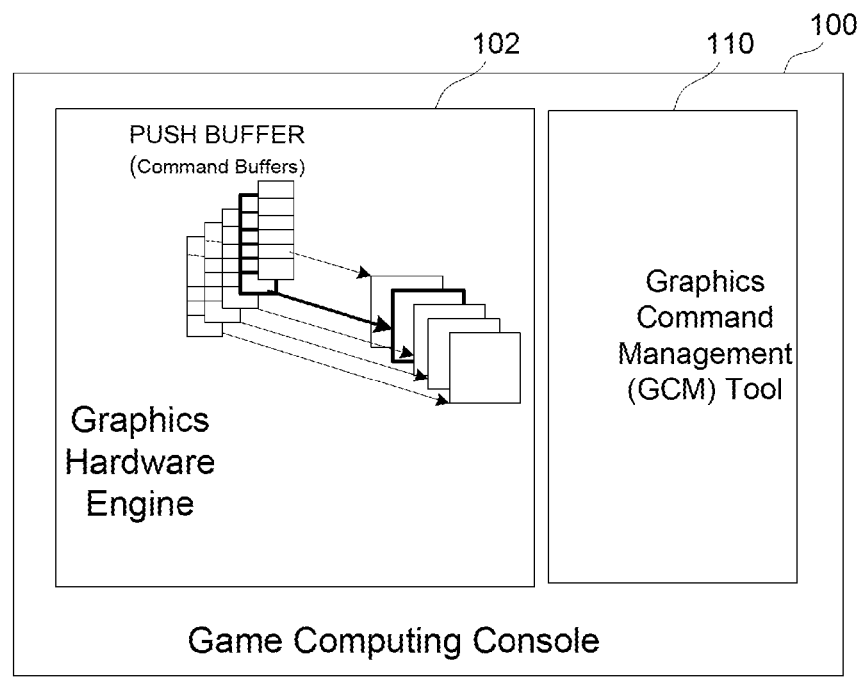
FIG. 2 illustrates an alternative embodiment where the game computing console is used to execute both the processing of the graphics hardware engine as well as the GCM tool in accordance with one embodiment of the invention.

FIG. 2 illustrates an alternative embodiment where the game computing console 110 is used to execute both the processing of the graphics hardware engine 102 as well as the GCM tool 110. In this embodiment, it is not necessary to have a separate computer workstation 108 in communication with the game computing console 110, to enable access to the push buffer data 104, in order to perform modifications, analysis, and verification of the changes performed to the push buffer data.

FIG. 3 illustrates a more detailed diagram of the graphics engine 102 being interfaced with the GCM tool 110, in accordance with one embodiment of the present invention. An application 120 is shown being interfaced with the graphics hardware engine 102 that is configured to process the code embodied in application 120. It should be understood that application 120 can include both the application code and any middleware or application engines that are sometimes referred to as game engines. Together, the code that embodies the application and the game engines can be referred to as the application 120.

The application 120 is integrated with function calls 122, that are designed to trigger the capture of push buffer data at a particular point in the execution of the application by the graphics hardware engine 102. In one embodiment, the function call 122 can be defined as a heartbeat function call that can intercept the command lists that are populated to the push buffers of the graphics hardware engine 102, and then forwarded to a library capture module 132 of the graphics command management (GCM) tool 110.

In one example, the function call 122 may open a communications port to communicate the captured command list in the form of a data array that is received by the library capture module 132, where the raw array of data for the captured frame is received in operation 152, then processed in operation 154, by the library capture module 132. The processed raw array of data is then stored in a library 156, to define the current push buffer content that was captured in response to the function call. The library (e.g., a type of database) will thus hold the contents of the push buffer while the graphics hardware engine 102 transfers and communicate performance statistics associated with the rendering of the frame 106a from push buffer 104a, to the GCM tool 110.

These performance characteristics will be sent to a performance monitor 160 of a replay module 134, associated with the GCM tool 110. The performance module 160 of the replay module 134 will thus communicate the performance information to the GCM tool graphical user interface (GUI) 130. To initiate the process from the beginning, a user is able to use the GCM GUI 130 to select a command (from a menu or GUI button) that will trigger the capture of the push buffer in 136, that then directs the function call to capture a specific push buffer or multiple push buffers so that a specific frame 106a can be analyzed for performance based on the contents of the push buffer.

In the GCM GUI 130, a display 138 will enable the display of contents of the push buffer in a tabular and graphical form so that a de-bugging engineer can quickly identify and understand the structure and content of the specific push buffer that was captured. The GUI 130 will also provide the capability to modify the contents of the push buffer 140 to enable removing, inserting, modifying, and moving of specific data within the captured push buffer structure. Specific types of processing that are possible by modifying the contents of the push buffer can include processing of "What-If" processing 142. What-If processing will be described in greater detail below.

Additional processing that can include Experiment running 144 so that optimization can be performed on specific contents (e.g., commands and data) of the push buffer that was captured. The GCM GUI 130 also includes a performance display that will enable analysis of the specific performance parameters that were provided by the performance monitor 160 to the GCM GUI 130.

The performance displays can include a number of menus, windows, graphs, charts, and comparison tools that will enable comparisons between the contents of the push buffer in its original state versus the contents of the push buffer after any modifications have been performed through 140 of the GCM GUI 130. Examples of these performance displays and interfaces can include functionality to perform profiles by changing specific contents of the push buffer and then comparing performance benefits achieved, or performance impacts suffered by specific changes to the push buffer data. Profiling 148 will therefore enable graphical and tabular results to be shown and analyzed so that recommendations for changes to the application will later be made.

If changes to the push buffer are desired to be kept for a new reference point, the performance displays can provide users with the ability to Commit push buffer data so that the current changes to the push buffer can be viewed as a reference point for additional changes that may be made to the push buffer contents. Commit button 150 will therefore be an option for the programmer and debugger using the performance displays of the graphical user interface 130. Also shown as part of the GCM tool 110 is a library capture module 132.

As noted above, a raw array of data for the captured frame is received in 152 and then is processed in 154 so that the data can be stored in a library 156. The library will hold the structure and data of the push buffer in a way that can be accessed and indexed by the GUI 130. The GUI 130 will therefore have knowledge of the structure of the library so that the menus, windows, graphs, charts and comparisons can quickly be generated by the GUI and displayed for user information, comparisons, and analysis.

If the user desires to make a change by modifying the contents of the push buffer using a GUI 130, the GUI 130 will communicate with the replay module 134 so that changes to the push buffer can be resubmitted to the graphics hardware engine 102 to define a new push buffer 104a' that will thus produce an updated rendering of the frame 106a'. During the re-rendering of the frame with the updated push buffer data, the graphics hardware engine 102 will also provide performance data associated with the rendering of that updated push buffer data back to the performance monitor 160. The performance monitor 160 will thus communicate that information to the GUI 130 so that the user can perform performance displays and analysis in 146 of the GUI 130.

Figure 4:
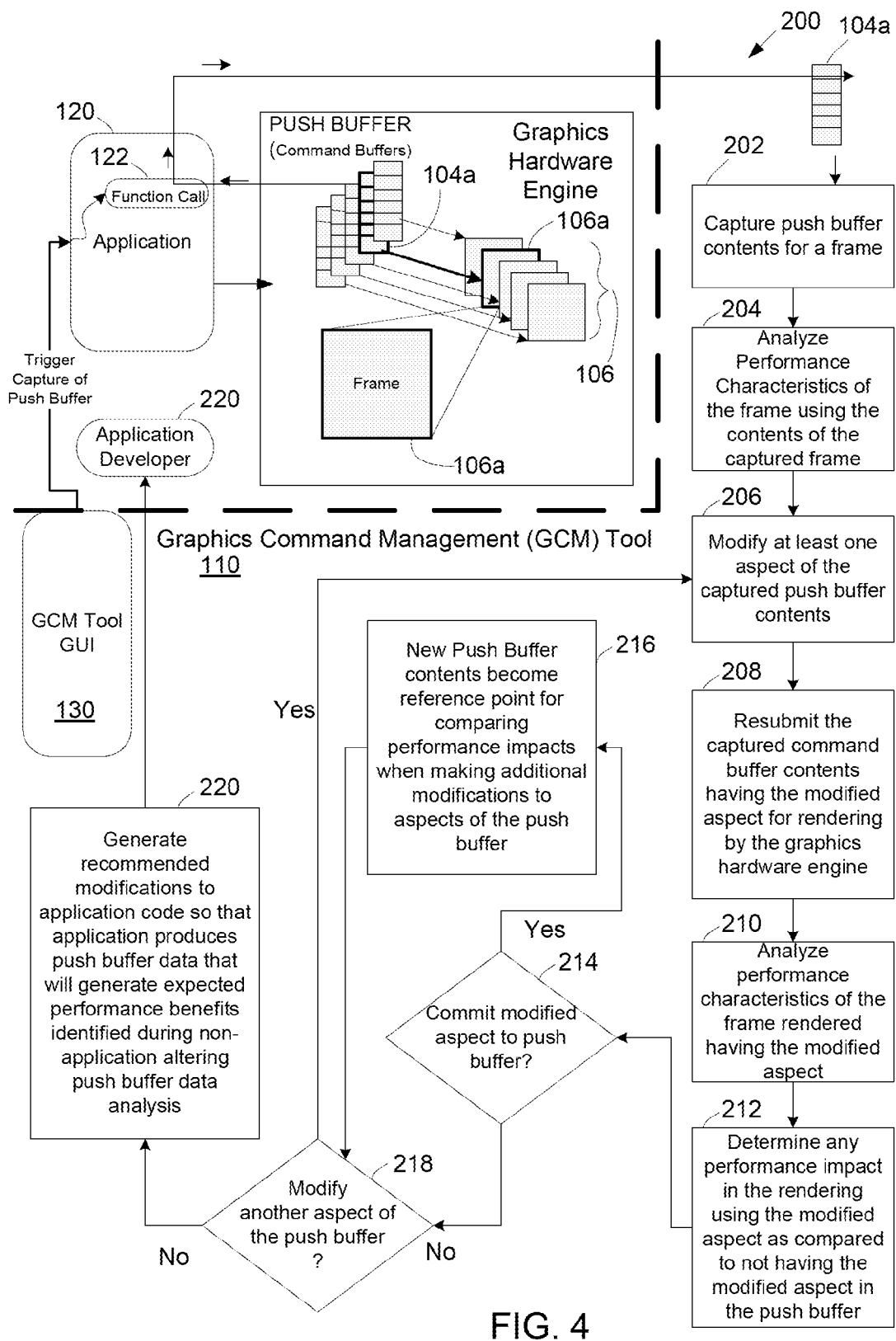
FIG. 4 illustrates a process flow diagram defining operations that may be performed using the GCM tool in accordance with one embodiment of the present invention.

FIG. 4 illustrates a process flow diagram 200 defining operations that may be performed using the GCM tool 110, in accordance with one embodiment of the present invention. As mentioned above, the graphics hardware engine 102 is designed to process push buffer data and render frames for an application 120. The application 120 will include a function call 122 that is simply added to the application code, and associated with each frame, so that access to each rendered frame's push buffers can be had, so that captures are possible for every frame being rendered by the graphics hardware engine 102.

In one embodiment, the GCM tool GUI 130 is designed to trigger the capture of the push buffer (and the resources used for a frame) at a particular point in time so as to select a particular push buffer that will then render a particular frame. The selection of a frame may be initiated by user selection, through the GUI 130. In this example, the particular push buffer is push buffer 104a, and the rendered frame is frame 106a. The function call that is embedded in the application will thus cause the contents of the push buffer 104a to be captured for frame 106a, and sent as a copy to the graphics command management tool 110. This transfer is shown by the arrow that transmits the copy of the push buffer contents 104a to the graphics command management tool 110.

In operation 202, the contents of the push buffer are captured. Once captured, the process moves to operation 204 where performance characteristics of the captured push buffer data are analyzed and based on the analysis, at least one aspect of the captured push buffer may be modified in operation 206. Of course, more than one modification to various aspects can occur, but for example, it will be assumed that only one aspect is changed, and then the push buffer data is resubmitted, having the modified aspect to the graphics hardware engine 102 for re-rendering in operation 208.

In operation 210, performance characteristics are analyzed for the frame that was re-rendered having the modified aspect in the push buffer. The method then moves to operation 212 where determinations are made if there are performance impacts (benefits or detriments) in the rendering of the frame, using the modified aspect as compared to not having the modified aspect in the push buffer, are desired. As noted above, these performance characteristics can be analyzed using a number of performance displays for the analysis in 146 of the GUI 130, as described with reference to FIG. 3.

In operation 214, it is determined if the modified aspect to the push buffer should be committed so that the push buffer that is used as a reference is the push buffer having the committed change. If yes, the method moves to operation 216 where the new push buffer contents become the reference point for comparing performance impacts in making additional modifications to aspects of the push buffer. If no modified aspect should be committed, the operation moves to operation 218 where it is determined if there is a desire to modify another aspect of the push buffer.

If there is, the method moves back to operation 206 where the process can continue until the analysis is complete. If there is no further aspect to be modified and all else is complete to the satisfaction of the tester, the method can then move to operation 220 where recommended modifications can be generated so that the changes may be made to the application code that produces the push buffer data and will then generate the expected performance benefits identified during non-application altering push buffer data analysis. This information can then be forwarded to the application developer 240 for later integration into the application code 120.

In regard to the embodiments described herein, the GCM tool 110 has access to the low level format of the push buffers. In its raw state, the format is received as a data array, for instance in U-32 format, and can then be formatted to enable viewing, changes, and then reformatting back into the raw state for resubmission to the graphics hardware engine 102. Thus, through the GCM tool 110 the ability is provided to rewrite push buffers with changes without the use of an external rendering API or driver layer. The push buffer can be modified in order to remove, insert, or modify commands, and other resources may be moved, removed, or modified, as well. After modification, the modified push buffer and resources are transmitted back to the graphics hardware, where performance measurements can be taken to evaluate the effect of the modifications. Furthermore, modifications and performance measurements can be iterated in an automated fashion in order to perform experiments or more complicated performance analysis.

Several unique advantages are presented by the functionality that is enabled by the GCM tool 110. Some example advantages include allowing the captured application push buffers to be manipulated independently of the original application, and thus the GCM tool 110 removes the tedium of iteratively modifying and building application code to profile the results and look for performance optimizations. Even simple application changes such as modifying a single render state often require significant iteration time to rebuild the application.

In addition to such simple substitutions, the GCM tool 110 can apply a number of non-realtime techniques in order to easily make performance measurements that would require a large investment of programming time or complicated data modifications to test within the application. First, automated iteration can be applied to test all possible states of a set of parameters in order to determine optimal performance settings for the captured push buffer, where manual iteration would be prohibitively time consuming. Second, the push buffer and resources can be processed using relatively slow brute force algorithms or using optimizations that are valid only for a single frame (for instance, due to point of view dependence).

This allows a developer to quickly determine the potential performance gain from application optimizations that would typically require significant investment of programming time or source data modifications, allowing them to make informed decisions about where their optimization efforts would best be focused.

Additionally, as the original application is not involved in these later performance experiments, captured data can be easily transferred and analyzed without access to the original source code or data, allowing support programmers to easily assist development teams with analyzing their applications.

In another embodiment, instead of requiring function call code to be integrated into an application, an aspect of this invention allows for the integration of capture triggering hardware logic that interfaces with (e.g., as separate hardware logic), or is integrated with the graphics hardware engine 102. The capture triggering hardware logic is capable of receiving instructions to cause the capture of push buffer data in the same or similar manner as would the function call 122 that is integrated in the application 120. By providing the capture triggering hardware logic, the GCM tool 110 only needs to interface with logic of the graphics hardware engine 102 (or hardware that interfaces with 102), to trigger the capture of push buffer data, which is routed to the library capture module 132. An advantage of utilizing the capture trigger hardware logic is that programmers need not add any code into their application, and thus, the interface with the GCM tool 110 is seamless and transport to programmers of applications 120. Although, in the embodiment that utilizes the integrated function call 122, the code for enabling the function call is quite minimal and can easily be inserted with little or no programming overhead.

The GCM tool 110 enables running of a large number of performance experiments or what-ifs, both of which may be referred to as optimizations, to be run on a captured push buffer with a minimum time investment. An example list of the experiments, without limitation, include those defined in Table A.

TABLE A

Redundant commands - By removing commands which have no useful effect from the push buffer, the GCM tool can determine whether code changes to reduce the number of redundant commands will increase performance. Similarly, some commands with non-optimal parameters or non-optimal combinations of render states may be detected and adjusted to test for resulting performance gains.
Render state optimizations - Many performance relevant render states may be modified to determine optimal settings for the captured push buffer for performance and the resulting visual impact. These include texture filtering, depth culling, and other similar states.
Resource locations - By moving resources between video and main memory, the GCM tool can determine whether adjusting these locations will improve performance.
Vertex array structure - Vertex data which is split into multiple streams may be interleaved to test the performance impact.
Unused vertex array data - Vertex arrays can be optimized to remove unused attributes.
Constant vertex array data - Vertex arrays can be scanned to detect constant attributes and optimized to remove them.
Unused vertex program output data - Vertex program outputs which are unused but not disabled may be disabled.
Mesh optimization - Mesh vertex and index data may be optimized for perfect post-transform cache performance, or may be converted from non-indexed to indexed formats, or may be optimized to use restart indices.
Triangle trimming - Offscreen, backfacing, degenerate, or zero-pixel triangles can individually be removed from the input vertex and index arrays in order to determine the performance implications of better application culling or better mesh construction.
Depth sorting - All non-alpha blending draw calls may be resorted for optimal depth culling to determine whether optimizations to the application's object sorting may improve performance.
Depth-only pass - The GCM tool may duplicate the common optimization technique of first rendering the depth buffer for the scene before rendering the color buffer separately in order to minimize fragment processing.
Fragment program register count optimization - The GCM tool can evaluate the performance for every possible register count for each fragment program in order to determine the optimal values.
Alternate texture compressed formats - Convert textures to alternate formats in order to determine whether texture compression will affect performance and visual appearance.
Texture memory grouping - All possible relevant memory groupings of textures based on draw calls may be tested to determine the optimal distribution of resources between video and main memory.
Vertex program grouping - Determine the optimal grouping of vertex programs into sets and analyze the performance benefit TABLE A-continued of converting vertex program set commands into execution slot changes.
Render target tiling and depth cull areas - Color and depth buffer tiling, compression, and depth cull area parameters may be optimized to determine the potential benefit of application optimizations.
Vertex program optimization - Vertex programs may be modified to allow vertex arrays to be optimally packed, or to replace a single program with static branching with optimized separate programs.

II. Functional Definition of Screens of GCM Tool

The embodiments described below provide further details on the tool or utility that a developer may employ during the game development process. The functions enabled through the GCM tool are further defined with reference to various screen shots that a developer can use to interface with the tool. The GCM tool includes a library that is linked into a game and an application. On the game side, once the developer has linked into the GCM tool library there are two calls, one to the GCM replay initialization and one to the GCM replay after every call to gcmSetFlip or a similar function. As the overhead associated with these two calls is close to zero, the calls can be left in at all times. As described above, whenever a developer wants to use the gcmReplay tool, the developer will start the application and select capture. By selecting capture in the application, the push buffer contents for a frame of image data being rendered is captured. The capturing refers to acquiring the contents in all resources used during the rendering being sent to the application. These resources may include textures, vertex arrays, index tables, and other resources required for the rendering of a frame of data. In one embodiment, a previous frame's buffer may be included. For example, the previous frame's buffer contents may be included with some kind of blurring effect applied. It should be noted that the data captured and all the resources used during the rendering of a graphics display can easily exceed 100 megabytes.

One skilled in the art will appreciate that depending on the game, the capture process can become complex. For example, as the graphics processing unit is rendering a frame, another processor may be modifying the push buffer and creating new resources, e.g., such as the CELL processor for the PLAYSTATION™ 3 game console. Thus, the embodiments described herein capture the push buffer by single stepping the graphics processing unit in order to capture the entire contents of the push buffer for rendering a frame of image data. Single stepping of the GPU and the capture of the changed information in the command buffer is performed in an unobtrusive manner, i.e., transparent to the application. Single stepping is accomplished by replacing an instruction in the push buffer with a jump to self instruction to stop GPU execution just before this instruction. By sequentially replacing the following instruction by a jump to self and then restoring the original instruction, the execution of the GPU can be stopped after every instruction, allowing the current state of all resources used by each instruction to be collected. Whether the contents of the push buffer are modified or written over during the frame rendering becomes irrelevant due to the single stepping of the graphics processing unit. It should be noted that the embodiments utilize the graphics processing unit as opposed to a simulation. In addition, the data captured provides for a more detailed analysis than the data from a real time GPU performance analysis. It should be appreciated that while the embodiments herein may refer to specific game consoles, this is meant to be exemplary as the embodiments can be applied to any game console used for rendering images.

Figure 5:
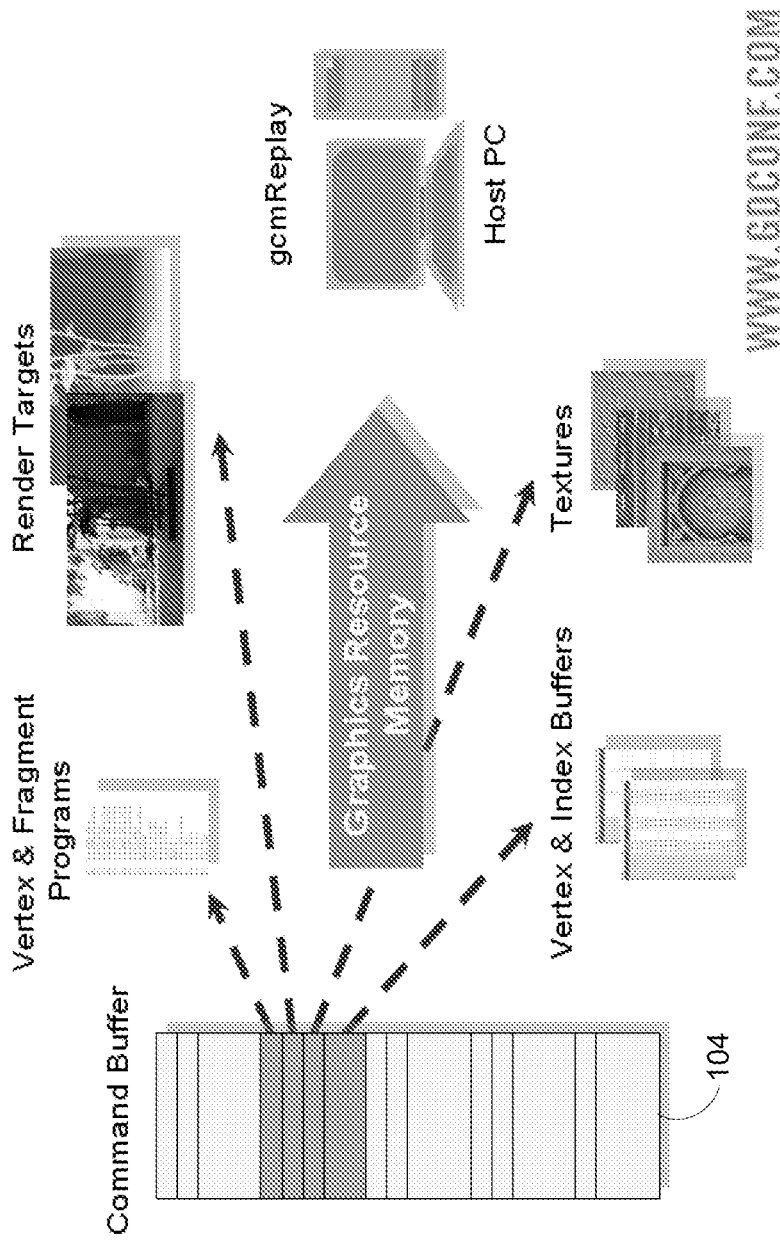
FIG. 5 is a simplified schematic diagram illustrating the various resources that may be captured through the push buffer in accordance with one embodiment of the invention.

FIG. 5 is a simplified schematic diagram illustrating the various resources that may be captured through the push buffer in accordance with one embodiment of the invention. Push buffer 104 includes data representing vertex and fragment programs, render targets, vertex and index buffers, textures, etc. Each of these resources are captured through the GCM tool so that a developer may later manipulate the data in order to optimize the development process. As mentioned above, the embodiments described herein can capture data even though the game rendering process may be very complex. In one embodiment, as the graphics processing unit is rendering a frame, another processor, such as the CELL processor, may be modifying the push buffer and creating new resources.

Typically, the CELL processor is creating vertex arrays or index tables just in time for the graphics processing unit. Thus, a vertex array that does not exist at the start of the frame and is created during an early part of the frame so that the GPU can use the array in a later part of the frame. In addition, the capture process must be able to capture data that may be overwritten during the course of the frame. For example, if data is written into a ring buffer, then over the course of the rendering of the frame, the data of the later characters overwrites the data of the earlier characters. In order to capture all of the data, the embodiments described herein single step the graphics processing unit in order to capture the appropriate data.

In one embodiment, the contents of the push buffer are compared to a previous step's contents and any new data is captured. Thus, in one aspect, the GCM tool focuses on capabilities that cannot be performed in real time. It should be appreciated that there are a number of different items that can be accomplished with the captured data. In one embodiment, a developer can view and analyze the data. The data could also be saved to a hard drive or other storage device and sent to another developer for examination. In another embodiment, the frame is replayed by the developer and profiled as described herein.

When the frame is replayed, the frame may be downloaded to the GCM tool and re-rendered while performing an analysis of the rendering. The push buffer and the captured resources may be modified in various ways so that the performance under the modifications can be analyzed. A single aspect of the push buffer may be modified through "what if" features described in further detail below. In addition, multiple aspects of the push buffer may be modified in an organized manner to provide an analysis of optimized operating conditions and sequences for the multiple aspects through "experiments" described in more detail below.

Figure 6:
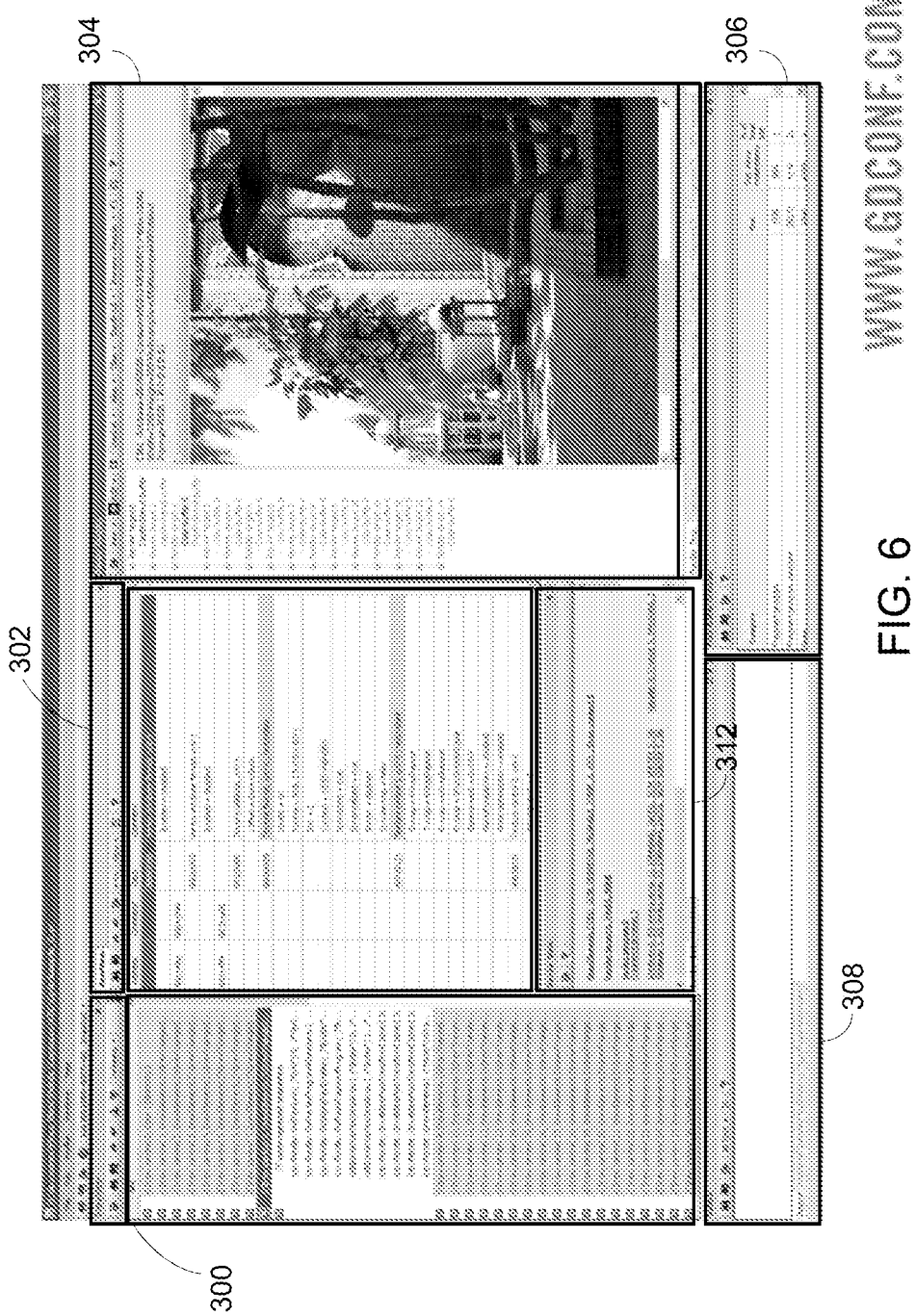
FIG. 6 is a simplified schematic diagram illustrating a graphical user interface (GUI) window providing the captured information from the GCM tool in accordance with one embodiment of the invention.

FIG. 6 is a simplified schematic diagram illustrating a graphical user interface (GUI) window providing the captured information from the GCM tool in accordance with one embodiment of the invention. The graphical user interface of FIG. 6 includes a draw/clear window 300 containing the rendering calls, a raw view window 302 showing the contents of the push buffer, render target window 304, output window 306, push buffer overview window 308, and render state window 312. The details of additional exemplary graphical user interfaces presented through the GCM tool are further described below with reference to FIGS. 7-25D.

As mentioned above, the capture of the data is achieved through a graphical user interface in which a user selects/triggers a capture button. Of course, every frame of the rendering process may be captured through the embodiments described herein. However, the capturing can be customized so that alternate frames or every $n^{th}$ frame may be captured, where n is an integer.

It should be appreciated that a call function inserted into the application at each frame rendering or any other designated frequency will trigger the capture of the push buffer contents by single stepping the GPU to enable generation of the graphical user interface of FIG. 6. It should be further appreciated that a developer may add optional annotations into the call function to further designate a certain aspect of the application that is being rendered in order to ease the debugging process. FIG. 6 is one exemplary configuration and may be modified as desired. For example, if a user desires to incorporate any of the GUIs illustrated in FIGS. 7-25D into FIG. 6, this may be done.

Figure 7:
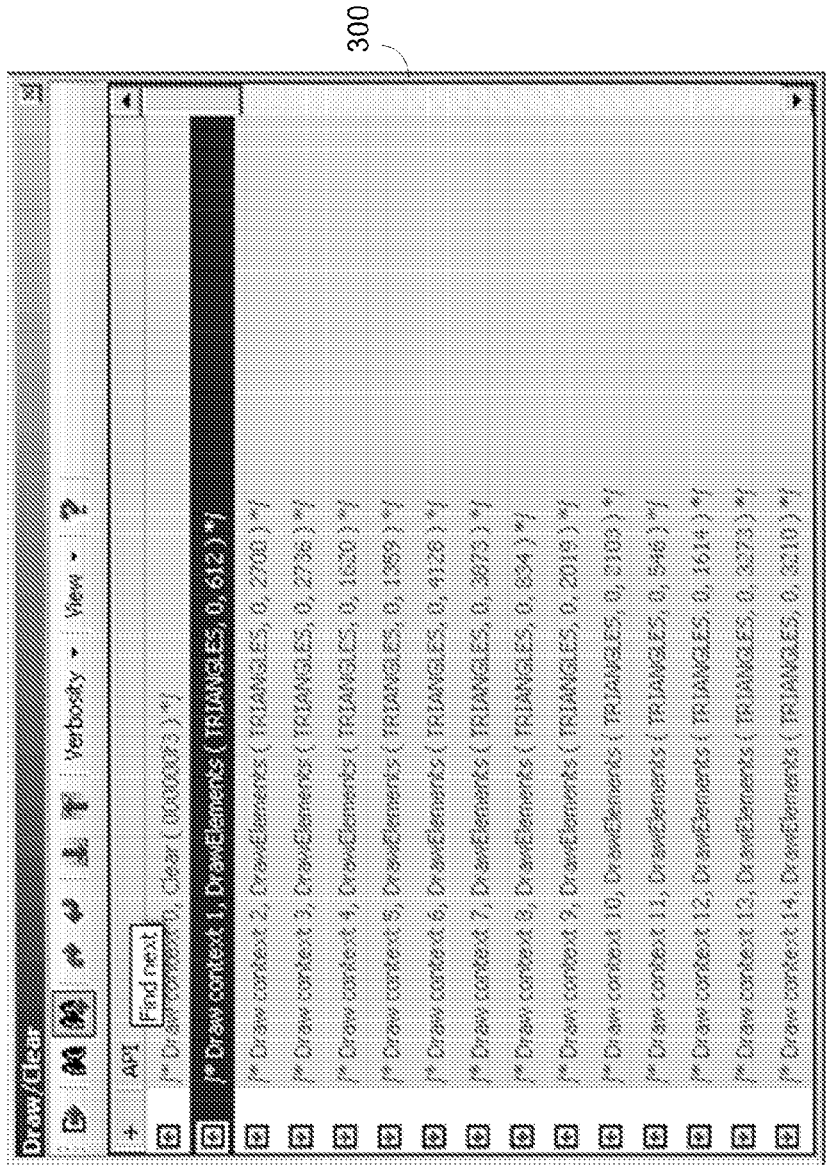
FIG. 7 is a simplified schematic diagram illustrating a graphical user interface further defining the draw/clear window of FIG. 6.
Figure 8:
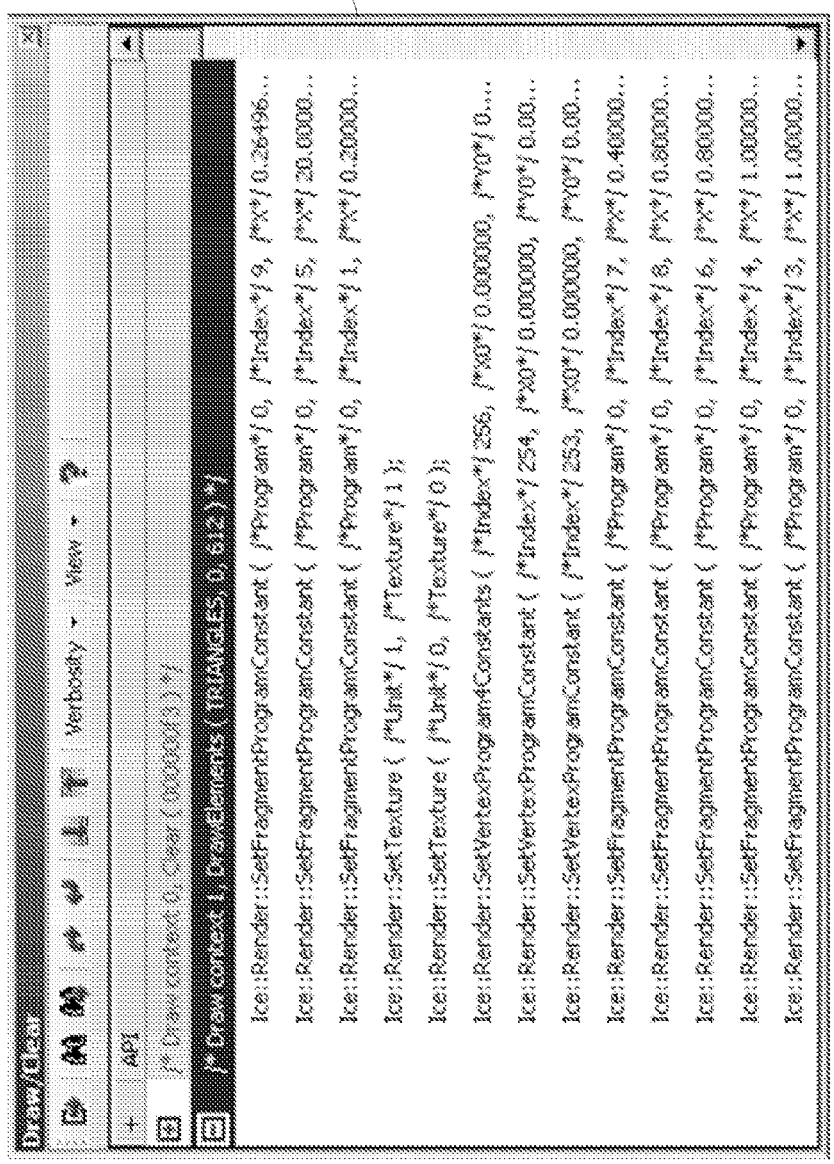
FIG. 8 is an expanded view of the window of FIG. 7.

FIG. 7 is a simplified schematic diagram illustrating a graphical user interface further defining the draw/clear window of FIG. 6. Draw/clear window 300 lists all draw contexts, and may be referred to as a draw context view. It should be appreciated that there can be thousands of clear and draw operations for the rendering of a frame. Through draw/clear window 300 the primary means of push buffer navigation is provided. It should be appreciated that the draw context captured in draw clear window 300 represent draw/clear commands and their associated setup space. By selecting a particular draw context of window 300, the draw context window becomes expanded as illustrated in draw context window 300a of FIG. 8.

One skilled in the art will appreciate that the draw context window 300 of FIG. 7 can be expanded by double clicking on the particular draw context or single clicking on the expander button located in the left hand column of window 300. The expansion in window 300a illustrates the individual libgcm calls used to build the push buffer. Here, a developer can view whether the expected calls exist for the particular frame rendering process.

In one embodiment, various GPU states such as a depth function being set, followed by the actual command to render triangles, may be viewed. Thus, within window 300a of FIG. 8, the draw contexts are expanded to see the original GCM API calls. Furthermore, the source-level disassembly includes annotated arguments which may reference parameter names and constant names. In addition, user specified push buffer annotations may be illustrated to further assist in the optimization process. In one embodiment, visual techniques may be used to highlight redundant calls. These redundant calls may be highlighted in a different color than the remainder of the display of FIG. 300a.

Redundant calls, where the same function is being called with the same input value, should be avoided wherever possible. One skilled in the art will appreciate that setting the GPU registers redundantly can have a significant negative impact on performance. In order to implement the removal or highlighting of redundant commands, a function may go through the push buffer recording each register's value as the value is set by the push buffer. When a command is encountered where the register value being set is equal to the previous value of the register, the command is removed from the push buffer. Thus, the setting of draw commands, clears, vertex instructions, vertex constants, fragment program constants, and other commands may be evaluated for redundant calls, where the same function is being called with a same input value. It should be noted that the libgcm function cellGcmSetMarker may be used insert a text comment into the push buffer, which will appear in window 300a of FIG. 8.

FIG. 9 is a simplified schematic diagram illustrating the raw view window 302 and its contents in accordance with one embodiment of the invention. The interpreted dump of the push buffer is essentially illustrated in window 302. The exact hardware register values set by the API calls are viewed within window 302. Raw view window 302 illustrates full push buffer disassembly, register sequences and constants, as well as any user specified annotations. In one embodiment, if the capture has any errors noted therein, the errors may be visually highlighted in window 302. The problems view of window 306 of FIG. 10 summarizes all warnings and errors.

In one embodiment, by selecting one of the problem entries by clicking on the problem, a developer will be directed to the offending draw context and raw disassembly. Push buffer overview screen 308 is illustrated in FIG. 11 in accordance with one embodiment of the invention. Push buffer overview screen 308 illustrates how much of the push buffer is occupied by commands of various types. The various types of commands include commands that set texture parameters, render targets parameters, vertex programs, etc. As illustrated in FIG. 11, the vertex program constants occupy most of the space of the push buffer, i.e., 41408 bytes or 55%. In addition, it should be appreciated that there is a significant amount of redundancy within the vertex program constants. As illustrated in FIG. 11, removal of the redundancy would reduce the size of the vertex program constants to 29932 bytes of data. By selecting the detailed redundancy tab of window 308 of FIG. 11, a detailed redundancy window 310 will appear.

Detailed redundancy window 310 of FIG. 12, includes a list of all state commands and the percentage of redundancy for each state command. Any significant redundant states may be highlighted or somehow visually amplified to notify a developer that the redundant states should be trimmed for optimal buffer usage. As illustrated in FIG. 12, the alpha test enable is being set over 200 times and is redundant 99% of the time. One skilled in the art will appreciate that redundant calls can easily add several milliseconds to the rendering of each frame. Thus, the push buffer overview of FIGS. 11 and 12 break down the push buffer and allow for categorization of the contents, e.g., by size.

Figure 13A:
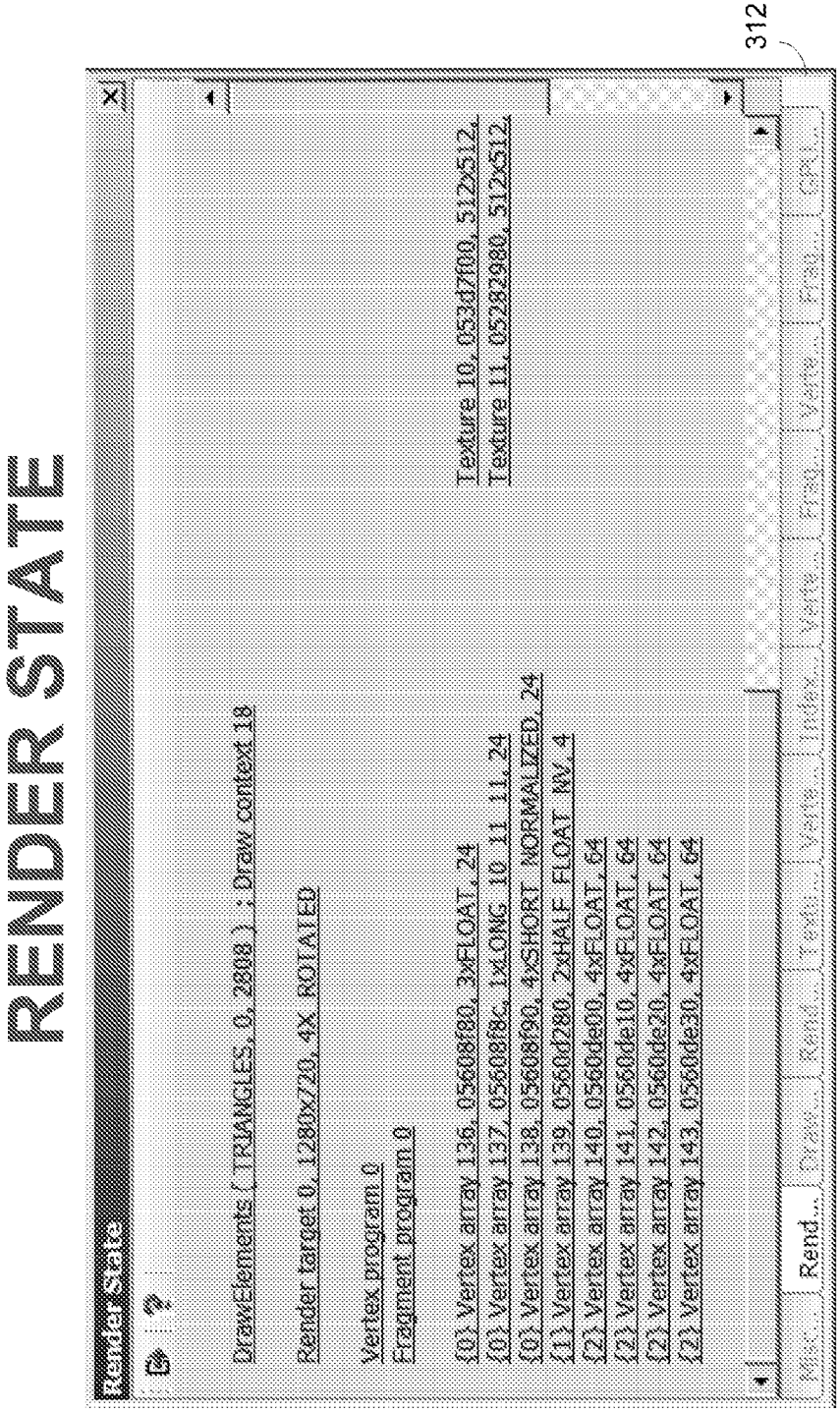

FIG. 13A is a simplified schematic diagram further illustrating the render state window 312 of FIG. 6. Render state window 312 illustrates all resources referenced by the currently selected draw context. Within render state window 312, the vertex arrays, fragment programs, textures, render targets, etc., that have been set for this rendering call are illustrated. It should be appreciated that this information cannot be obtained by simply looking at the libgcm calls for the draw because a specific resource may have been set by a previous draw context, e.g., a fragment program may have been specified five draw contexts ago. Selecting a resource will forward the developer to an appropriate resource window which will provide further details. As depicted on the bottom of window 312 a number of tabs exist, which define graphical interfaces further explained through the following figures.

Figure 14A:
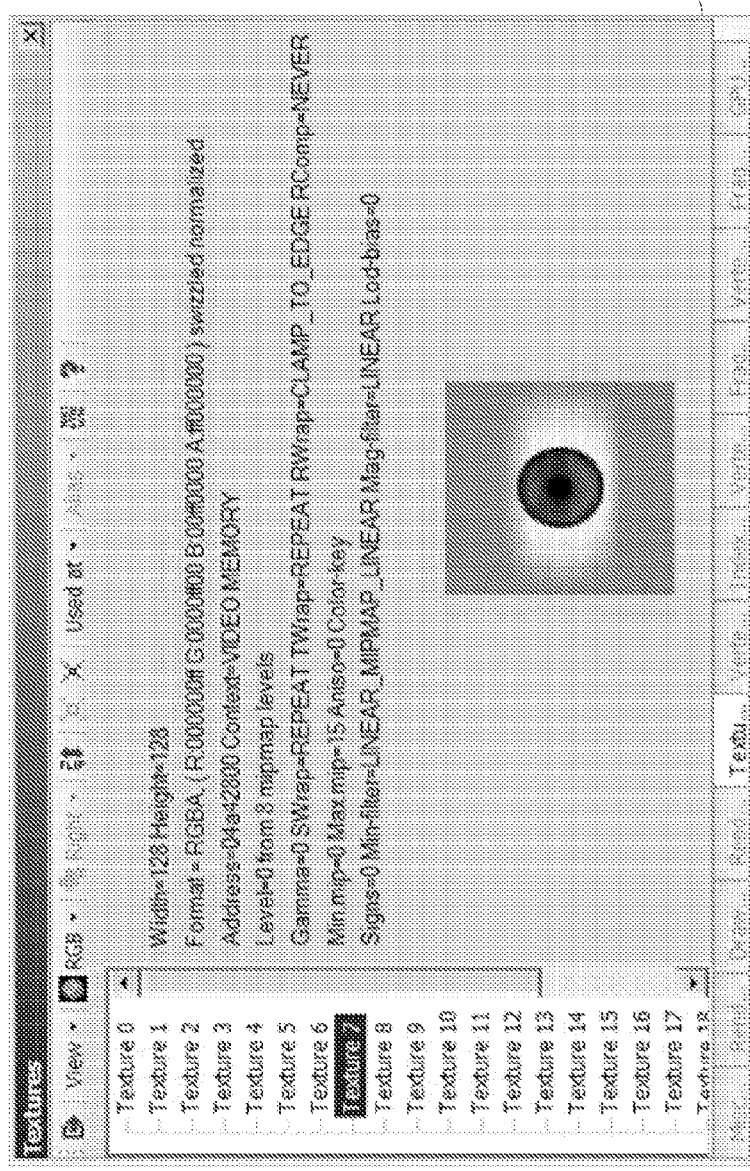
FIGS. 14A-D illustrate textures used by the push buffer in accordance with one embodiment of the invention.

FIG. 13B is a simplified schematic diagram illustrating a miscellaneous state window 314 that illustrates what GPU state has been set for each of the calls in accordance with one embodiment of the invention. For example, within window 314 the color write has been enabled and the alpha blend has been disabled. FIG. 14A illustrates the texture window 316 in accordance with one embodiment of the invention. Texture window 316 lists out all the textures currently used by the push buffer for the frame in the left hand column of window 316. For each texture, properties such as compression format, dimensions, total mip levels, size, and so on are displayed.

Figure 14B:
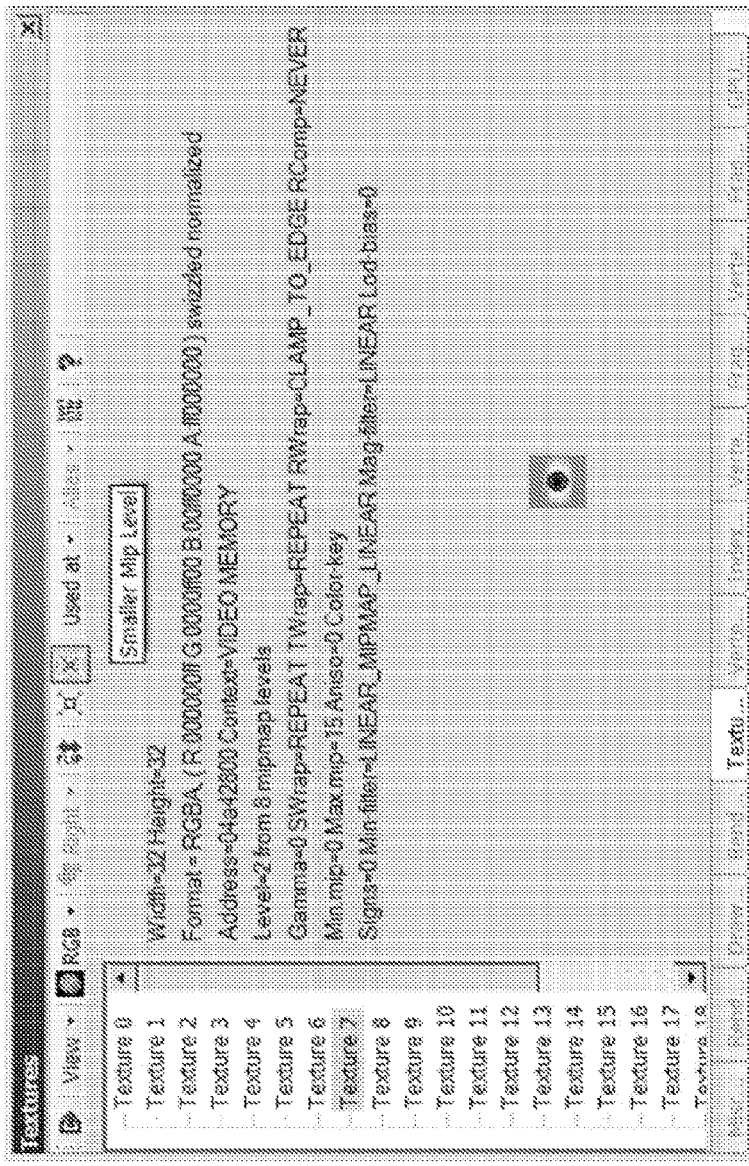
Figure 14C:
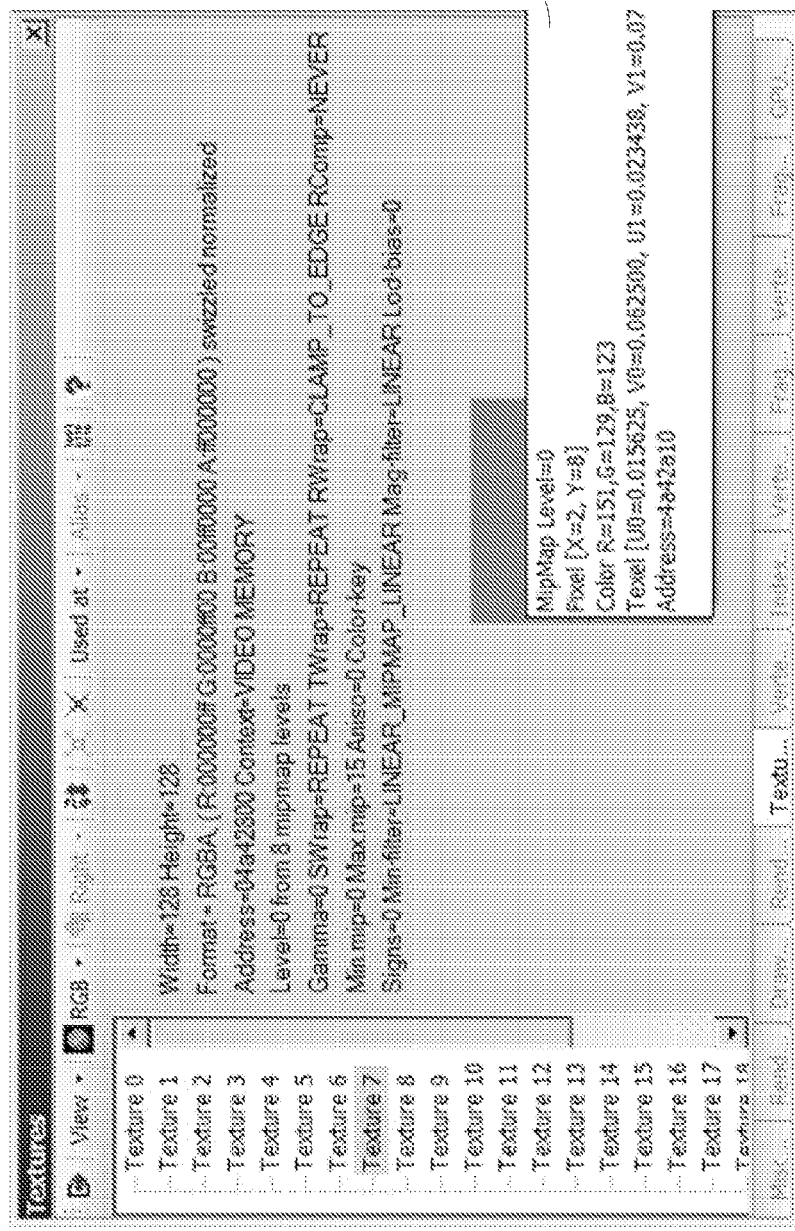
Figure 14D:
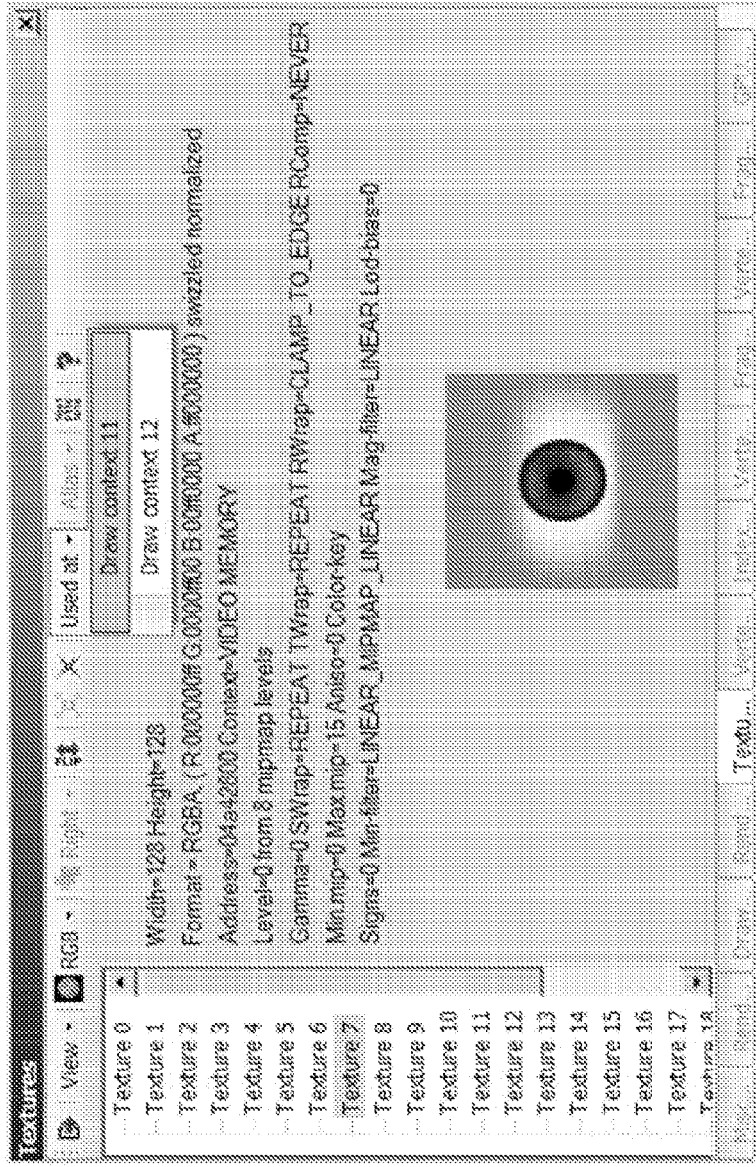

Of course, additional texture state attributes may be included within texture window 316. Additionally, each mip level for each texture can be viewed individually to ensure the mips look correct. In FIG. 14B, the smaller mip level of texture window 316 is illustrated. In FIG. 14C, the pixel tooltip enables the developer to check pixel values of textures in box 317 that are used for shading calculations, such as normal maps. FIG. 14D illustrates texture window 316 where a drop down list indicates the draw context that are using this texture.

Figure 15:
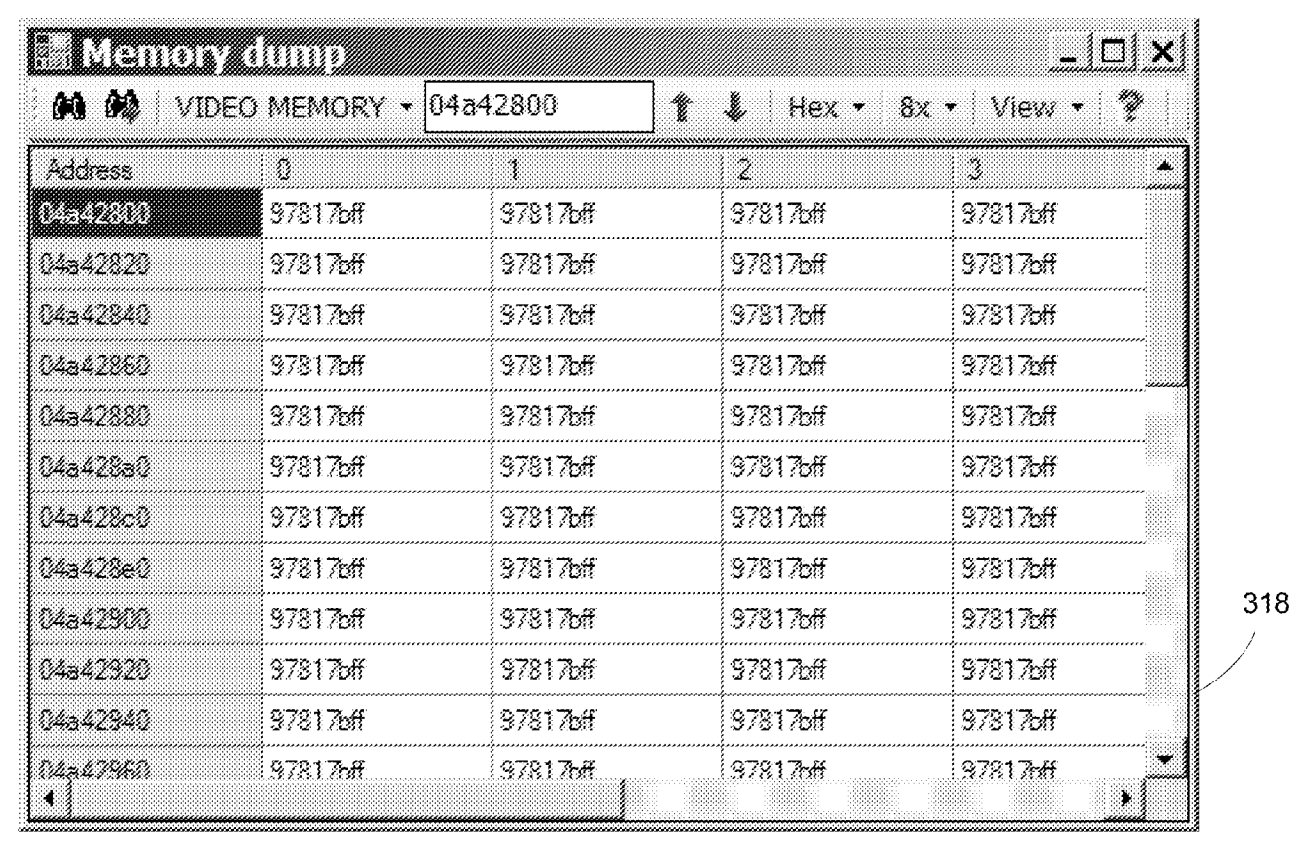
Figure 16:
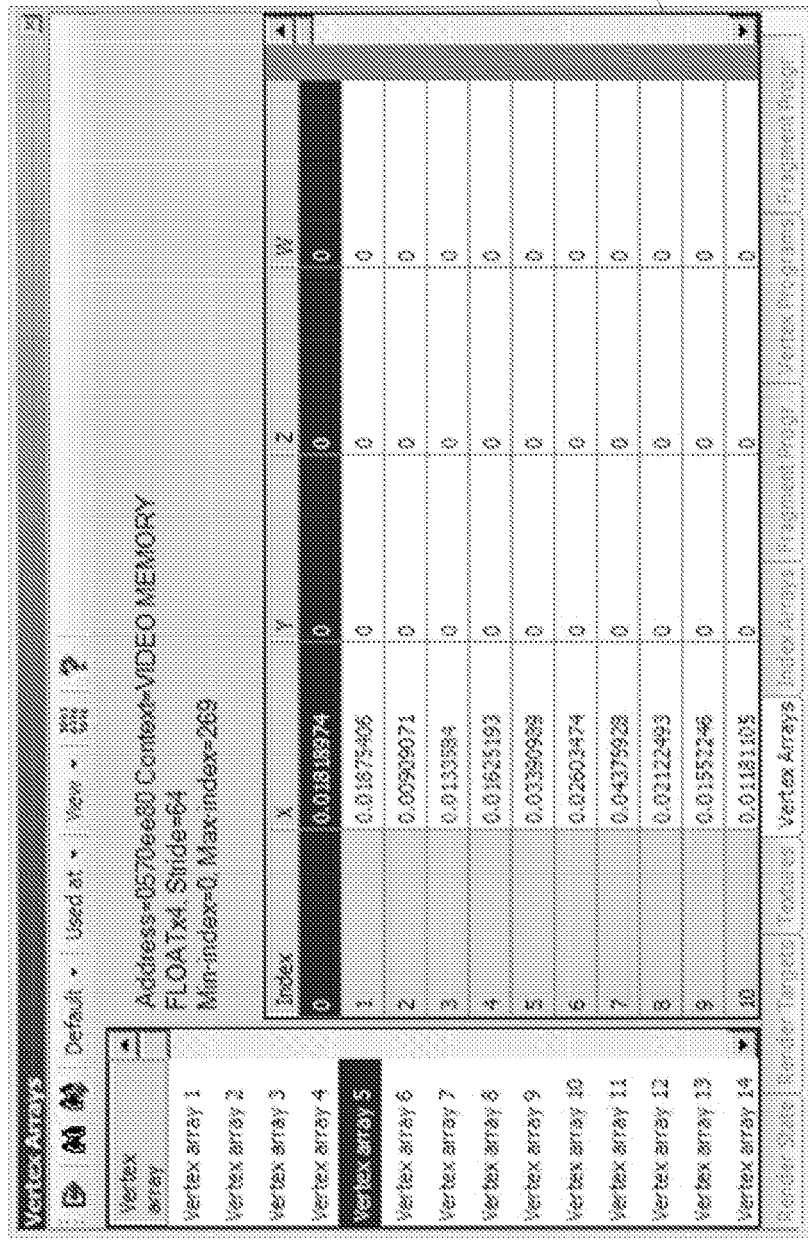
FIG. 16 illustrates vertex arrays used by the push buffer in accordance with one embodiment of the invention.
Figure 17:
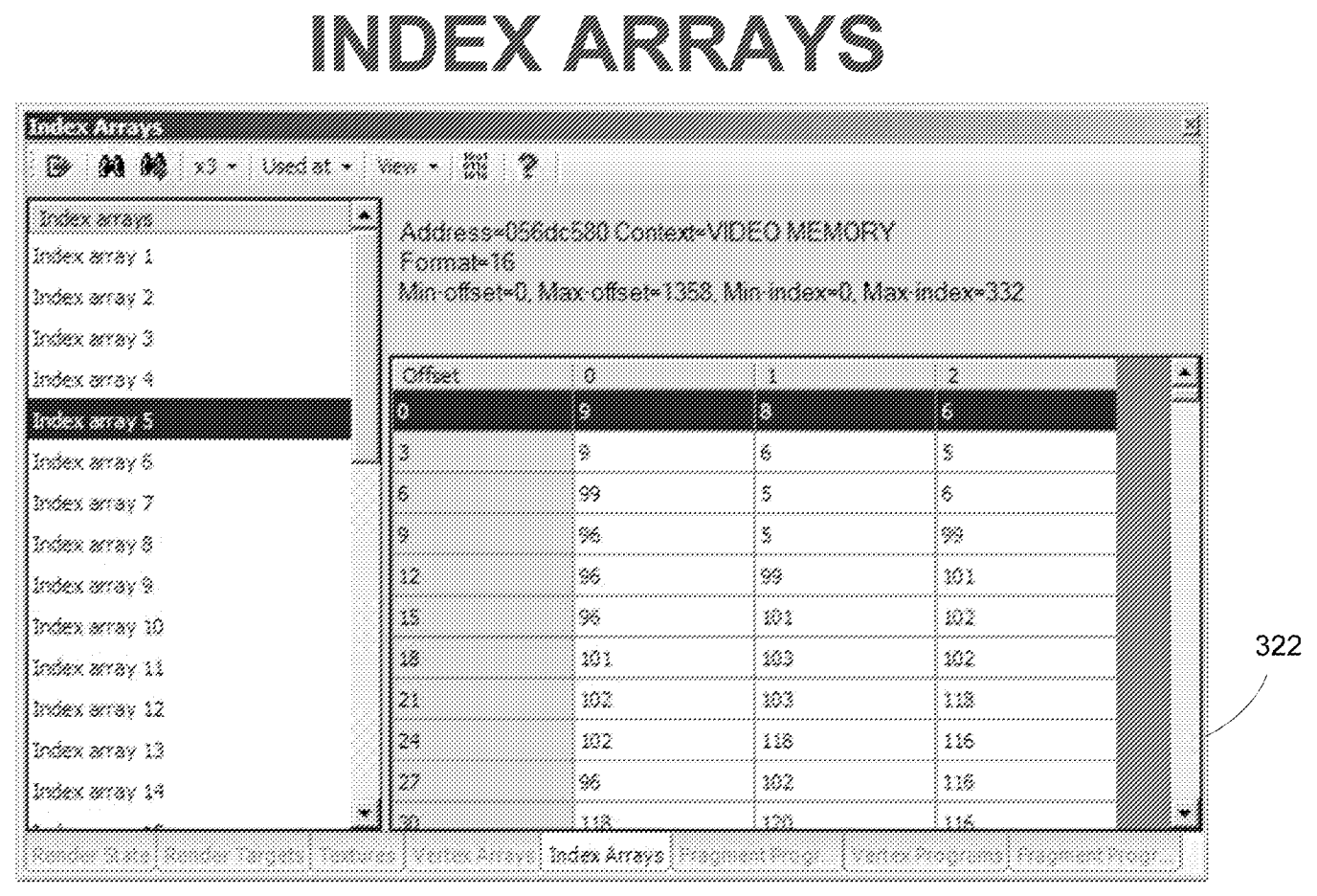

Memory dump window 318 of FIG. 15 provides a memory view of the texture, which is useful for debugging shaders that use this texture. In one embodiment, the texture can be exported as a BMP file, which may be useful for debugging if the texture was procedurally generated by a processor, such as the CELL processor. FIGS. 16 and 17 illustrate windows 320 and 322, respectively. In FIG. 16 vertex arrays used by the push buffer are illustrated in window 320. For FIG. 17 index arrays used by the push buffer are illustrated in window 322.

Figure 18:
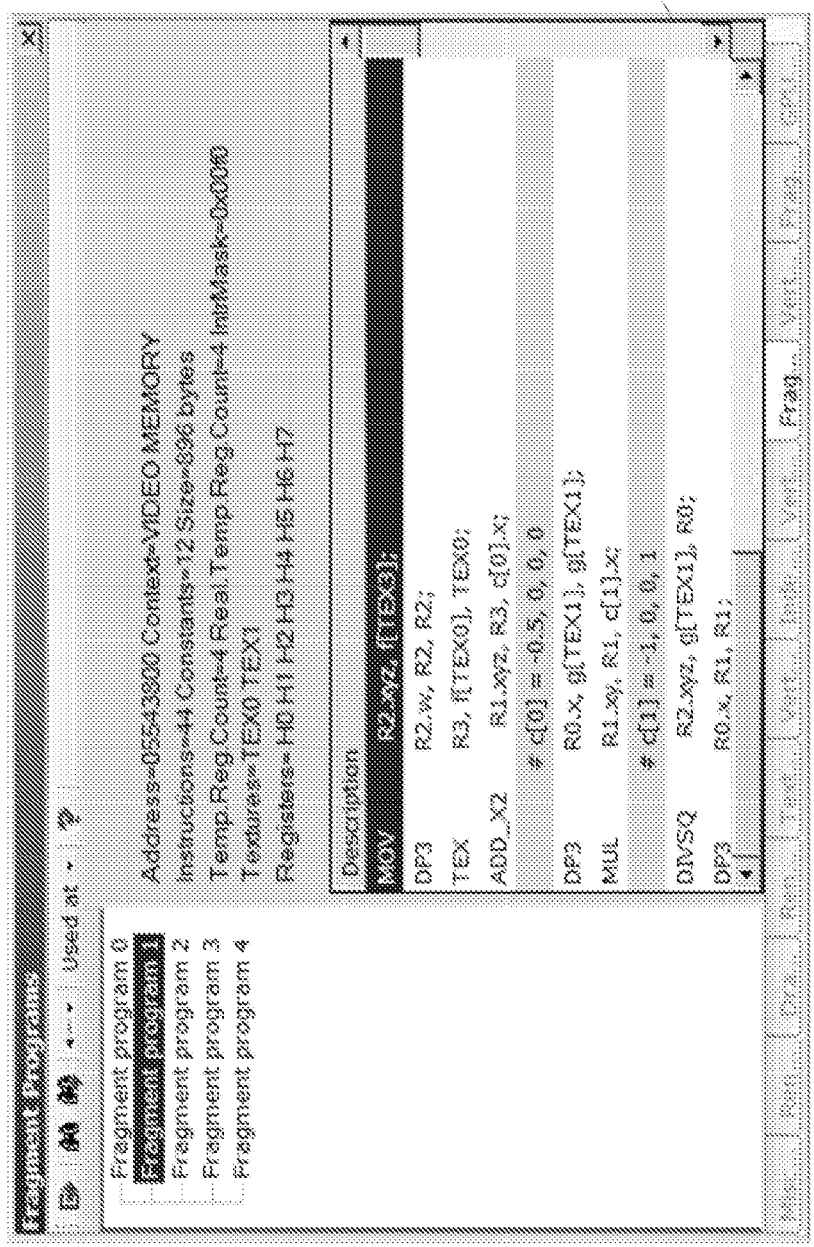
FIG. 18 is a simplified schematic diagram illustrating the fragment programs window in accordance with one embodiment of the invention.

FIG. 18 is a simplified schematic diagram illustrating the fragment programs window 324 in accordance with one embodiment of the invention. Fragment programs window 324 lists out all fragment programs used in the push buffer, and provides an interpreted dump of the fragment shader program used by the current draw context. It should be appreciated that unlike vertex shader programs, the constants used by fragment shader programs are embedded in the program itself, so prior to drawing an object one typically sets the constants. That is, the embedded constants of a fragment shader program change depending on the particular draw context in question. Fragment program window 324 displays the appropriate constants for the current draw context.

Figure 19A:
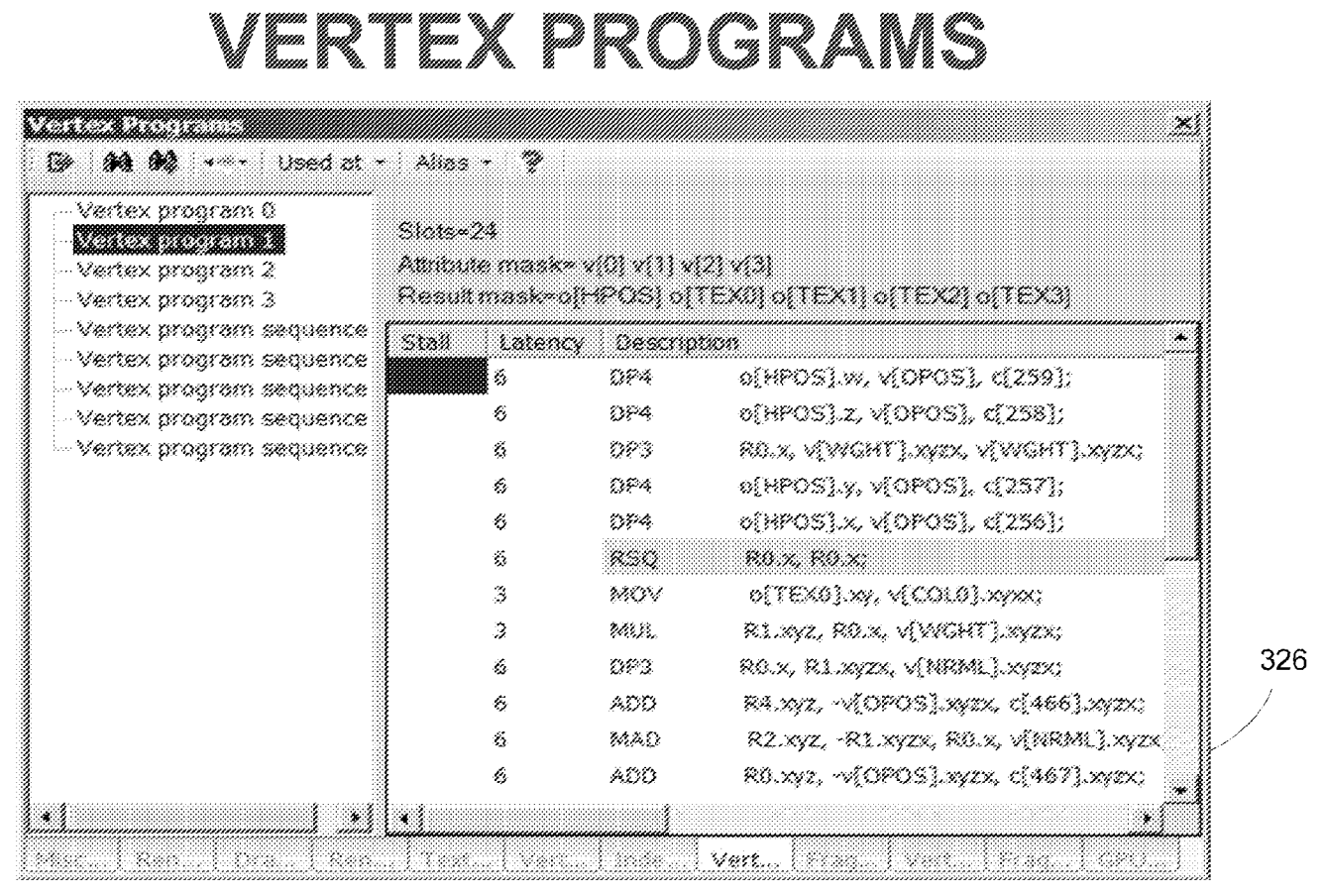

FIG. 19A illustrates vertex program window 326 that lists out all the programs used in the push buffer and provides an interpreted dump in accordance with one embodiment of the invention. Vertex program window 326 will also illustrate which instructions are dual issued and which commands have a dependency stall. These stalls may be visually highlighted in one embodiment. Vertex program window 326 list each vertex program used by the current draw context and attributes, such as inputs, outputs, temporary registers, etc.

FIG. 19B illustrates vertex program context window 327 in accordance with one embodiment of the invention. Vertex program context window 327 illustrates the vertex constants used by the current draw context. The constants may be visually highlighted where a color indicates a certain state for the constant. For example, different colors may be used to indicate whether the constant is newly modified, inherited from a previous frame, or redundant, in one embodiment, thereby providing an indication to the developer where optimization opportunities exist.

Figure 20A:
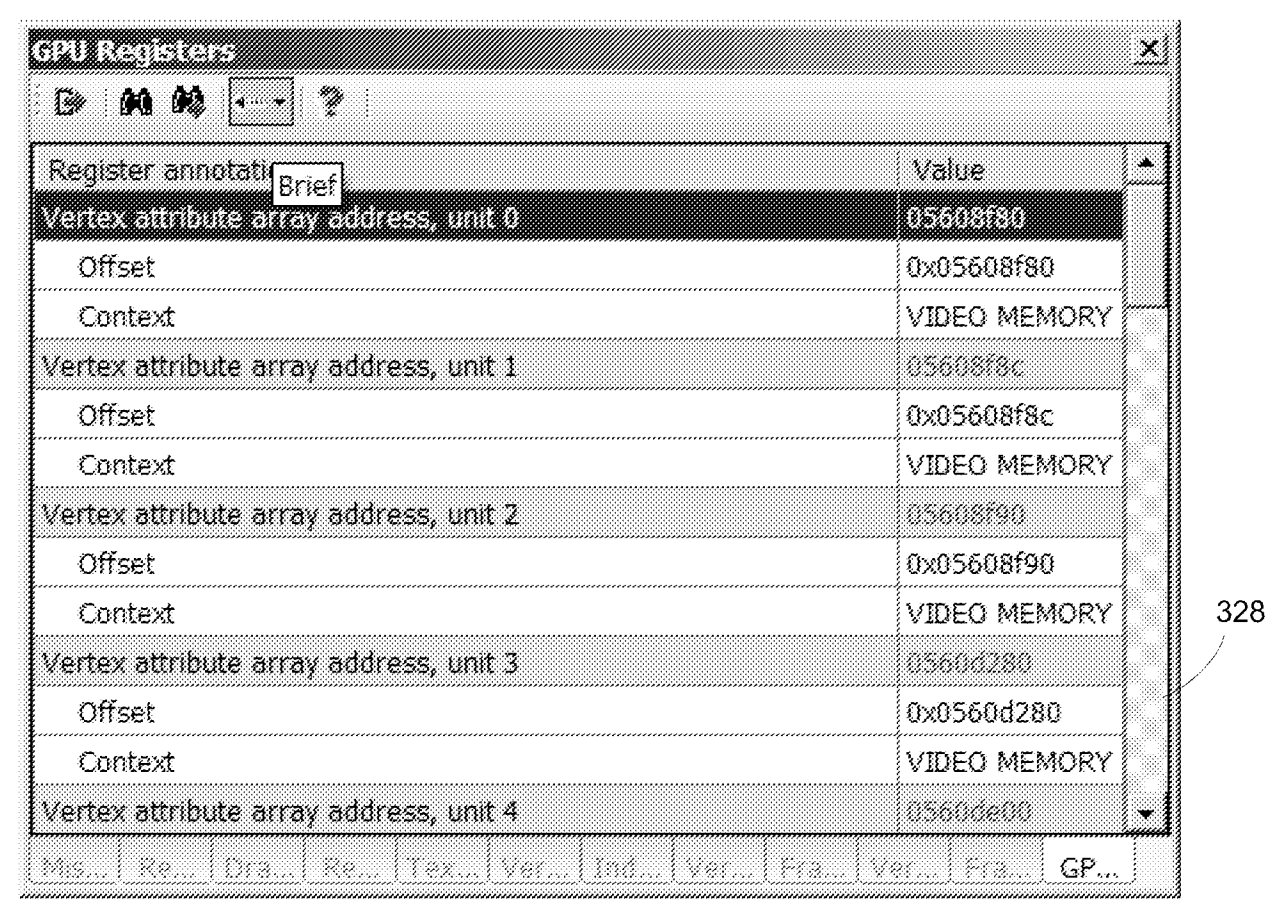

FIG. 20A and FIG. 20B illustrate GPU register windows that provide a detailed view of the state of the registers in the GPU in accordance with one embodiment of the invention. FIG. 20A illustrates window 328 which provides a brief mode display that lists all the registers that were changed by the currently selected draw context. FIG. 20B illustrates window 330 which lists all of the registers. In one embodiment, the display is color coded so that a certain color may indicate the value is set by a current draw context and if the value is another color, the value is set by a previous draw context. For example, a blue value may indicate the value was set by current draw context, while a green color indicates that the value was set by a previous draw context.

Figure 21A:
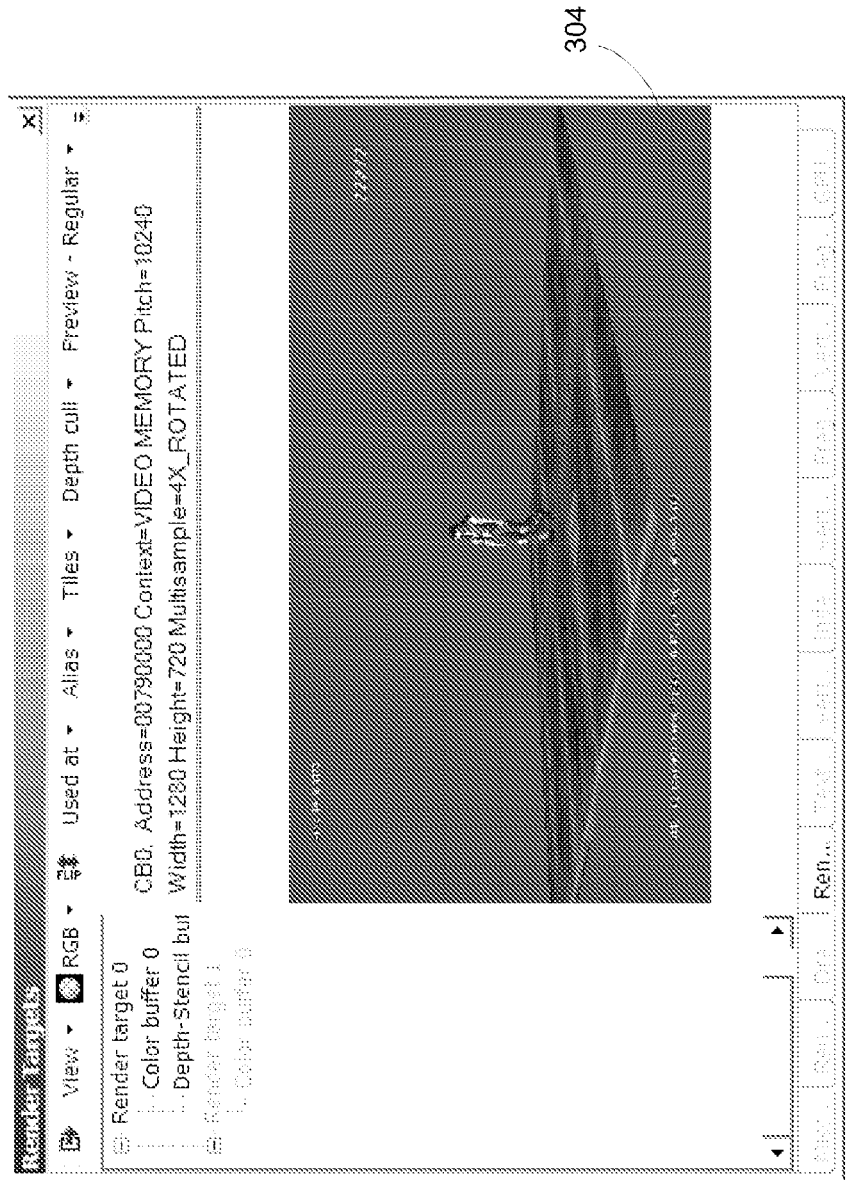
FIGS. 21A through 21K further define the render targets window in accordance with one embodiment of the invention.
Figure 21B:
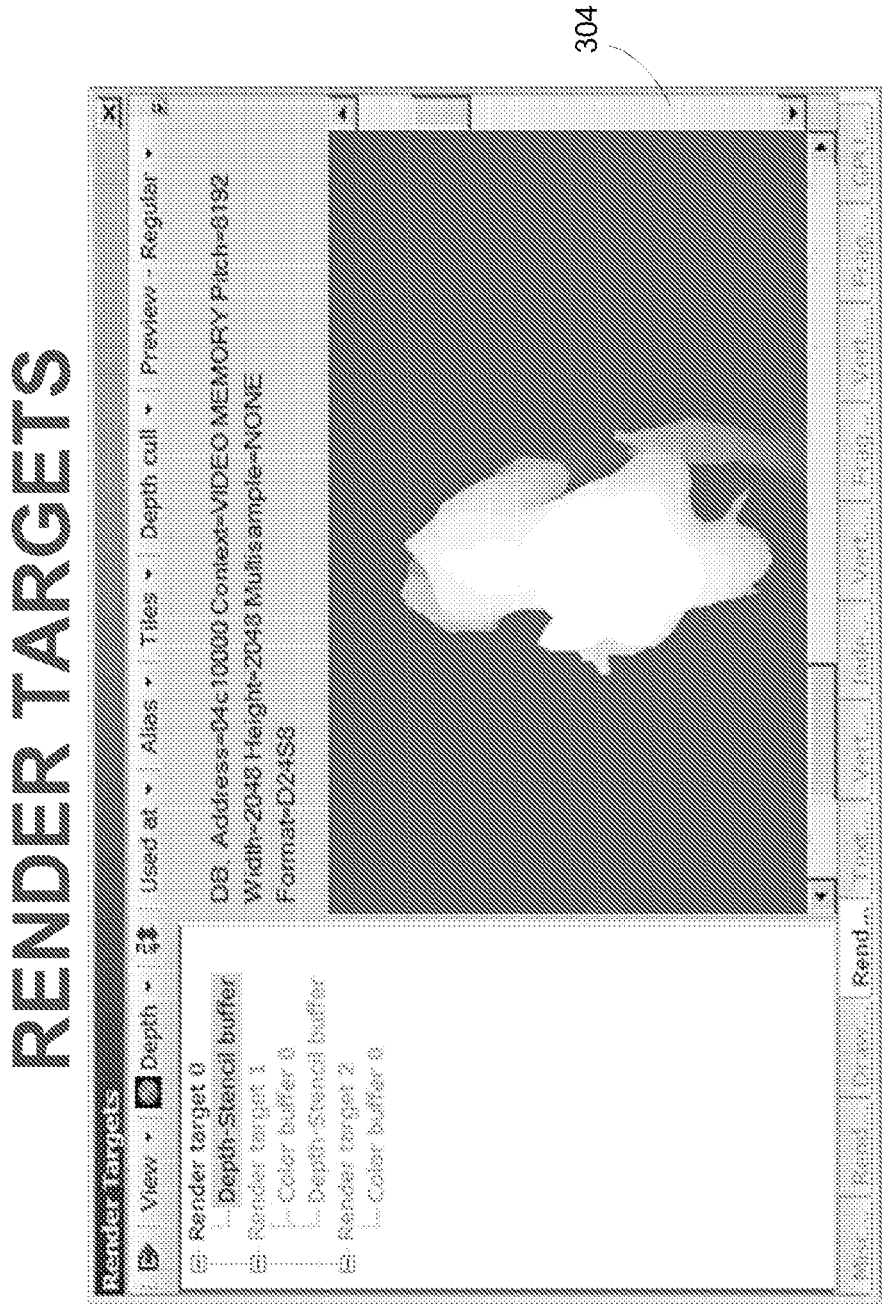
Figure 21C:
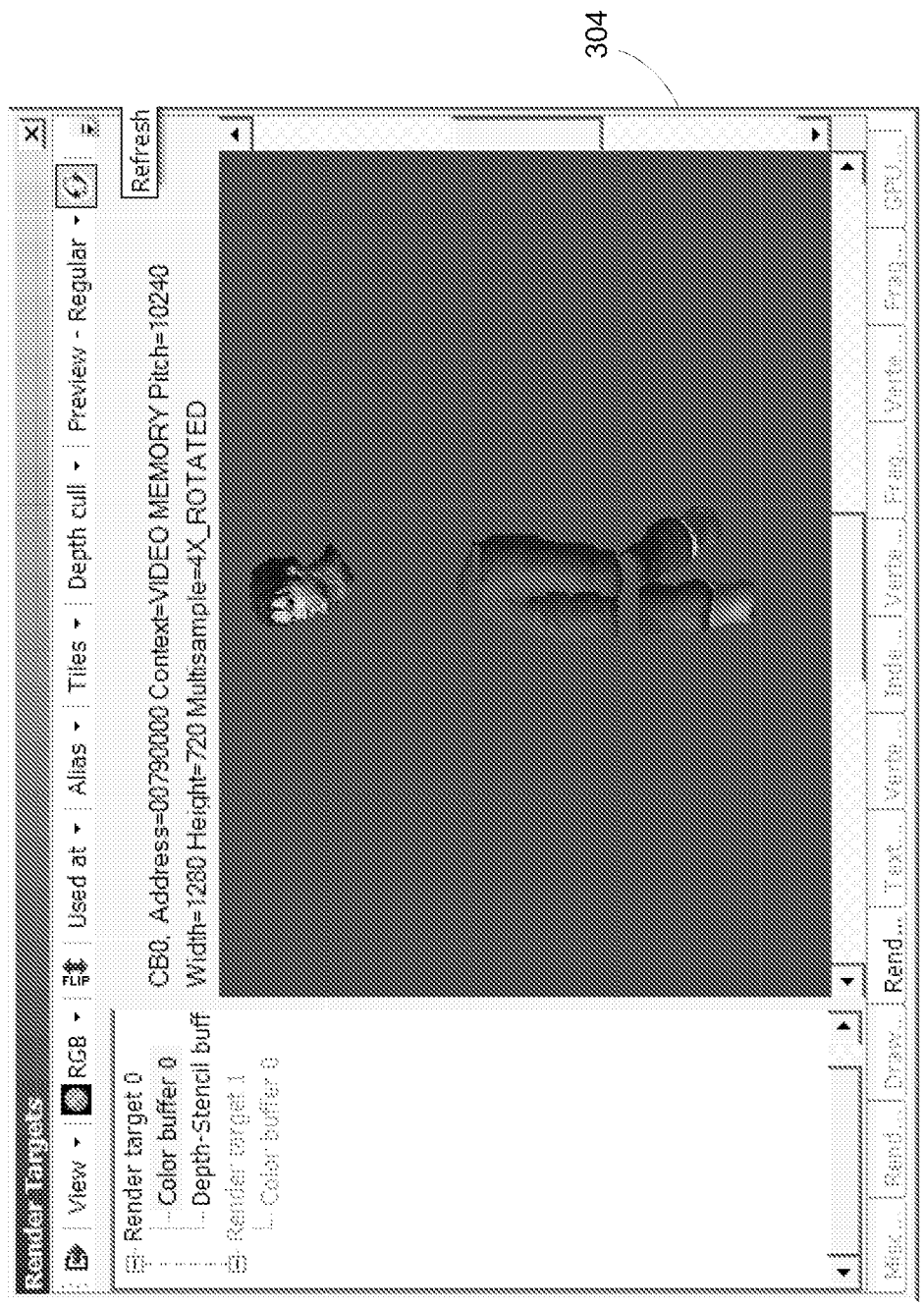
Figure 21D:
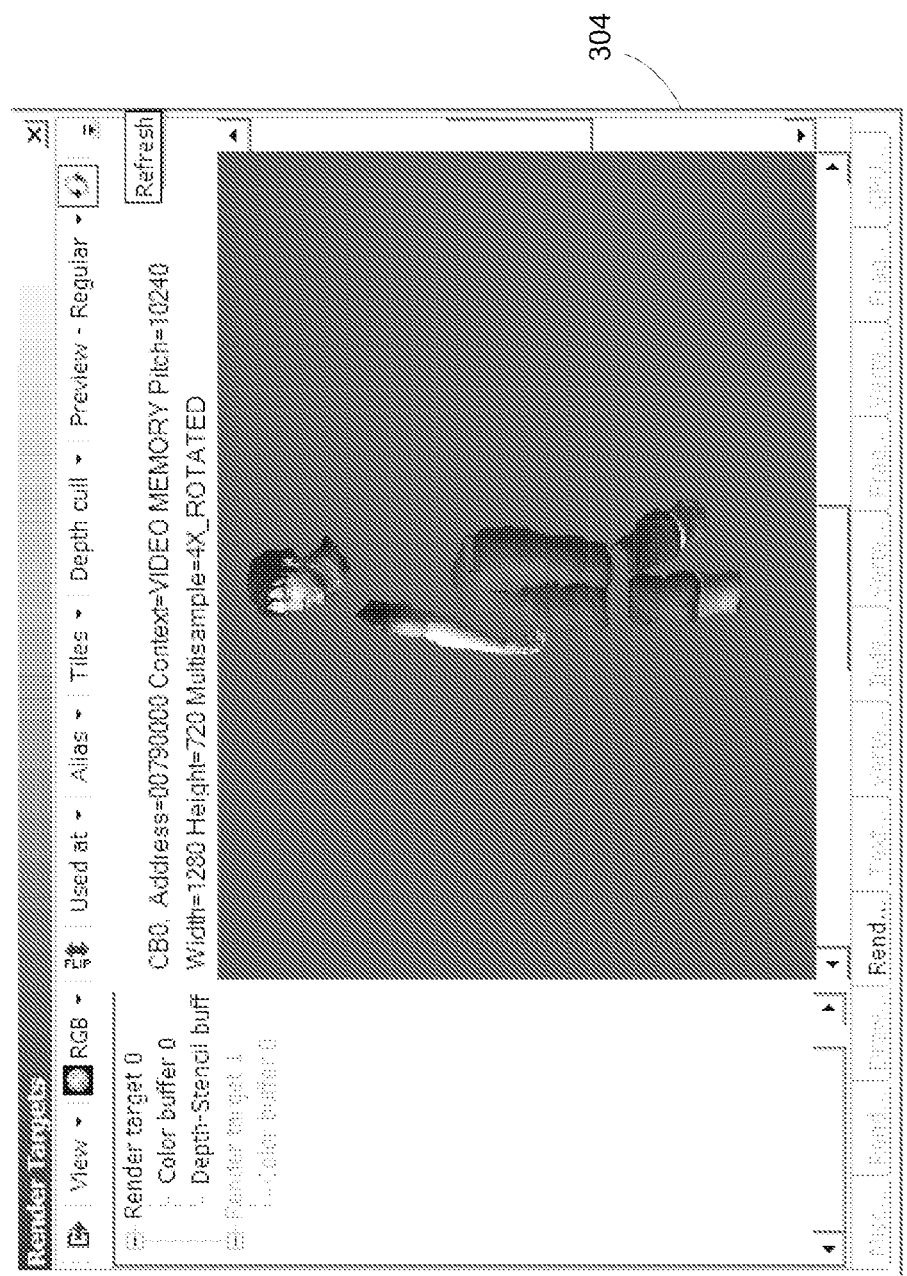
Figure 21E:
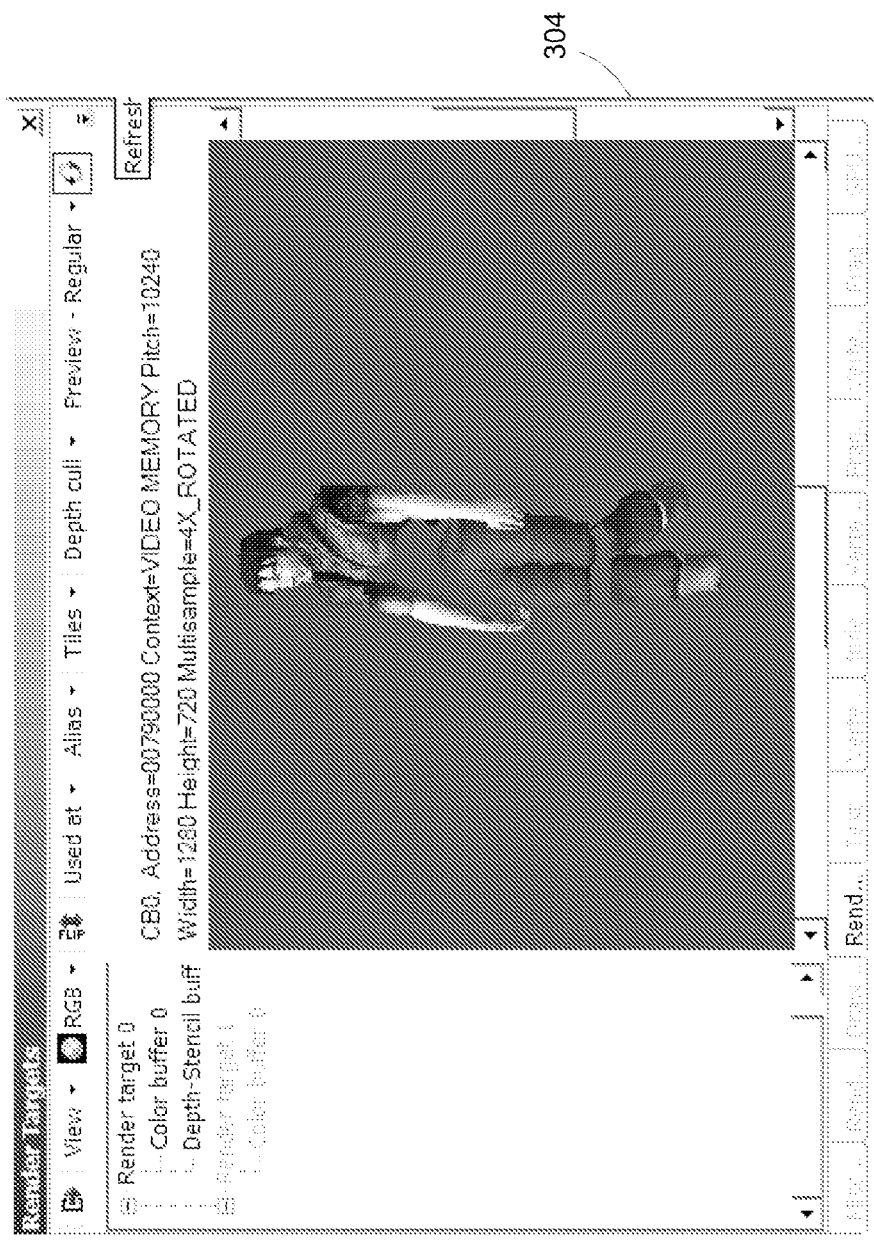
Figure 21F:
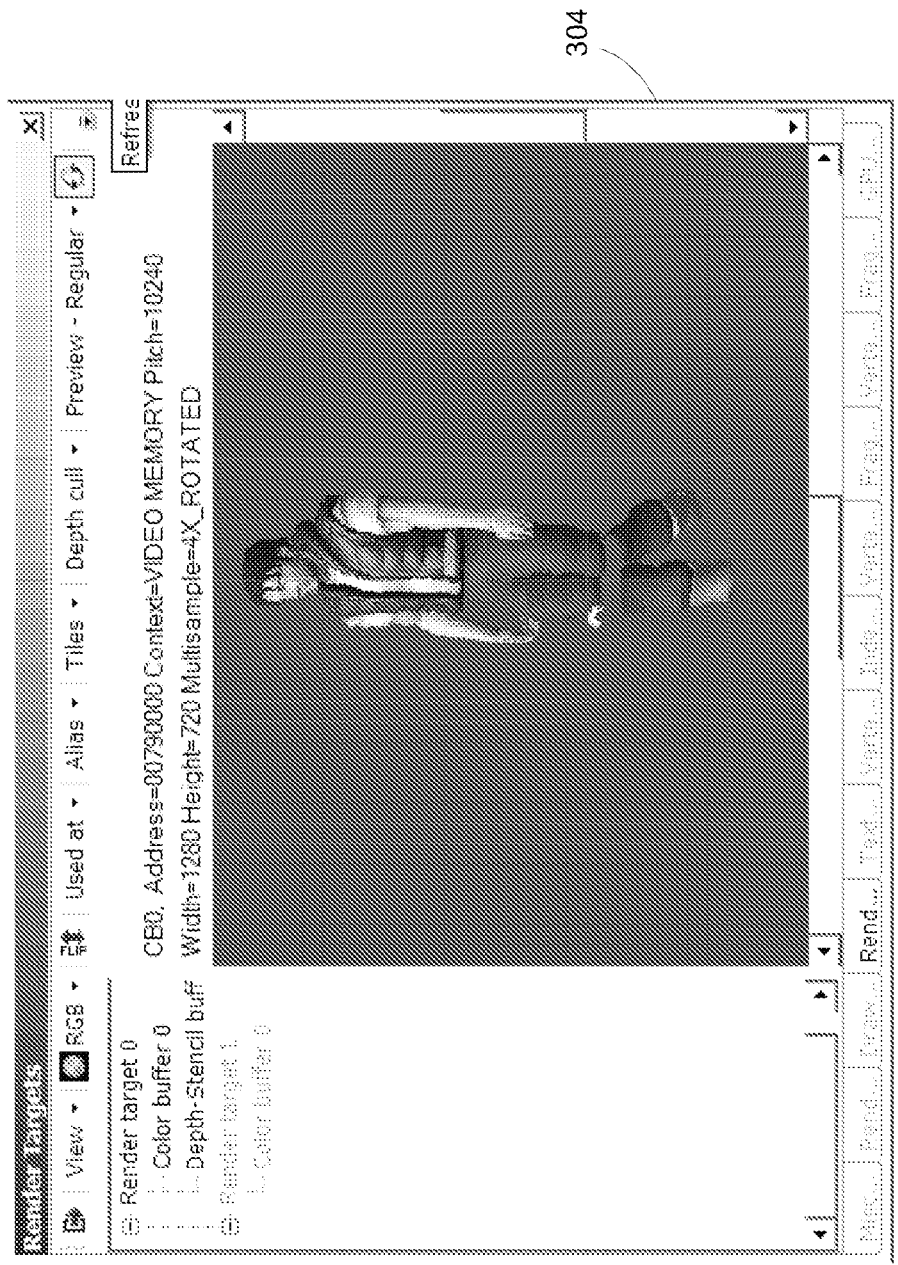
Figure 21G:
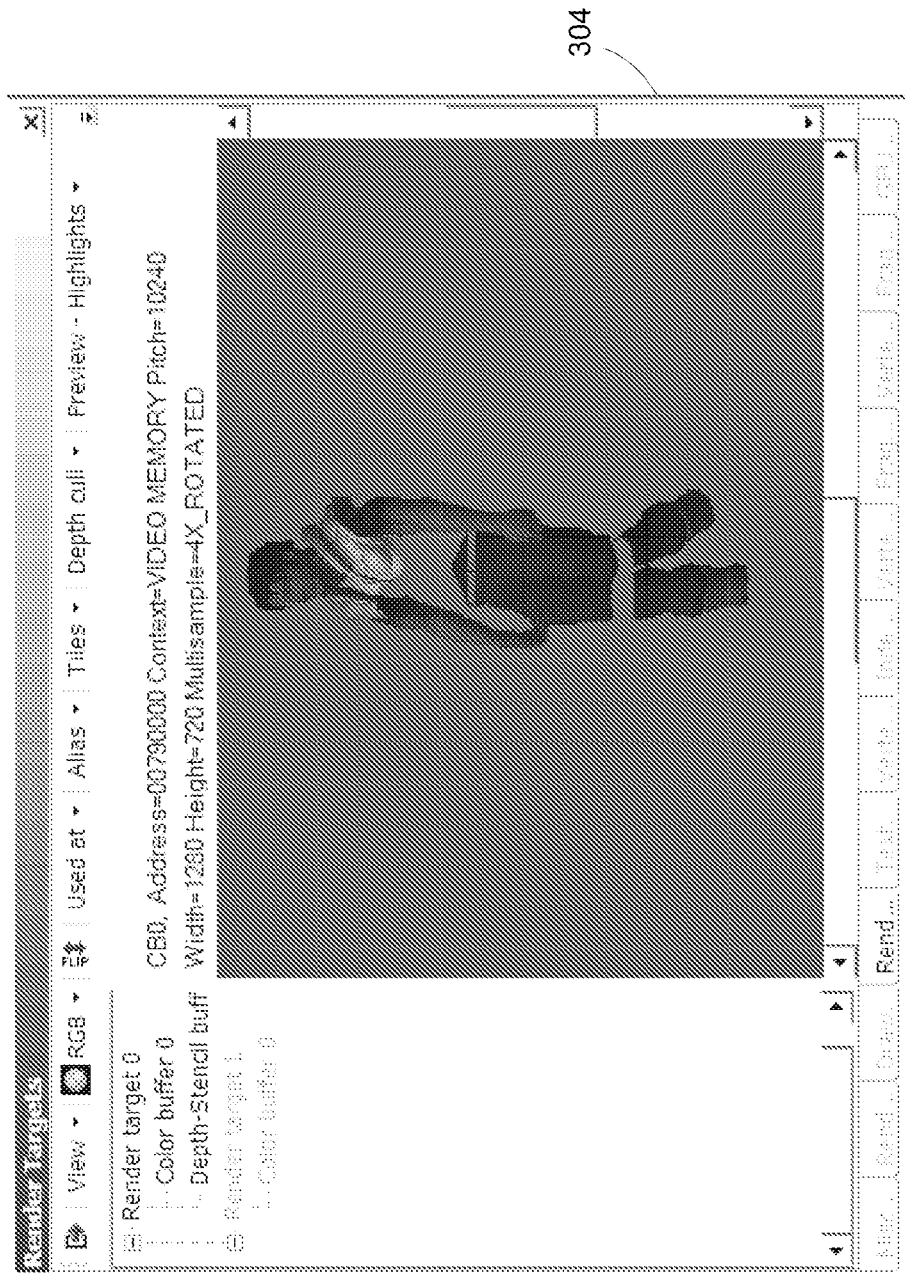
Figure 21H:
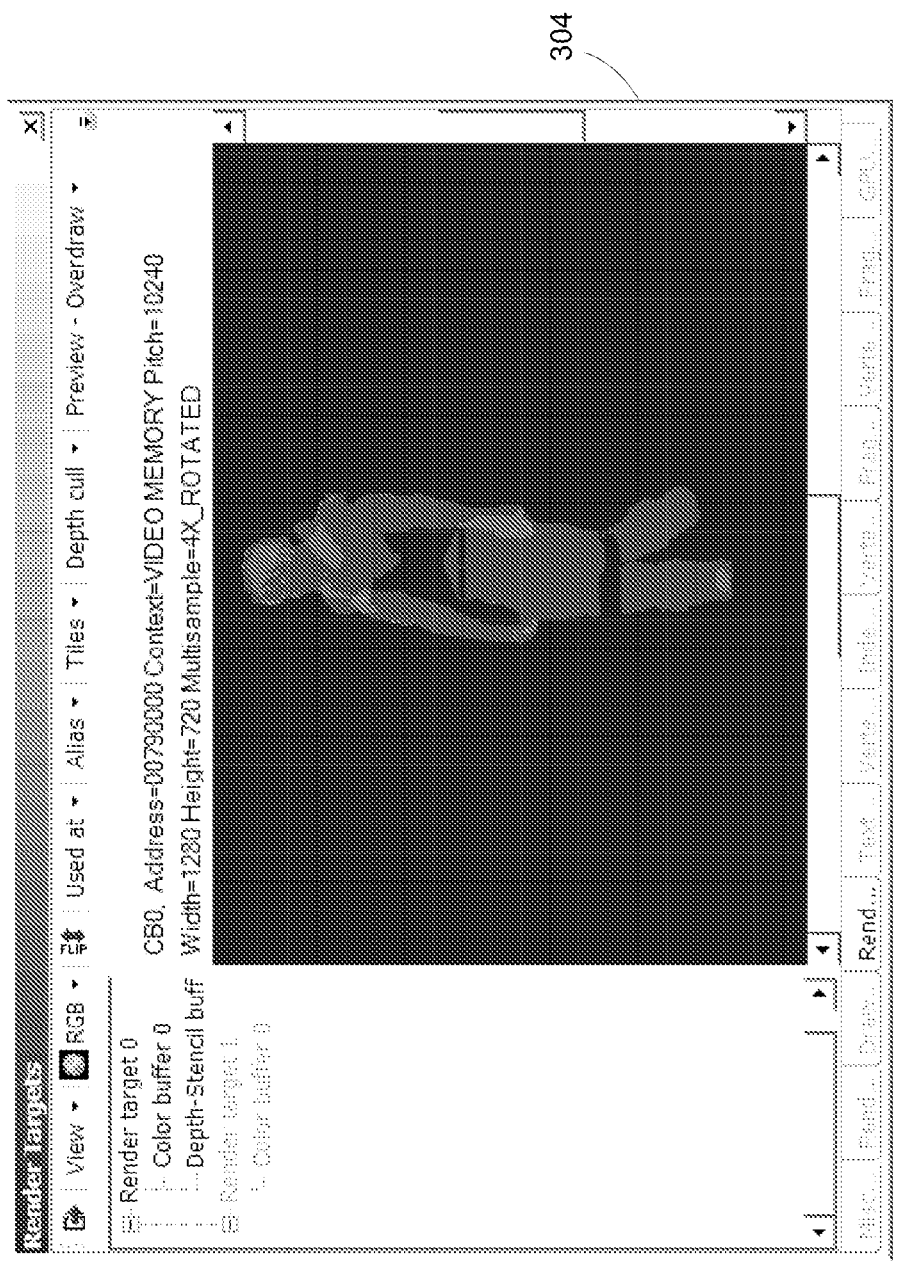

The render targets window 304 is further illustrated in FIGS. 21A through 21K in accordance with one embodiment of the invention. Render targets window 304 lists all render targets used in the frame, highlighting the render targets actually used in the currently selected draw context. FIG. 21B illustrates a view of a depth buffer render target, for instance.

In essence, render target window 304 puts the results of the tool's internal analysis at the fingertips of the developer. For example, the shadow map may be highlighted because the object only writes to that buffer in one embodiment. Thus, it is able to examine the capture in various ways and the capture can be saved and sent to someone else for review. It should be appreciated that a gaming console is not required to review the data sent to another developer. However, having a game console hooked up to the application will provide for additional items that can be done with the recapture. For example, in render target window 304, by selecting the refresh button the developer can see the state of the render target after the current draw call. Essentially, by selecting the draw context and then hitting refresh the developer can watch the image be rendered slide by slide as illustrated in FIGS. 21C through 21H.

Figure 21I:
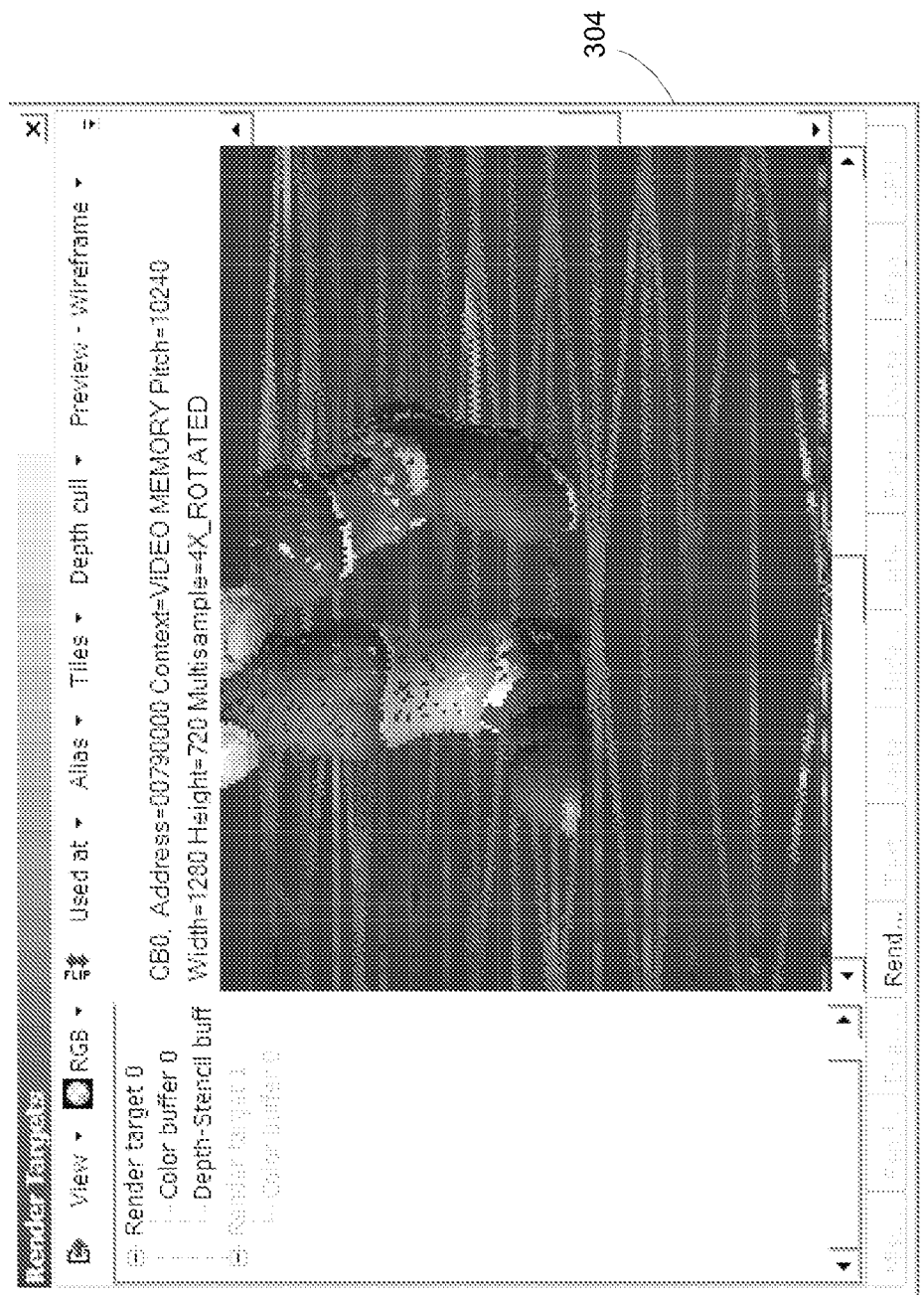
Figure 21J:
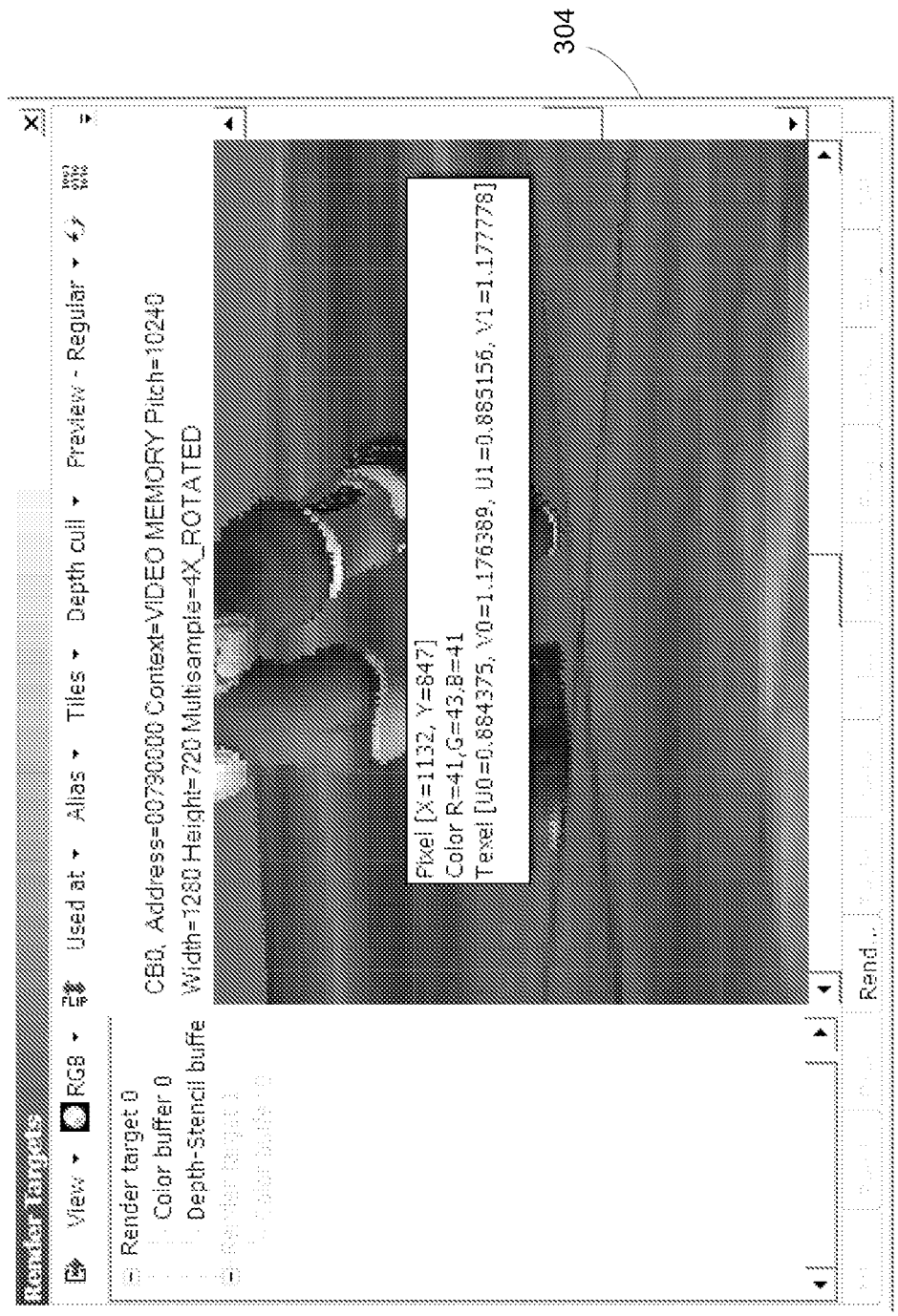

In this embodiment, a developer can determine, for example, which draw call is causing a strange pixel in the final image. In addition, the developer can select whether they wish to see the render target in various modes, such as highlight, overdraw or wire frame. As the developer moves the cursor over the image, the exact RGB and pixel location values at any pixel allow the developer to track down pixel specific bugs as depicted in FIGS. 21J and 21I. As mentioned above, these images may be saved as BMP files for later examination. Render targets window 304 enables a developer to determine what draw contexts write to the render target, if the render target is aliased as a texture, if the render target is set for double speed rendering, if the render target is set up for early depth optimization, etc.

Figure 21K:

During the render target refresh, the push buffer is transferred to the GCM tool and is kicked up to the currently selected draw context. Thus, the rendering process is singled stepped and may be done so both forwards and backwards in time. FIG. 21K illustrates an interface enabling exporting the render target window data.

Figure 22:
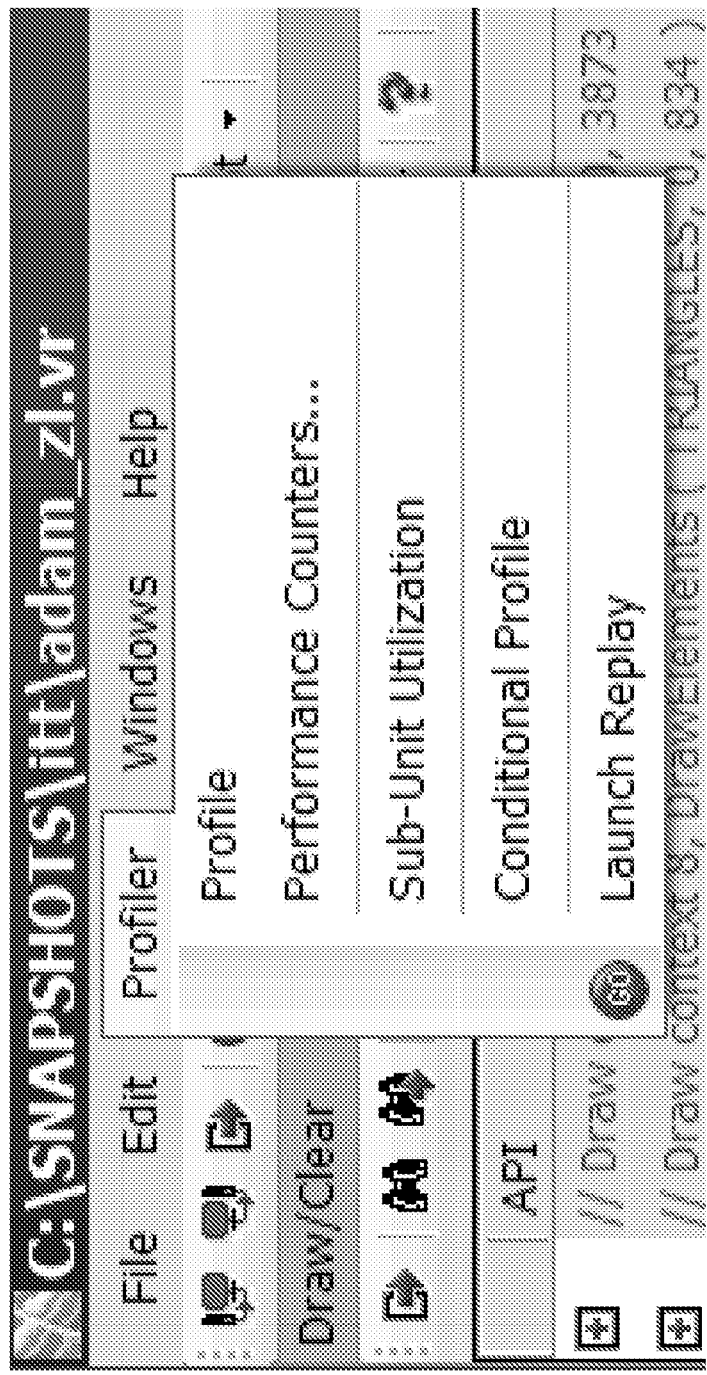
FIG. 22 illustrates a simplified schematic diagram of a menu in which a developer would select the profiler aspects in accordance with one embodiment of the invention.

Apart from looking at each of the resources, the developer can also do various forms of performance analysis through the GCM tool. Typically, a developer would initially use the subunit utilization feature provided through the GCM tool. FIG. 22 illustrates a simplified schematic diagram of a menu in which a developer would select the profiler aspects in accordance with one embodiment of the invention. The subunit utilization feature within the profiler aspects provide an average utilization of each of the major subunits in each draw context that could cause a bottleneck. The profile may be a graph as illustrated in window 334 of FIG. 23A or window 336 of FIG. 23B in accordance with one embodiment of the invention. The bar graphs of windows 334 and 336 may be color coded to give a clear indication of which subunit is utilized most frequently and essentially gives an ordered list of optimization targets.

Figure 23A:
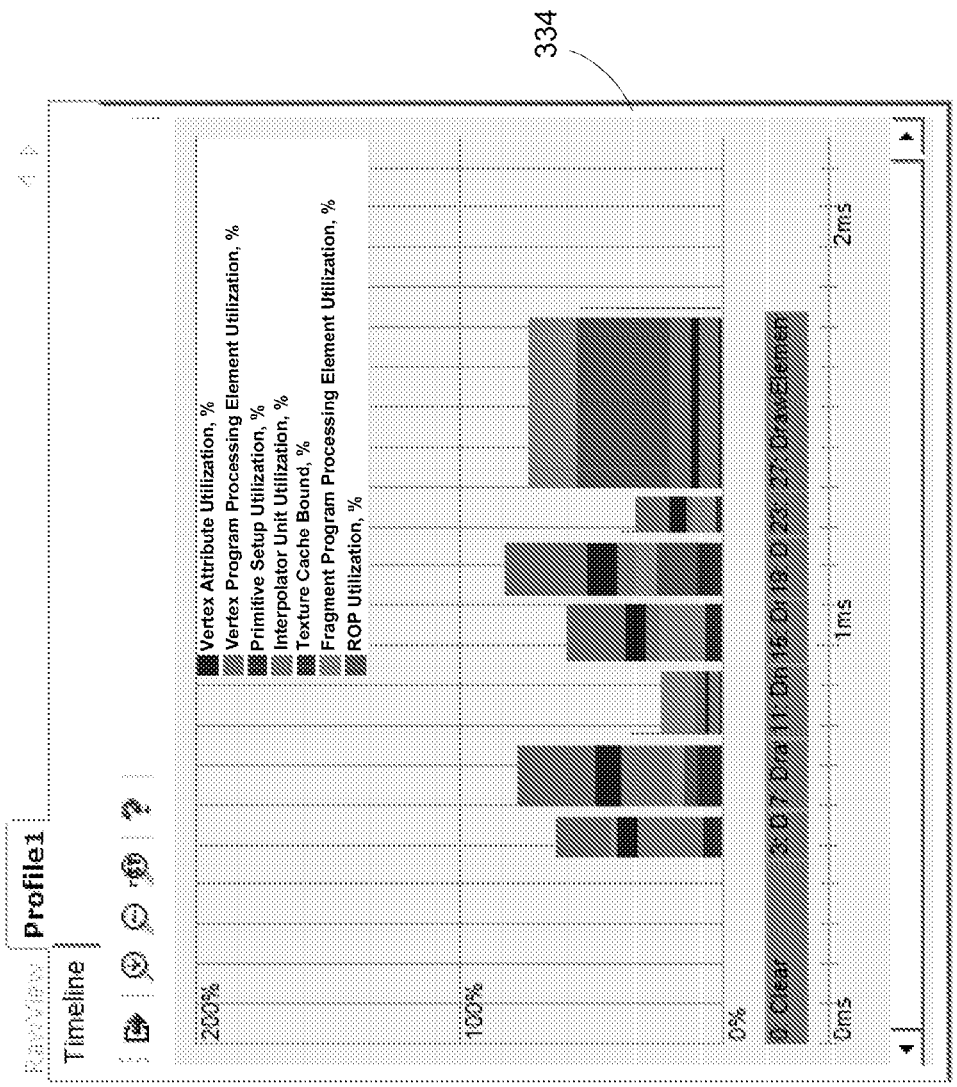
FIG. 23A and FIG. 23B illustrate exemplary graphical illustration of a profile in accordance with one embodiment of the invention.
Figure 23B:
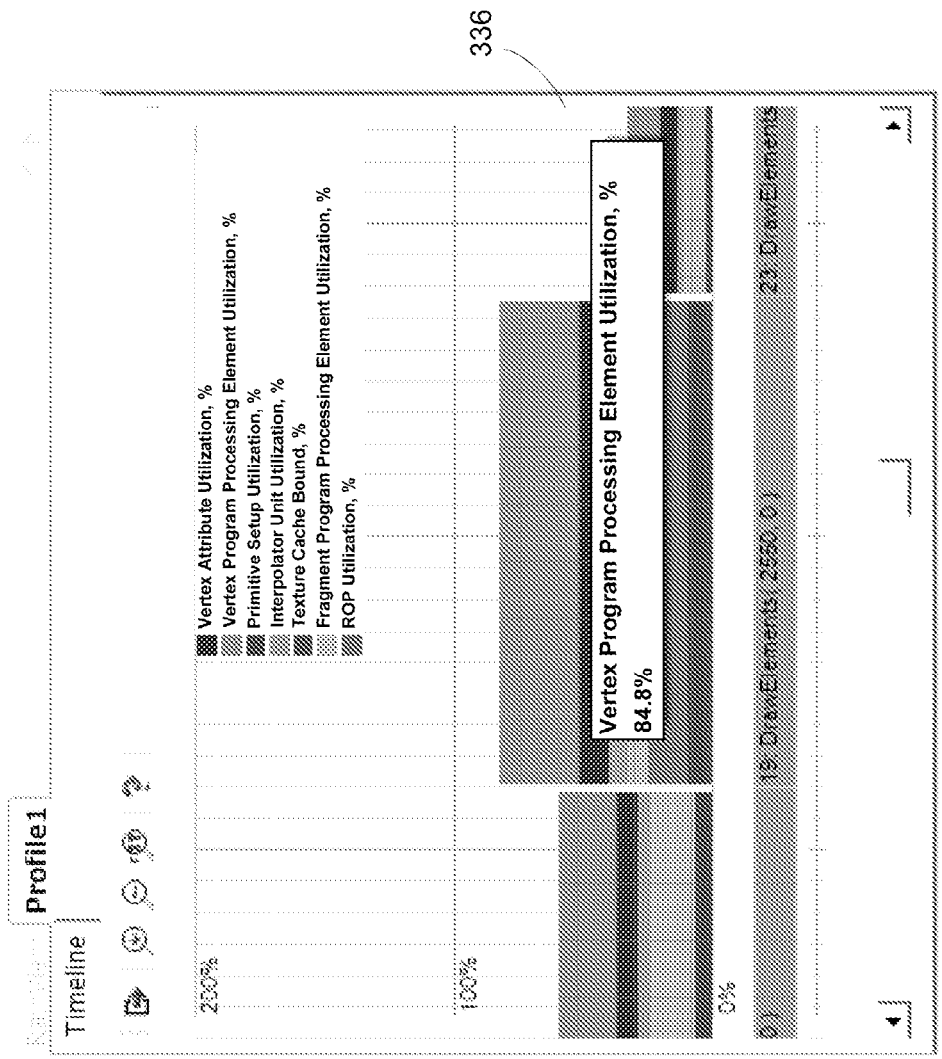

For example, as illustrated in FIG. 23B where the tallest bar for a specific draw context is for the vertex program processing element utilization, the developer might consider optimizing the vertex program or reordering the indices to utilize the post-transform cache better. It should be appreciated that the subunit utilization profiles of 23A and 23B show the present utilization of the major GPU subunits. Furthermore, the subunit utilization may be computed on a draw context basis with each subunit utilization drawn overlapped on the histogram. In one embodiment, the subunit utilization profiles provide a sorted list of optimization targets. It should be further appreciated that the width within each of the graphs of windows 334 and 336 is proportional to the time taken to perform the corresponding rendering aspect.

Figure 24A:
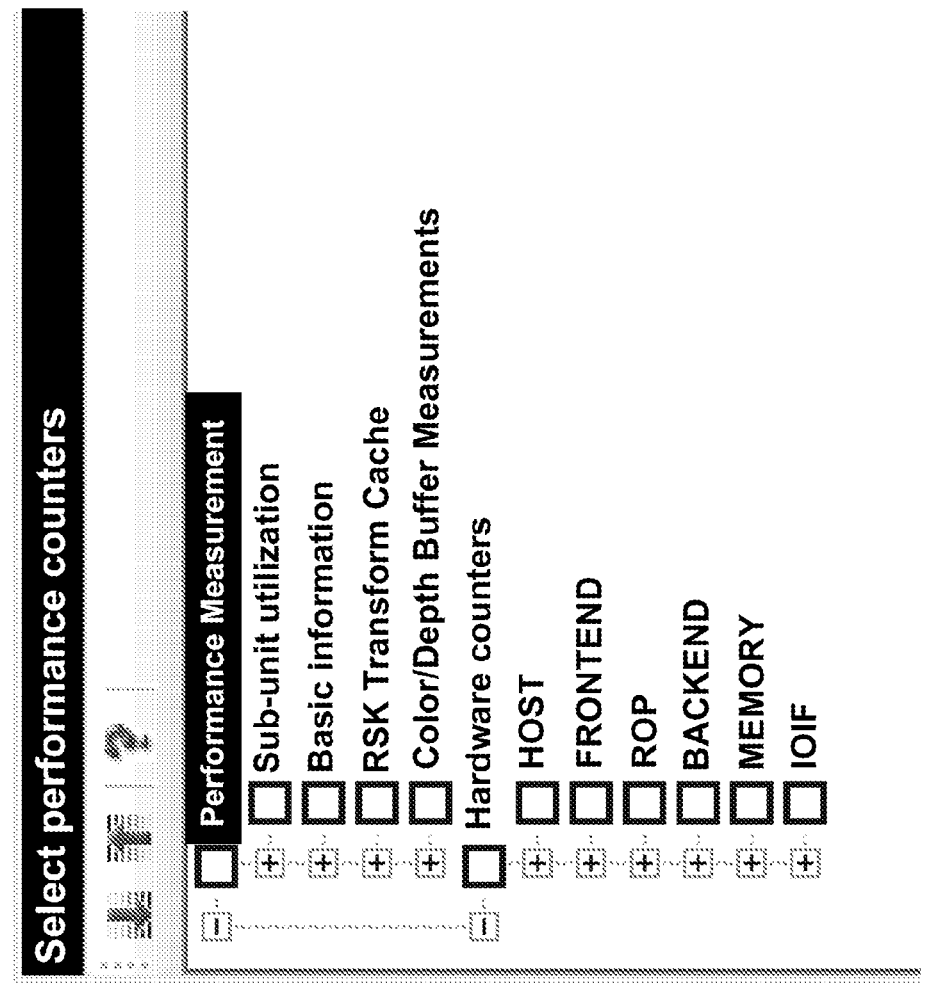

FIGS. 24A and 24B illustrate graphical user interfaces directed toward the performance counters available for analysis in accordance with one embodiment of the invention. The performance counters provide detail with regard to derived counters and hardware counters of the GPU. The raw counter data may be displayed in tabulated form as illustrated in FIG. 24B. Alternatively, the data may be presented in graphical form where multiple counters may or may not be graphed simultaneously. It should be appreciated that the GCM tool will provide statistics based on these counters, such as the post transform cash hits/misses, effective fill rate, etc.

One of the responsibilities of a game engine is to look at all the objects in a scene and determine which are in the view frustum and should be rendered, and which are outside of the view frustum and should be skipped. Usually this is done with bounding spheres, which tend to be somewhat inaccurate as many objects which are completely off screen will still pass the bounding sphere test. Also, animated characters are extremely difficult to check against the view frustum. There are various inefficient options, such as using a bounding sphere large enough to include all possible poses, or complex options, such as using multiple bounding spheres centered on various joints. Thus, a developer may question how efficient the object culling is or how much performance gain there might be from better object culling.

The GCM tools described herein can analyze the object culling, among other features, and provide a complete analysis of the objects in the push buffer, as well as build a new push buffer with all off screen objects removed from the push buffer. The new push buffer is compared against the previous push buffer and the performance gain can be quantified. It should be appreciated that the tool described herein performs this analysis without altering a single piece of code within the application. That is, because the application is bypassed during the replay process while the push buffer characteristics are captured, the developer does not have to go through the painstaking process of rewriting the application code.

Figure 25A:
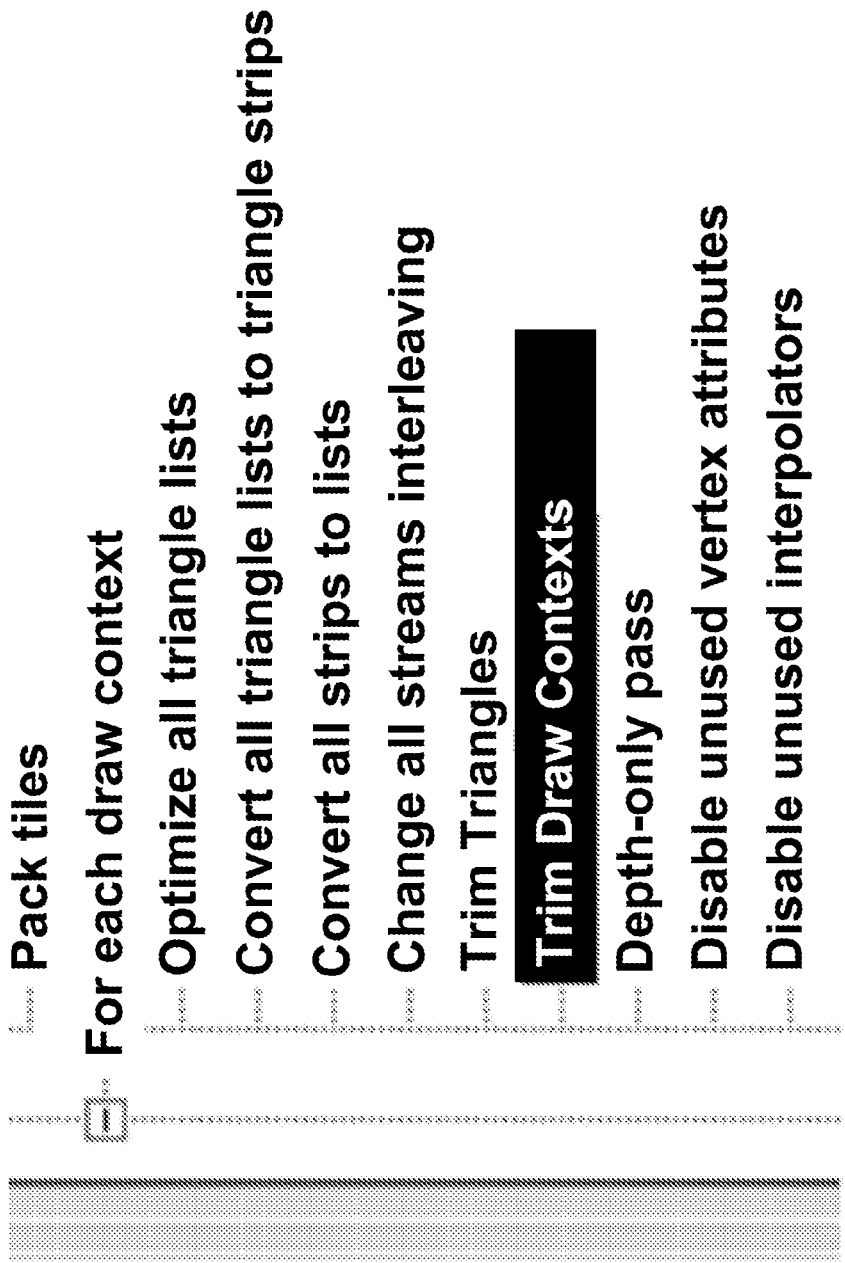
Figure 25B:
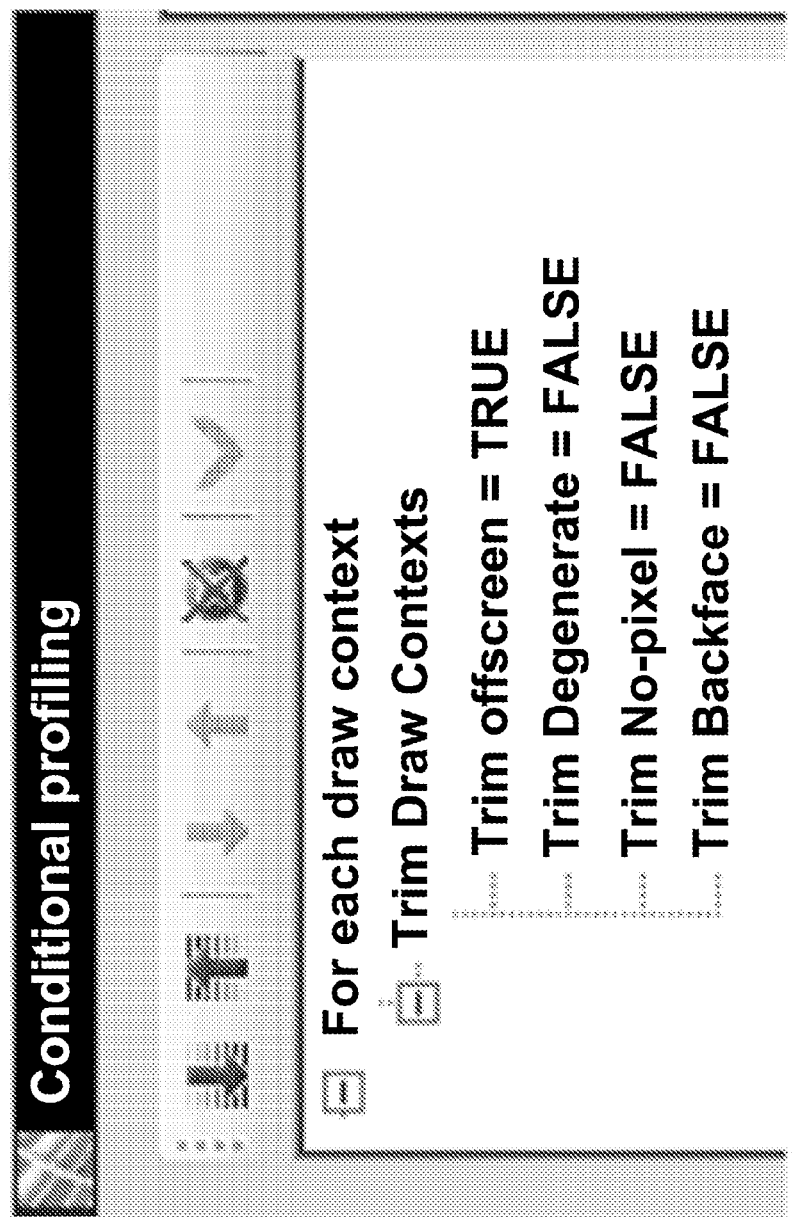

FIGS. 25A through 25D illustrate a culling process for optimizing the rendering of a frame in accordance with one embodiment of the invention. Initially, the developer would go to a conditional profiling menu and select for each draw context to trim draw context as illustrated in FIG. 25A. In FIG. 25B, details of the trimming process are selected and in this particular instance, a developer selects to trim off screen but not a) degenerate, b) no pixel or c) back-facing triangles.

The developer will then select the profile button and the results will be processed through the GCM tool. For each rendering call, the GCM tool will look at the vertex positions passed to the triangle assembly unit for each triangle, and determine if any of the triangles are on screen. Once the tool identifies the objects that are on screen, the tool creates a new push buffer containing just those objects and re-times the frame. In one embodiment, the entire process may take a minute or two. The results are illustrated in FIG. 25D where window 340 provides an overview indicating that a 33% gain was achieved when comparing the rendering of the frame with the push buffer having the off screen objects and the frame with the push buffer having only on screen objects.

Thus, a developer who sees the a potential 33% gain should look at changing the way in which objects are checked against the view frustum. The test described above with regards to FIGS. 25A through 25D may be referred to as a "what if" test or profiling. That is, a developer may ask, "what if my culling were perfect?". Here, the culler would cull on a per-triangle basis, etc. In another embodiment, there is a redundant command "what if," which identifies redundant commands. The redundant command "what if" creates a new push buffer with all redundant commands removed and measures the increased performance.

Figure 25C:
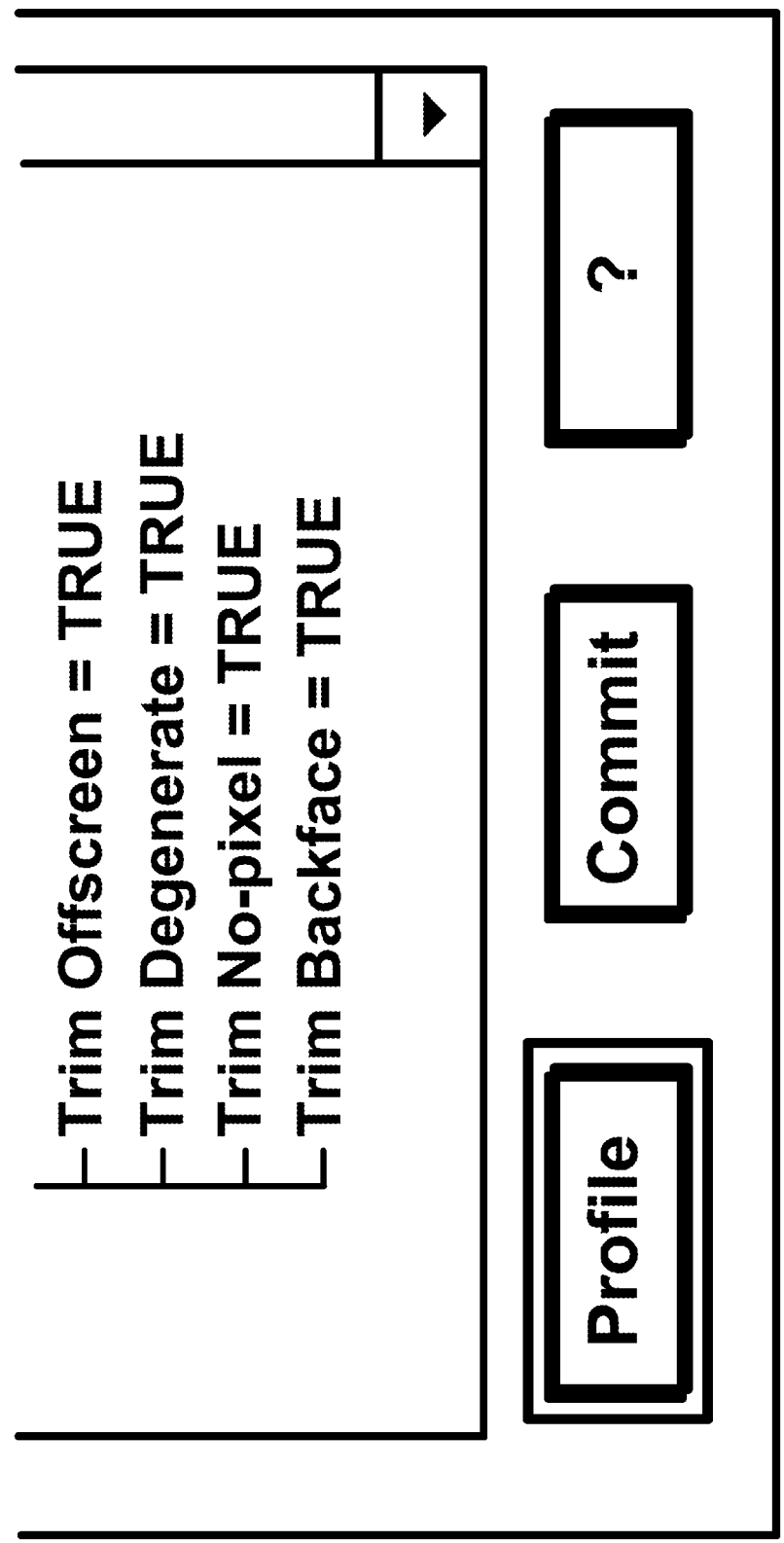

With reference to FIG. 25C, it should be noted that selecting the profile button would compare the profiles of the push buffers without committing the changes of the modified push buffer to the original push buffer. Alternatively, selecting the commit button will commit the changes of the modified push buffer to the original push buffer.

Figure 26A:
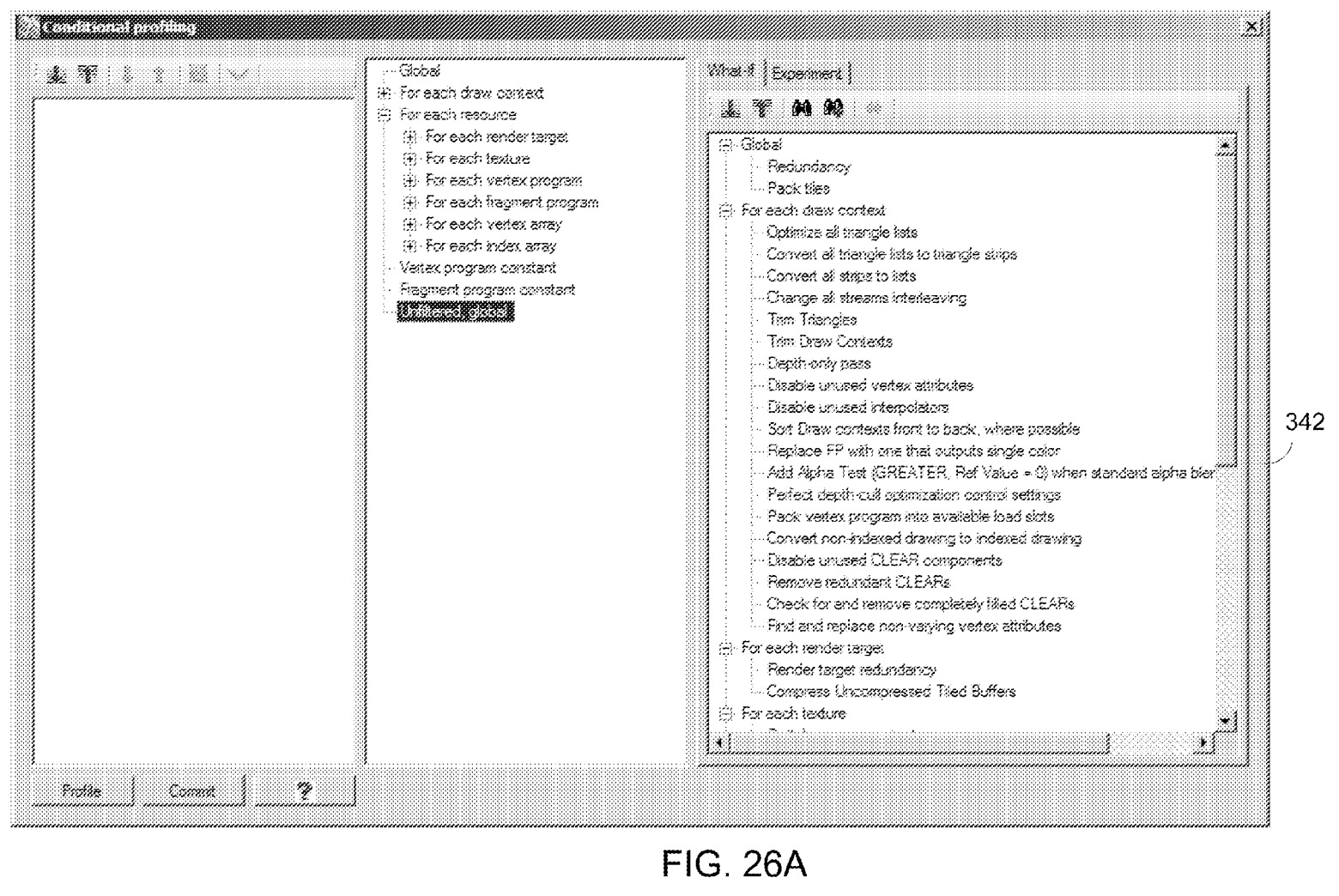
Figure 26B:
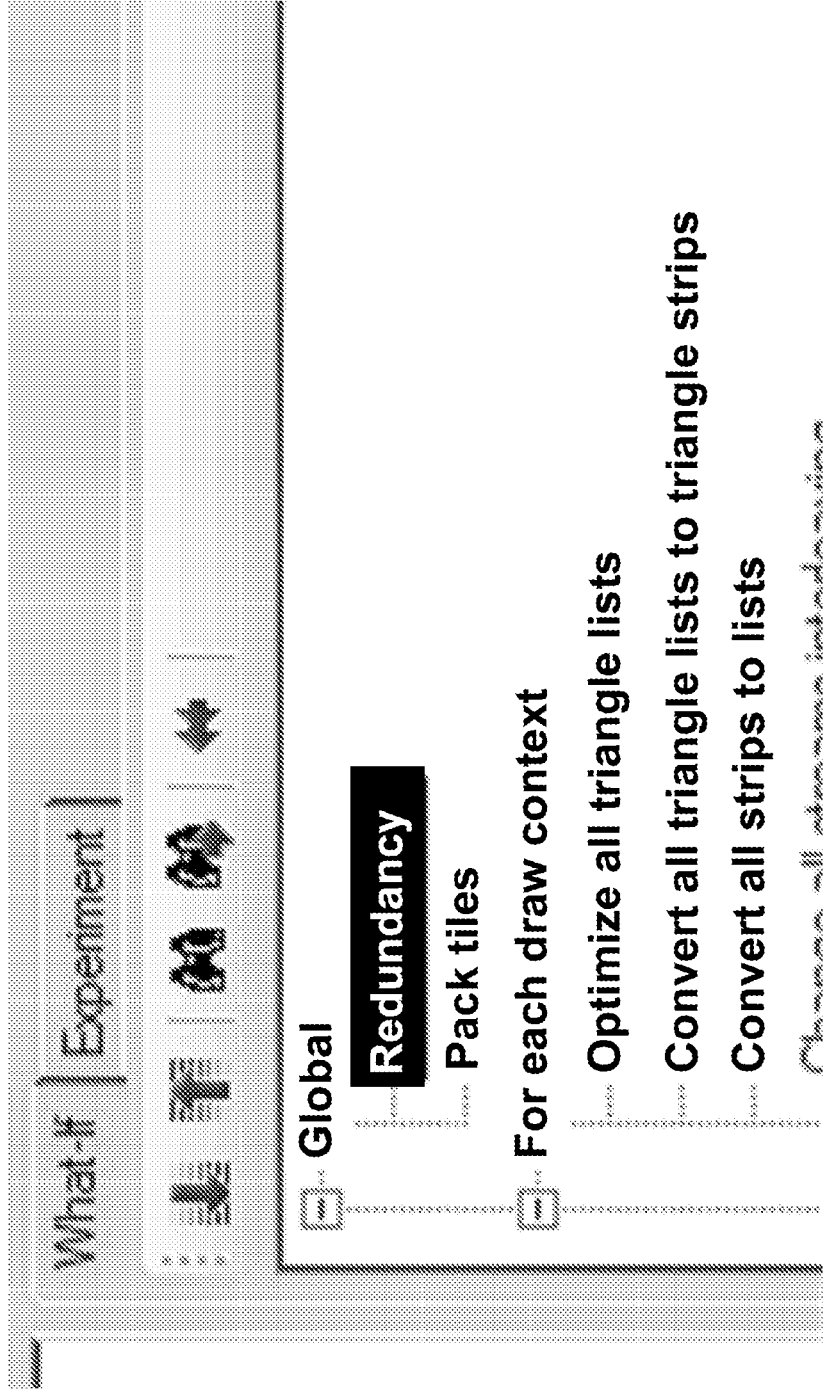
FIGS. 26A through 26O illustrate several sequences of events a developer may proceed through when applying various "What-If" performance optimizations in accordance with one embodiment of the invention.

FIGS. 26A through 26C illustrate the sequence of events a developer may proceed when applying the redundant command "what if." In FIG. 26A, "what if" window 342 is provided in which a developer will select the redundancy "what if." In FIG. 26B, the redundancy "what if" is selected and the profiles are compared in FIG. 26C. There are a number of other "what if" profiling options illustrated in FIGS. 26D through 26O.

In addition, FIGS. 27A-E illustrate performance optimizations that may be referred to as experiments, which apply and iterate one or more "what ifs" or performance optimizations in order to provide a recommendation for optimal settings for the game or application being rendered. These experiments are further described below along with implementation techniques and exemplary results that may be displayed. It should be appreciated that the list of performance experiments is exemplary and not meant to be limiting. That is, any performance experiments that provide information to optimize the rendering of a frame of image data may be included with the tool described herein.

In one experiment, illustrated in FIG. 26D the scene is reorganized such that the objects are rendered front to back to maximize depth culling performance. This sorting is done in a manner that does not disturb the relative rendering order of alpha blended draw calls. Initially, groups of draw calls are created where a group consists of all draw calls that can be sorted differently without changing the output.

In one embodiment, grouping across render target changes, blending state changes, clears, fragment program changes, fragment program constant sets, vertex program changes, vertex program constant sets, or depth function is not allowed. Other minor render state changes should be associated with a draw call and the appropriate register sets should move or be created if necessary after the sorting. The positional extents of each draw call are identified and the closest z extent is selected as the value to sort with. The draw calls are sorted in each draw group according to the closest z extent of each draw call and the performance is measured.

The results are displayed to illustrate any performance gain from the object sort. One skilled in the art will appreciate that for the object sort, the order in which objects are displayed may be important. A front to back sort will improve the performance due to the early depth reject. Typically a game renders shadow maps, followed by opaque geometry, translucent geometry, and finally full screen effects such as blur and bloom. The GCM tool can determine if sorting the shadow map and opaque geometry rendering calls by distance will improve performance in this embodiment.

A depth only pass performance optimization, illustrated in FIG. 26E, will measure the performance impact of inserting a depth (Z) only rendering call for each opaque object. It should be noted that this may or may not help performance. For example, if the bottleneck is in the vertex attribute read or vertex shader program, then the performance may actually decrease if a Z pass is added. In this optimization for each render target which writes to both the color and depth buffers, the scene is rendered twice. First the scene is rendered with the color writes disabled and depth writes enabled. Then the scene is rendered with color writes enabled and depth writes disabled. The performance gain is measured and then the results are graphically displayed.

Figure 26G:
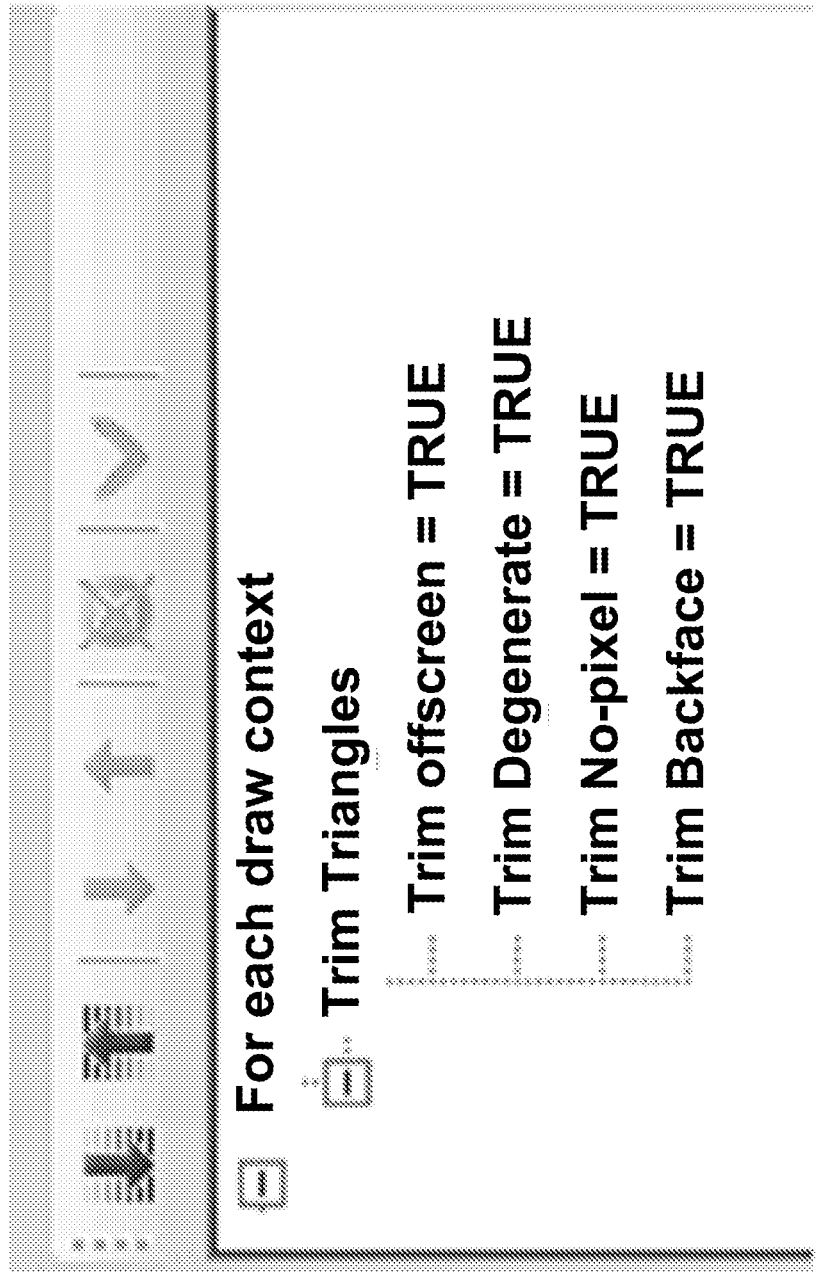
Figure 26H:
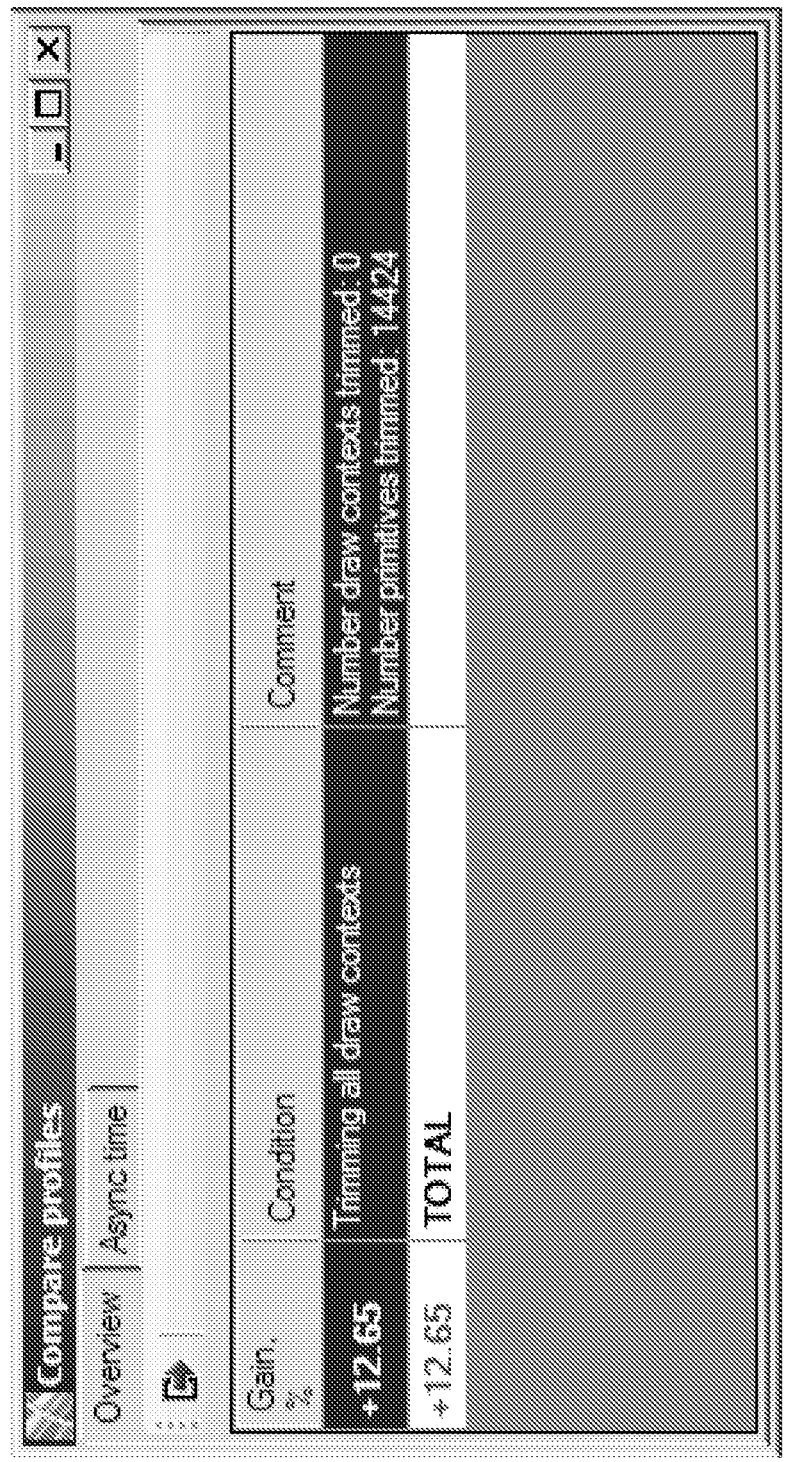
Figure 26J:
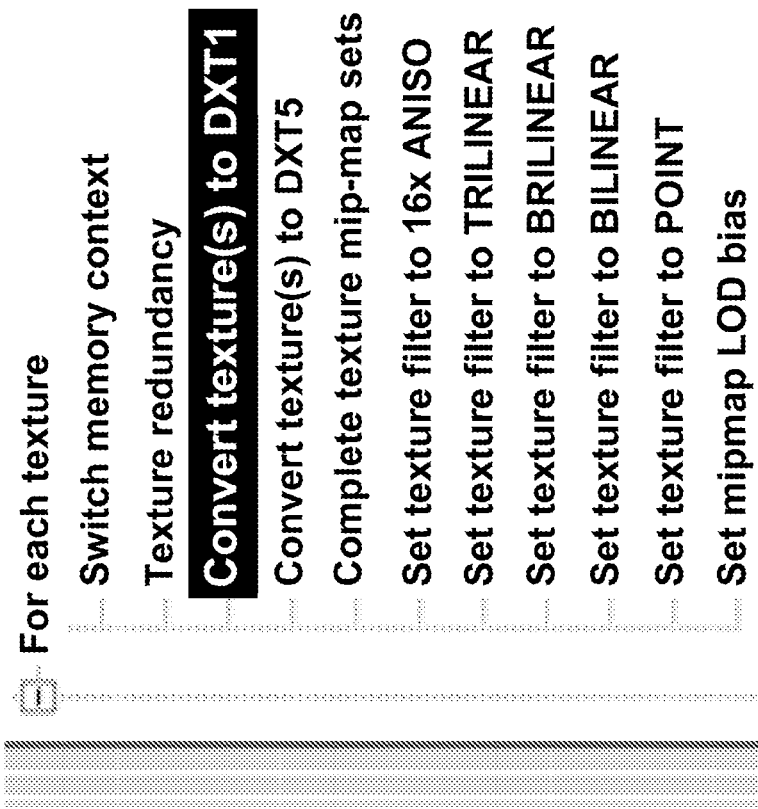

A triangle trim optimization, illustrated in FIGS. 26F-H, performs various checks on the triangles before passing them along to the pixel units. If a triangle is outside of the view frustum, the triangle is cut. If a triangle is facing the wrong way, the triangle is cut. If the triangle has zero area, the triangle is cut, which may occur frequently when doing level of detail (LOD) by progressive mesh. Finally, if the triangle is too small to encompass a pixel center, the triangle is cut. It should be appreciated that the GCM tool can perform checks on the back face, offscreen, degenerate, and no pixel triangles as mentioned above. In other words, the tool will provide the performance increase if this kind of synergistic processor unit (SPU) system is adopted. Exemplary triangle trim options are listed below.

Trim Off-screen Triangles

For each draw call, find the triangles which are off-screen, remove them from the vertex array or index array, and measure the performance gain. The triangle vertices are transformed by the viewport transformation and any triangle for which no vertices, edges, or area intersect the screen area are culled. The representation illustrates how many triangles were removed for each draw call and the performance gain from removing them.

Trim Back-facing Triangles

If back-face culling is enabled, for each draw call find the triangles which are back-facing, remove them from the vertex array or index array, and measure the performance gain.

$$(x1-x0)*(y2-y0)-(x2-x0)*(y1-y0)<(-e)(|x1-x0|+|x2-x0|+|y1-y0|+|y2-y0|+2)$$

where triangle=$((x0,y0),(x1,y1),(x2,y2))$ and
$e=FLT\_EPSILON$ (Eqn 1)

After transforming the triangle vertices by the viewport transformation, Eqn. 1 is applied to determine which triangles are back-facing and should be removed. This test is then verified by splitting each back-facing triangle into a separate draw call, re-rendering with depth comparisons, alpha testing, and stencil comparisons disabled, and requesting a report of the number of pixels written from the GPU. Triangles which were determined to be back-facing and which did not write to any pixels are then removed. The interface presenting the results illustrates how many triangles were removed and the performance gain from removing them for each draw call.

Trim Degenerate Triangles

The triangles which are degenerate are located and removed from the vertex array or index array and the performance gain is measured.

$$(v0=v1)\|(v0==v2)\|(v1=v2)$$

where $v0=(x0,y0)$ and $v1=(x1,y1)$ and $v2=(x2,y2)$ and
triangle=$(v0,v1,v2)$ Eqn. 2

After transforming the triangle vertices by the viewport transformation, Eqn. 2 is applied to determine which triangles are degenerate and should be removed. The interface presenting the results illustrates for each draw call how many triangles were removed and the performance gain from removing them.

Trim No-pixel Triangles

For each draw call, the triangles which don't hit any pixel centers are identified and removed from the vertex array or index array to measure the performance gain. Each triangle is verified by separating it into a separate draw call, re-rendering with depth compares, stencil compares, and alpha testing disabled, and requesting a report of the number of pixels written from the GPU. Any triangles which did not write any pixels are then removed from the index or vertex array. The interface presenting the results illustrates how many triangles were removed for each draw call and the performance gain from removing them.

Figure 26K:
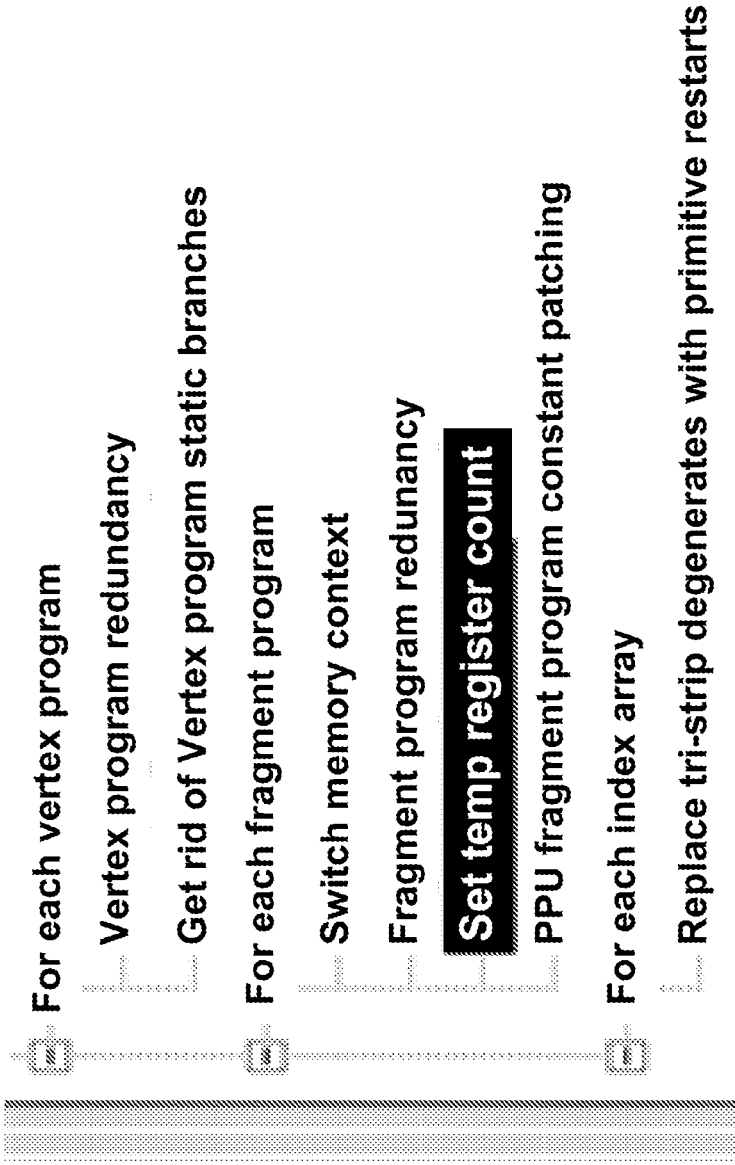
Figure 26L:
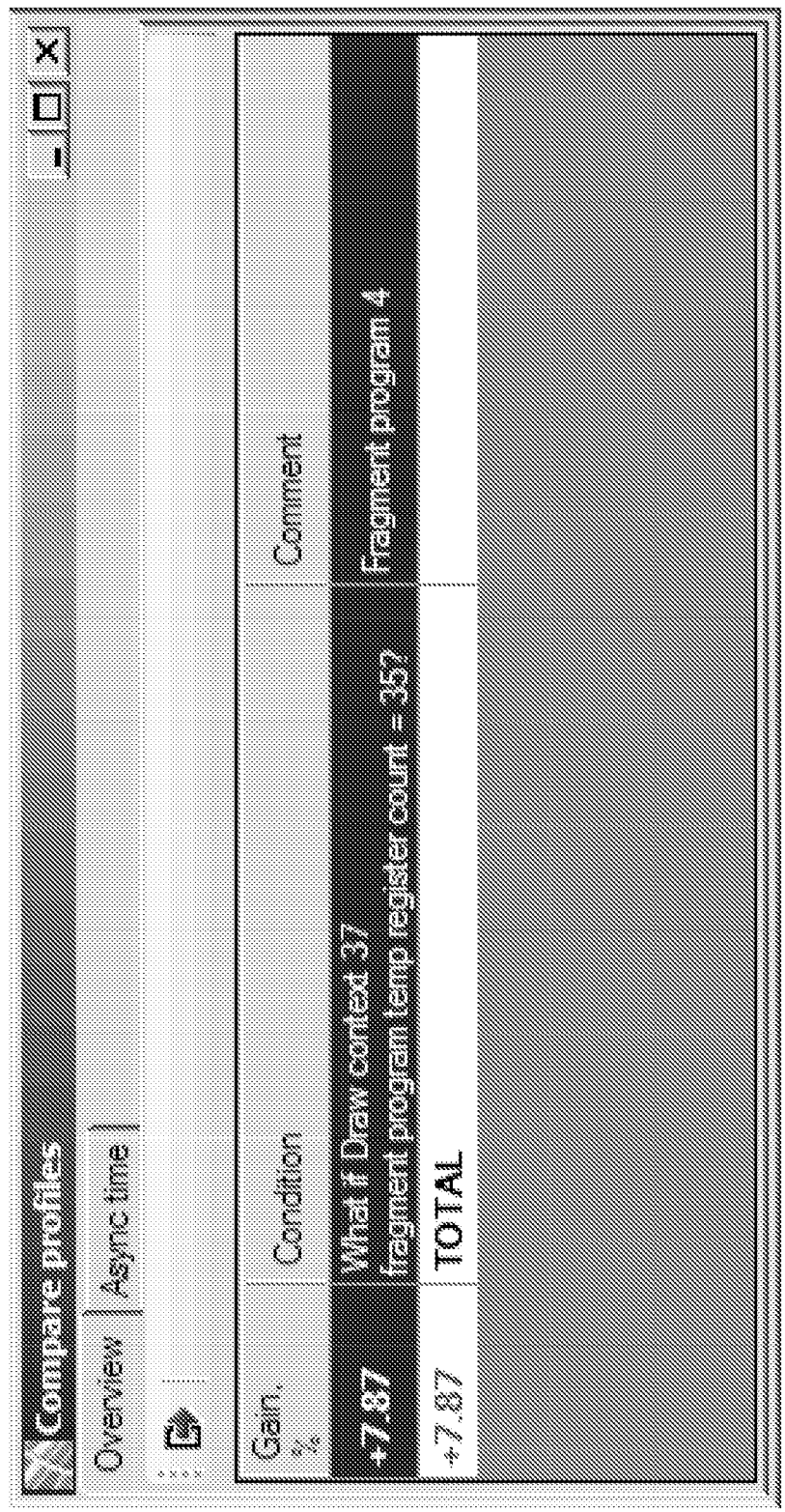
Figure 26O:
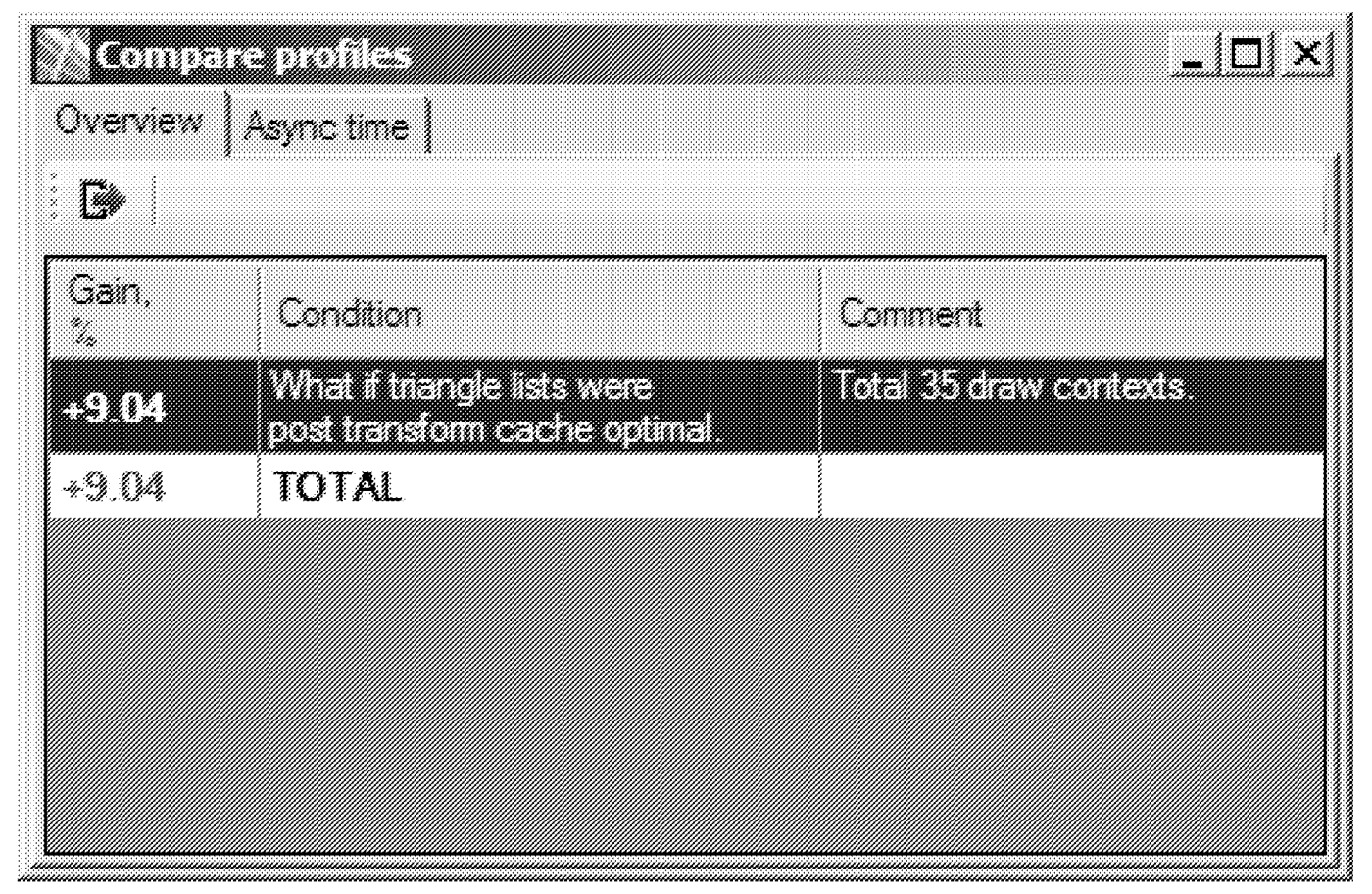
Figure 27A:
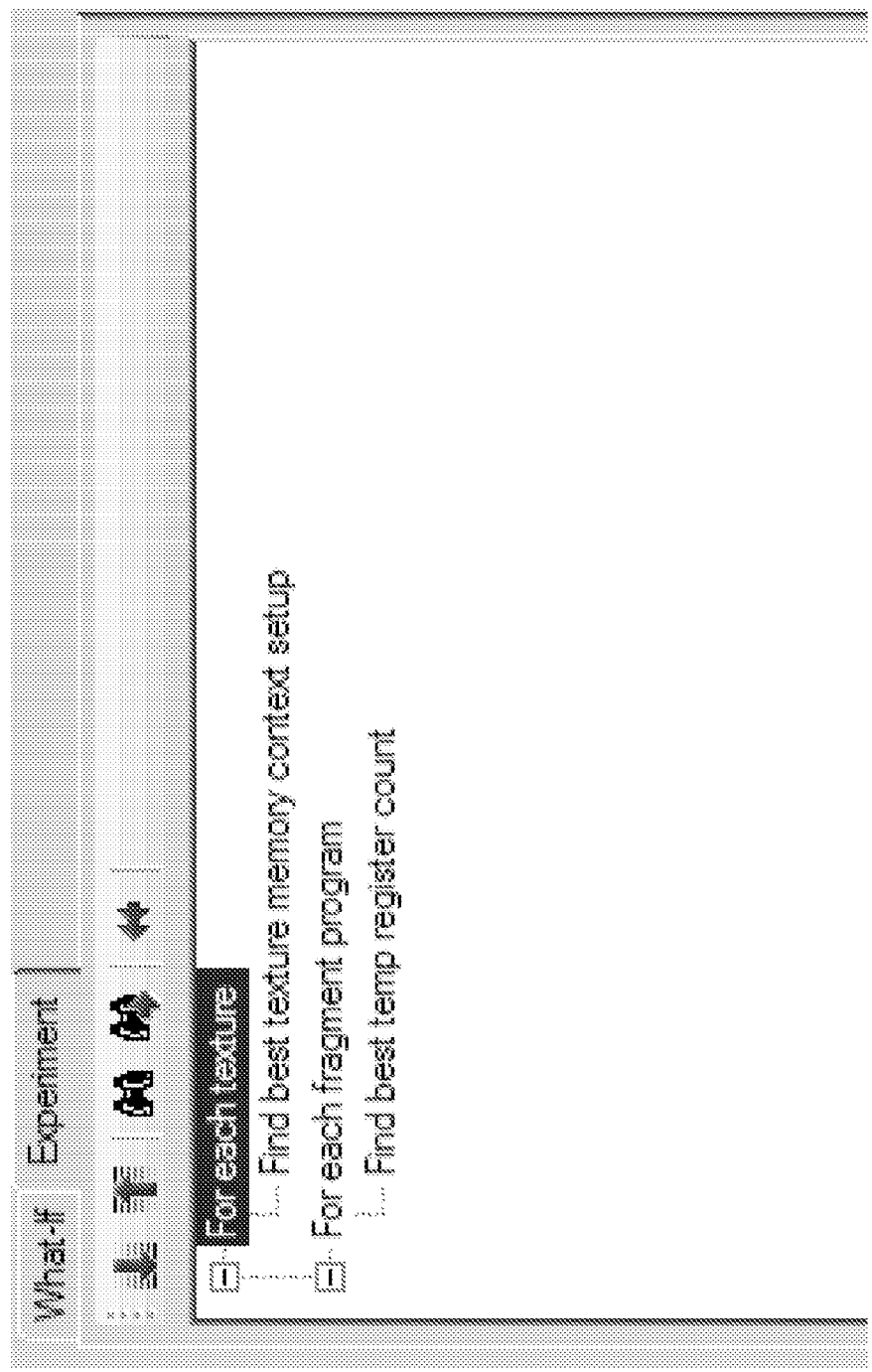
Figure 27B:
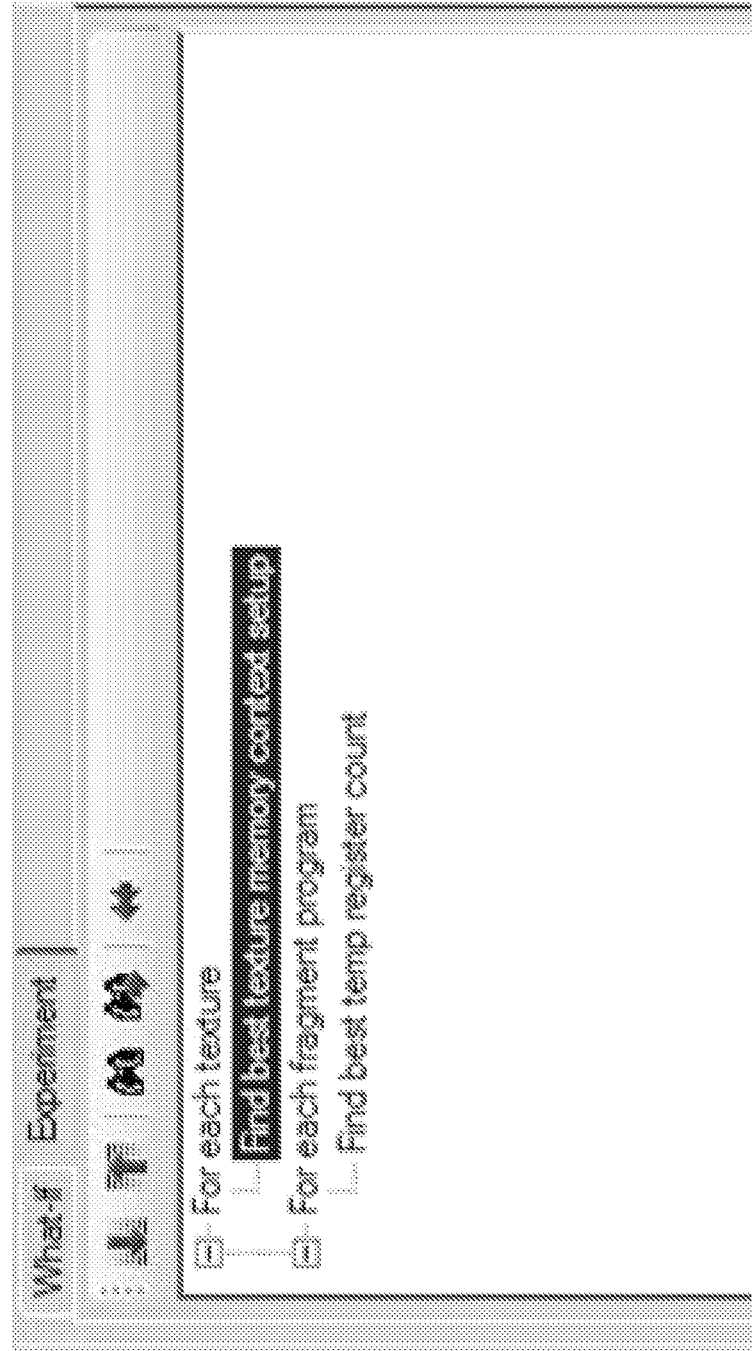
Figure 27D:
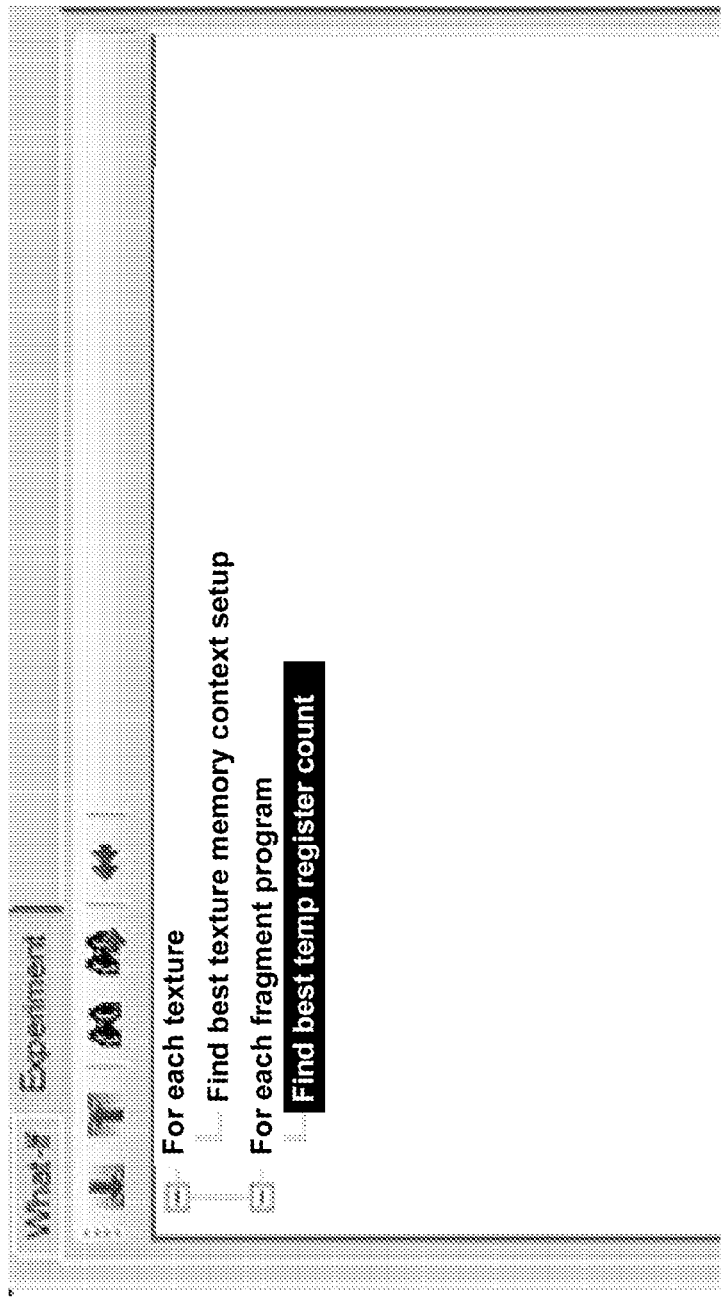

In one embodiment, the length of the pixel pipe can be changed on a per object basis by manipulating the "temp register count", which can be set using the libgcm call cellGcmSetRegisterCount. If the temp register count is set high, then there will be fewer pixels in each pixel pipe. This can help the performance of smaller objects, as it improves the distribution of pixels between the pipes. This can also help the performance of full screen effects, which may be overworking the texture cache. Using this "what-if" as illustrated in FIGS. 26K-L, a developer can see the performance increase or decrease as the value of the temp register count changes, either for a particular rendering call or for the scene as a whole.

In another embodiment, the triangle format can be changed to determine performance impact. There are various ways to display a triangle on the GPU: triangles, triangle strips, indexed triangles, and indexed triangle strips, to name a few. In one embodiment, indexed triangles have the highest performance. If a non-indexed drawing is being used then using the "convert non-indexed drawing to indexed drawing" optimization as illustrated in FIG. 26M will show the performance gained by changing to indexed triangle lists. There is also a "what if" to optimize triangle lists, illustrated in FIG. 26N-O. The potential performance to be gained is determined by using the vertex cache optimizer. The vertex cache optimizer is a tool that chooses a near ideal set of indexed triangles and optimizes not only to minimize post-transform cache misses, but also for the four vertex mini cache that is used in triangle assembly on the GPU. Further optimizations are listed below.

Vertex Attribute Array Context Locations

A function would move each vertex stream to either main or video memory and record the performance measurements of each. Thus, a particular breakdown illustrating the performance achieved by switching vertex streams between the main memory and the video memory can be generated with the context the vertex stream was moved to.

Interleaved Vertex Attribute Arrays

In this embodiment, each vertex array would be assigned to a category of either instanced or unique by noting which vertex arrays are used more than once. These lists would then be broken down into object lists by making note of which instanced vertex arrays are used together. With this information, for each category of vertex array for each object, the vertex arrays can be interleaved together. The interleaved vertex arrays are set instead of the original ones for each draw call and the performance difference is measured. The results can be displayed graphically for each object instance by displaying the performance gain from interleaving the attributes.

Interleaved Vertex Attribute Array Context Locations

The implementation of this experiment utilizes the interleaved vertex attribute arrays experiment followed by the vertex attribute array contexts experiment, both of which are listed above. Here, for each object instance, the performance gain and the context the vertex attribute array was moved to are displayed.

Find Unused Enabled Vertex Attribute Arrays

In another exemplary experiment, it is determined if there are any unused enabled vertex attribute arrays for each draw call by comparing the vertex attribute mask to the enabled vertex attribute arrays. The unused arrays are disabled and the performance gain is measured by disabling these vertex attribute arrays. A graphical presentation of the results may include displaying the vertex shader and draw calls where the vertex attribute array was unused for each unused enabled vertex attribute array, as well as the overall performance gain from disabling these attributes appropriately.

Mesh Re-optimization Using Our Soon-to-be-invented Perfect Mesh Optimizer

In this experiment, the vertex arrays and index arrays are run through a mesh optimizer for each object instance and the performance gain is captured. For each object instance, a display of the performance gain, as well as the difference of pre-transform and post-transform cache misses may be presented.

Find Unused Interpolaters

In this experiment, for each vertex program and each fragment program combination, any unused interpolaters are identified by inspecting the vertex program output mask and the fragment program instructions. Any unused interpolaters are disabled by modifying the vertex program output mask. The performance gain is then measured. The resulting display for each vertex program and fragment program combination, illustrates the unused interpolaters and the resulting performance gain from disabling the unused interpolaters.

Color Buffer Context Locations

For each color buffer, move the color buffer to the opposite location the color buffer currently resides and measure the performance difference. In one embodiment, tile settings are maintained (except compression) when moving the buffer. For each unique color buffer, the performance difference from moving the color buffer to the opposite context that it currently resides is measured. If the performance improved, create a "what-if" which changes the color buffer's context to that context. Of course, any overlapping texture or depth buffer contexts are relocated to the same context. For each color buffer, the performance difference from moving the buffer may be displayed.

Depth Buffer Context Locations

For each depth buffer, move the depth buffer to the opposite context it currently resides and measure the performance difference. Tile settings (except compression) are maintained when moving the buffer. For each unique color buffer, the performance difference from moving the depth buffer to the opposite context that it currently resides is measured. If the performance improved, create a "what-if" which changes the depth buffer's context to that context. Of course, any overlapping texture or depth buffer contexts are relocated to the same context. For each depth buffer, the performance difference from moving the buffer may be displayed, where the buffer was moved to, and the tile settings, if any.

Fragment Program Register Count In this experiment, for each fragment program, try every possible register count and find the smallest register count with the best performance. The performance gain and the register count used for each fragment program can be displayed.

DXT1 Textures

In this experiment, dxt1 compression can be applied for each texture which does not have varying alpha (always on or always off). All related texture format commands are updated and the performance gain is measured. One skilled in the art will appreciate that DXT1 only supports binary alpha. In one embodiment, a user definable error tolerance for an alpha being always on or off is set. The performance gain for each applicable texture, the new texture, and a screen shot of the scene can be presented. In one embodiment, the ability to export the new texture is provided.

DXT3/5 Textures

For each texture which is not dxt1 compressed, dxt3/5 compress the texture and update all related texture format commands to measure the performance gain. The performance gain for each applicable texture, the new texture, and a screen shot of the scene can be presented. In one embodiment, the ability to export the new texture is provided.

Find Unused Cleared Stencil Buffers

In this experiment, for each clear command with the stencil bit enabled, the stencil mask and stencil ops are checked for the lifetime of the depth/stencil buffer in the push buffer. If the buffer was never used, the stencil bit is removed from the clear command and the performance gain measured. The performance gain is displayed as well as the clear command with the unnecessary stencil bit.

Find Unused Cleared Depth Buffers

In this experiment, for each clear command with the depth bit enabled, the depth mask and depth function are checked for the lifetime of the depth/stencil buffer in the push buffer. If the buffer was never used, the depth bit is removed from the clear command and the performance gain measured. The performance gain and the clear command with the unnecessary depth bit may be displayed.

Find Unused Cleared Color Buffers

In this experiment, for each clear command with the color bits enabled, the color mask and blend functions are checked for the lifetime of the color buffer in the push buffer. If the buffer was never used, the color bits are removed from the clear command and the performance gain measured. The performance gain and the clear command with the unnecessary color bits are presented in one embodiment.

Alpha Test with Alpha Blend

In this experiment, for each blend function where the blend equation is add and the function is src alpha and inv src alpha, the lifetime of the setting is determined and the alpha test is set greater with a reference of 0. The performance gain is measured and displayed as well as the location of where the new alpha commands added.

Texture Context Locations

A texture context location experiment follows the following processes:
  a) Each texture having an array which contains links to every other texture used with this texture over all draw calls is identified. For each texture which does not and for each draw call that uses the texture which does not contain links, a link to the other textures that are used in the draw call is generated.
  b) Texture Group Generation—Here, for each texture, add to the texture list to traverse. For each texture in the texture list, create a new texture group and add this texture to the group and recursively add all textures that are linked to this texture to the texture group. Anytime a texture is added to a group, remove the texture from the texture list to traverse.
  c) For each texture group, if the number of textures in the group is greater than 6, sort the textures in the group by the largest memory footprint to the smallest memory footprint. Let v be the count of texture memory which is in video memory and set it to 0. Let m be the count of texture memory which is in main memory and set it to 0. Let t be the amount of memory that the texture consumes. For each texture in the texture group, if m+t>v*0.6 then set the bit for this texture to video memory and v+=t else set the bit for this texture to main memory and m+=t.
  d) For each texture group, if the number of textures in the group is less than or equal to 6, have every texture's context in a texture group be represented by a bit. The resulting bit stream should be brute force profiled for every possible combination, choosing the best performing combination as the winner for the bit stream.
  e) For each texture, if the texture's context bit was changed from its original state, create a "what-if" which changes the texture's context to that context.

An alternative implementation for the texture context location experiment includes:
  After d) let s be the texture bit stream as it was computed in c) and d). Let b be the frame time of bit stream s. Let i be the iteration count. While i is not zero, decrement i. Stochastically mutate s by 5%. Let n be the frame time of the mutated bit stream. If n<b then set b equal to n and let s be equal to the mutated bit stream.

For each texture, the performance difference from moving the texture and where the texture was moved to, as well as the overall performance of moving all of the textures may be presented.

Tile Packing

In this experiment, for each tile with matching pitches and compression types, the tiles are combined into a single tile and move the containing resources appropriately. The previous and new tile layout with each tile's contents listed are displayed in one embodiment.

Tile Untiled Color Buffers

Here, if there are unused tiles, for each color buffer which is not tiled and not swizzled, tile the color buffer and measure the performance gain. For each applicable color buffer, the performance gain from the tiling and tile settings are displayed.

Tile Untiled Depth Buffers

Here, if there are unused tiles, for each depth buffer which is not tiled and not swizzled, tile the depth buffer and measure the performance gain. For each applicable depth buffer, the performance gain from the tiling and tile settings are displayed.

Compress Uncompressed Tiled Color Buffers

In this experiment, for each color buffer which is tiled in video memory, and not compressed, compress the color buffer and measure the performance gain. In one embodiment, only tiles which contain buffers of the same format are compressed. For each applicable color buffer, display the performance gain and tile settings.

Compress Uncompressed Tiled Depth Buffers

In this experiment, for each depth buffer which is tiled in video memory, and not compressed, compress the depth buffer and measure the performance gain. In one embodiment, only tiles which contain buffers of the same format are compressed. For each applicable depth buffer, display the performance gain and tile settings.

Tile Untiled Color Buffers and Compress them

For each unused color buffer which is not tiled and not swizzled, tile the color buffer and give the color buffer the optimal compression settings. Measure the performance gain for each applicable color buffer, and display the performance gain and tile settings.

Tile Untiled Depth Buffers and Compress them

For each unused depth buffer which is not tiled and not swizzled, tile the depth buffer and give the depth buffer the optimal compression settings. Measure the performance gain for each applicable epth buffer, and display the performance gain and tile settings.

Find Redundant Clears

In this experiment, it is determined if the buffer was already clear for each clear command. If the buffer was clear, remove the clear command and measure the performance gain. The performance gain and the double clear command may be displayed to a developer/user.

Find Completely Filled Color Buffers

Here, for each clear command with the color bits enabled, check the color buffer to see if all pixels have been written to after the lifetime of the current render target in the push buffer. If every pixel has a new color value in it, remove the color bits from the clear command and measure the performance gain so that the performance gain and the clear command with the unnecessary color bits may be displayed.

Ppu Fragment Program Constant Patching

For this experiment, a new fragment program is created with the constants already set in the program microcode for each fragment program and each draw call with a different set of constants. The constant sets are removed from the push buffer and replaced them with a set fragment program command to the new fragment program. The resulting display may include the performance gain for each fragment program, the number of program variations, and the size of the new variations in bytes.

Perfect Depth-cull Optimization Control Settings

The best depth-cull optimization control settings is identified for each render target using the depth cull reports and the algorithm described in CalculateDepthCullFeedback( ) function. For each render target, the best depth-cull optimization settings and the resulting performance gain are displayed.

Depth-cull Area Enable

Here, for each tiled depth buffer, if the depth cull area is not set for the depth buffer, the depth cull area is set and the performance gain measured. The performance gain from setting the depth cull area appropriately is then capable of being displayed.

Depth-cull Area Disable

Here, for each tiled depth buffer, if the depth cull area is set for the depth buffer, disable the depth cull area and measure the performance loss, which should reveal the efficiency of the depth cull. The performance loss from not using the depth cull is captured for presentation.

Depth Cull Re-population

With regard to each render target, if the depth cull is specifically invalidated or the depth function changes direction, re-populate the depth cull memory by rendering a large quad after the invalidation. The performance gain is measured and, for each render target, if the depth cull area was invalidated, the performance gain from re-populating the depth cull memory is displayed.

Complete Texture Mip-map Sets

In this experiment, for each texture which does not have a complete mipmap set, generate the complete mipmap set using a simple box filter and measure the performance difference. The performance gain from having a complete mipmap set is then available for display.

Trilinear Filtering

For each texture filter command which is using anisotropic filtering, the filtering is changed to trilinear filtering and measure the performance gain for display along with a screen shot of the scene.

Brilinear Filtering Optimization

For each texture filter command which is using trilinear filtering, iterate through all possible brilinear optimization values and measure the performance gains. A graph showing the relative performance gain to the brilinear optimization value used for each applicable texture and a screen shot of the scene may be generated for display.

Bilinear Filtering

For each texture filter command which is using trilinear or anisotropic filtering, change the filtering to bilinear and measure the performance gain. This experiment is very helpful for depth textures. Here again, the performance gain and a screen shot of the scene are available for display.

Point Filtering

In this experiment, for each texture filter command, change the filtering to point and measure the performance gain. This is very helpful for depth textures. For each applicable texture, the performance gain and a screen shot of the scene may be displayed.

Find Static or Non-varying Attributes

Here, identify vertex arrays in each draw call where the value is constant throughout the entire draw call. In place of setting this vertex array use SetVertexAttrib4f to set the value of the attribute array. If the entire vertex array is the same value across all draw calls, instead remove the vertex array and replace its setting command with the SetVertexAttrib4f command. The presentation for each draw call where any static attributes exist, includes the performance gain and the value to SetVertexAttrib4f. For each vertex array, if the entire vertex array was static display the overall performance gain for replacing the command with a SetVertexAttrib4f command and the value passed to SetVertexAttrib4f.

Perfect Vertex Attribute Packing

For each object instance and for each vertex program that the object instance is rendered with, find a compatible attribute for each attribute where the number of components of both attributes add to less than or equal to 4. Combine the streams into a single attribute and modify the vertex program accordingly to measure the performance gain.

a)—Find attribute arrays that are used with each other. For each unique attribute data array, for each draw call which uses that attribute array make a soft link from the current attribute array to the other attribute arrays used in the draw call, increment the count of number of times the current attribute array was used in a draw call, and keep a count of the number of times that each other attribute array was used with this draw call. Next, for each unique attribute array, for each soft link from that attribute array, if the count of number of times that the linked attribute array was used with the current attribute array equals the number of times that the current attribute array was used, then create a hard link to that attribute. After this point, the soft links are no longer used.

b) Find the vertex programs that are used with each vertex attribute array. For each unique vertex attribute array, create a list of vertex programs used with that attribute array by iterating through all of the draw calls that use the vertex array and adding each of the programs used at each draw call to the per-attribute array vertex program list.

c)—For each vertex program and each enabled input attribute of that vertex program, iterate through the vertex program instructions and generate a mask for each input which describes the used components of each input attribute. Take the resulting input attribute used component mask and combine it with each attribute array's used component mask. (Note that the used component mask is different from the stored component mask with is either x, xy, xyz, or xywz)

d)—For each unique attribute array and for each hard link of that attribute array of the same format, if the used attribute count of the linked attribute array plus the used attribute count of the current attribute array is less than or equal to 4 then combine the attributes into a single array and for each vertex program in the current attribute array's vertex program list, iterate through the program instructions and update any of the component masks and component swizzles according to the new layout. While changes were made, repeat d).

e)—Measure the performance gain for display from each operation performed in the implementation.

Use Vertex Program Sets

In this experiment, the push buffer is analyzed to find multiply set vertex programs and the vertex programs set between them. It is determined if all of these vertex programs can be packed together into the total available instruction slots. The push buffer is then modified to set all the vertex programs at the same time and then change each subsequent set into a execution slot change. Each vertex program that was packed together and the resulting performance gain is illustrated. In one embodiment, export functionality is provided to give the new vertex program sets.

Texture Mip-map Biasing

In this experiment, for each texture filter command, the mip-map is biased between 0 and 1 in increments of 0.1 to measure the performance gains. One exemplary display includes a graph for each texture filter command showing the relative performance gain to the mip-map bias used.

Multiple Render Targets Setup Replay Optimization

For each render target which has multiple render targets, ensure that each of the render targets are in the same context location and have the exact same tiling and compression settings. If they do not and there are enough unused tiles to tile the untiled buffers, change the attributes so that they are the same and measure the performance gain. It should be appreciated that this experiment is dependant on tile packing. For each applicable render target, display the performance gain, tiling settings, and compression settings for each buffer.

Use Indexed Drawing Instead of Non-indexed Drawing

Here, for each non-indexed draw call, create an index buffer and run it through a mesh optimizer to measure the performance gain. The display of the performance gain from making the non-indexed draw call indexed is one exemplary display.

Fragment Program Context Locations

For each fragment program, move the fragment program to the opposite location it currently resides and measure the performance difference. One exemplary display includes the performance difference from moving the program and where the program was moved to.

Find Static Branching in Vertex Programs

For each vertex program which contains branching based on constants, create multiple copies of the vertex program, one for each possible control path. Instead of changing the constant, set the appropriate new vertex program. In on embodiment, the vertex program may be rescheduled for optimal instruction ordering. For each applicable vertex program, display the performance gain and the constant being statically branched with as well as the new vertex programs. Also provide the ability to export the new vertex programs.

Main Memory Rendering Forwarding

For each render target that has a color or depth buffer in main memory, put all buffers in video memory. Then after rendering, add commands to the push buffer to blit the result of the rendering to main memory. Measure and display the performance gain.

Primitive Restart

For each indexed draw call which uses triangle strips, detect any pattern (ABCD+DEEF+EFGH or ABC+CD-DDE+DEF or ABC+CCDDE+DEF or ABC+CDDEE+DEF) in the index buffer which represents a degenerate triangle and replace it with a primitive restart index. Measure the performance gain and for each modified draw call, show the performance gain from using primitive restart.

Quantization

For each vertex array, find the range of each input. If the range is representable in a smaller type that it is currently described, convert the vertex array to that smaller type and measure the performance gain. It may be necessary to add and multiply instructions with constants to a vertex shader in order to re-map the smaller input to the larger one. The formula for re-mapping the inputs is (A*B)+C where A is the value input to the vertex program, B is the constant which moves this value into the original range, and C is the constant which offsets the value into the space where the original number was. From a tools perspective, the constant B can be defined by subtracting the minimum value in the vertex array from the maximum value in the array. The constant C is the minimum value in the vertex array. An input from the user of the program will define the minimum error tolerance allowed in this quantization. Table B represents minimum error tolerance range.

TABLE B

| Tables - | Value | Bit Depth | Range |
|---|---|---|---|
| U8N (LE) | 0 | 8-bit | 0 . . . 1 |
| I16N | 1 | 16-bit | −1 . . . 1 |
| F32 | 2 | 32-bit | −Inf . . . +Inf, Nan, s1e8m23 |
| F16 | 3 | 16-bit | −Inf . . . +Inf, Nan, s1e5m10 |
| U8N | 4 | 8-bit | 0 . . . 1 |
| I16 | 5 | 16-bit | −32768 . . . +32767 |
| Z10Y11X11 | 6 | 10/11bit | −1 . . . 1 |
| U8 | 7 | 8-bit | 0 . . . 255 |

The display for this experiment can include, for each vertex array and each input in that array which was modified, the new format and constants as well as the performance gain from making the modification.

Constant Folding

Constant folding is a technique for increasing vertex/fragment program efficiency by pre-calculating constant expressions. These pre-calculated constant expressions would be computed on the PPU and then uploaded as additional or replace existing vertex/fragment program constants. For example, the expression "mul(World, mul(View, Projection))" and the expression "sin(time)" could be evaluated by the PPU outside of the vertex/fragment program before it runs. Vertex/fragment program computations that can be moved are those associated with uniform parameters; that is, the computations do not change for each vertex or fragment. Constant folding can reduce the number of instructions per program and can also reduce the number of constant registers a program uses.

In one embodiment, an instruction graph is created. From this instruction graph, instructions are identified where all input values to the instruction are constant. Compute the result from this instruction and add this result as a constant. Repeat this process until no more constants can be folded together. All unused constants are removed. For each vertex/fragment program, the display can include the new program instructions and pre-shader as pseudo-code. Export functionality may be provided to give the new vertex program as well as the pre-shader itself in a simple C function.

Perfect Vertex Program Constant Packing

For each vertex program, find the used components of all constants. For each constant find another constant where the number of used components of both constants add to less than or equal to 4. Combine these constants together into a single constant, modify the push buffer and vertex program to reflect this change, and measure the performance gain. As mentioned above, care must be taken for constants that are used across several vertex programs.

a)—Create the component mask array—For each vertex program, iterate through the instructions marking the used components any used constants used with an explicit constant index (ignore offseted constant indexing). After this stage, an array of size 544 with 4 bits per entry is defined which represent the used components of each possible constant.

b) Vertex program constants as a reusable resource—For each vertex program constant set, for each draw call until the constant is overwritten with another constant and each vertex program used with the draw call, if the constant set is marked as used in the previously generated used component mask then link the vertex program and draw call to the constant set.

c)—Find constants that are used with each other—For each vertex program constant set and for each linked draw call, iterate through every other vertex program constant set which also has a link to that draw call and link that vertex program constant set to the current vertex program constant set.

d)—Find equally coincident constants—For each vertex program constant set and for each linked vertex program constant set, and if for each linked vertex program constant set's linked vertex programs which are not linked to the current vertex program constant set's linked vertex programs, remove the link from the current vertex program constant set to the linked vertex program constant set.

e)—Create used component masks—For each vertex program constant set have the default used component mask set to all components unused. Next, for each linked vertex program, combine the used component mask with the used component mask for the vertex program for that constant.

f)—Combine Constants—For each vertex program constant set and each linked vertex program constant set, if the number of used components of the constant set plus the number of used components of the linked constant set is less than or equal to 4 then combine the constants together and for each linked vertex program iterate through the instructions and update the explicit constant indexes, swizzles and masks for the updated constant. While changes were made, repeat f).

g)—Measure the performance difference.

The display includes, for each vertex program, the modifications to the input constants and resulting performance gain. Export functionality is provided.

Vertex Program Output Packing

For each vertex program, find the used components of all outputs. For each output, find another output where the number of used components of both outputs add to less than or equal to 4. Combine these outputs together into a single output and modify the vertex program and any corresponding fragment programs accordingly. Finally, measure the performance gain.

The display can show each vertex and fragment program that was modified and which outputs were combined, as well as, the resulting performance gain from these modifications. Export functionality is provided.

Swizzled Textures from Linear Textures

For each linear texture which is not Dxt compressed, convert the texture to a swizzled texture and update all related texture format commands. Measure the performance gain and for each applicable texture, display the performance difference from swizzling the texture.

Swizzled Textures from Tiled Textures

For each tiled texture which is not Dxt compressed, untile the texture and swizzle the texture data. Update all related texture format commands and measure the performance gain for display.

Find Unused Color Channels

For each texture and for each fragment program using that texture, find the used color channels of the texture. If the number of used color channels would allow the texture to be represented in a smaller texture format change the texture format and measure the performance gain. For each applicable texture, display the performance gain, a description of the previous and new texture format.

Find Static Branching in Fragment Programs

For each fragment program which contains branching based on constants and for each unique instance of that fragment program via constants, create multiple copies of the fragment program, e.g., one for each possible control path. Instead of changing the constant, set the appropriate new fragment program and redirect any related constant sets to that fragment program as well. In one embodiment, the fragment program is rescheduled for optimal instruction ordering. For each applicable fragment program, display the performance gain and the constant being statically branched with as well as the new fragment programs. Also provide the ability to export the new fragment programs.

Swizzled Render Targets from Linear Render Targets

For each render target which is linear, not a display render target, and has an associated texture, make the render target a power of two in width and height. Change the render target to a swizzled type and measure the performance gain for display.

Swizzled Render Targets from Tiled Render Targets

For each render target which is tiled, not a display render target, and has an associated texture, make the render target a power of two in width and height. Untile the render target's color and depth buffers and change the render target to a swizzled type and measure the performance gain for presentation.

Figure 28:
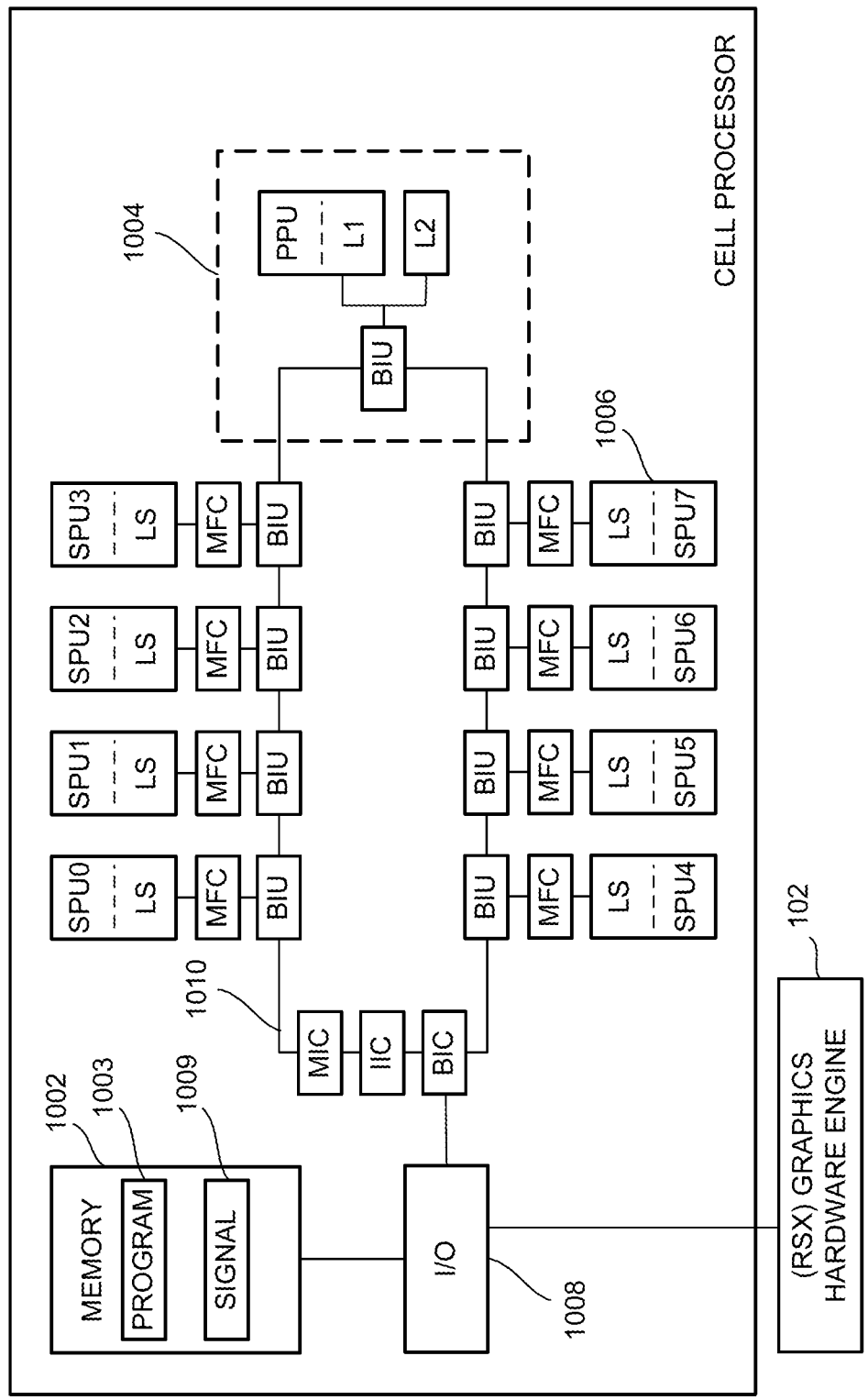
FIG. 28 provides an example hardware architecture that may be used to render graphics, although the invention is not limited to any type or brand of architecture.

By way of example, and without limitation, FIG. 28 illustrates a type of cell processor 1000 according to an embodiment of the present invention. In the example, the cell processor 1000 includes a main memory 1002, power processor element (PPE) 1004, and a number of synergistic processor elements (SPEs) 1006. In the example, the cell processor 1000 includes a single PPE 1004 and eight SPE 1006. In such a configuration, seven of the SPE 1006 may be used for parallel processing and one may be reserved as a back-up in case one of the other seven fails. A cell processor may alternatively include multiple groups of PPEs (PPE groups) and multiple groups of SPEs (SPE groups). In such a case, hardware resources can be shared between units within a group. However, the SPEs and PPEs must appear to software as independent elements. As such, embodiments of the present invention are not limited to use with the configuration shown.

The main memory 1002 typically includes both general-purpose and nonvolatile storage, as well as special-purpose hardware registers or arrays used for functions such as system configuration, data-transfer synchronization, memory-mapped I/O, and I/O subsystems. In embodiments of the present invention, a signal processing program 1003 may be resident in main memory 1002. The signal processing program 1003 may run on the PPE. The program 1003 may be divided up into multiple signal 1009 processing tasks that can be executed on the SPEs and/or PPE.

By way of example, the PPE 1004 may be a 64-bit PowerPC Processor Unit (PPU) with associated caches L1 and L2. The PPE 1004 is a general-purpose processing unit, which can access system management resources (such as the memory-protection tables, for example). Hardware resources may be mapped explicitly to a real address space as seen by the PPE. Therefore, the PPE can address any of these resources directly by using an appropriate effective address value. A primary function of the PPE 1004 is the management and allocation of tasks for the SPEs 1006 in the cell processor 1000.

Although only a single PPE is shown, some cell processor implementations, such as cell broadband engine architecture (CBEA), the cell processor 1000 may have multiple PPEs organized into PPE groups, of which there may be more than one. These PPE groups may share access to the main memory 1002. Furthermore the cell processor 1000 may include two or more groups SPEs. The SPE groups may also share access to the main memory 1002. Such configurations are within the scope of the present invention.

Each SPE 1006 is includes a synergistic processor unit (SPU) and its own local storage area LS. The local storage LS may include one or more separate areas of memory storage, each one associated with a specific SPU. Each SPU may be configured to only execute instructions (including data load and data store operations) from within its own associated local storage domain. In such a configuration, data transfers between the local storage LS and elsewhere in a system 1000 may be performed by issuing direct memory access (DMA) commands from the memory flow controller (MFC) to transfer data to or from the local storage domain (of the individual SPE). The SPUs are less complex computational units than the PPE 1004 in that they do not perform any system management functions. The SPU generally have a single instruction, multiple data (SIMD) capability and typically process data and initiate any required data transfers (subject to access properties set up by the PPE) in order to perform their allocated tasks. The purpose of the SPU is to enable applications that require a higher computational unit density and can effectively use the provided instruction set. A significant number of SPEs in a system managed by the PPE 1004 allow for cost-effective processing over a wide range of applications.

Each SPE 1006 may include a dedicated memory flow controller (MFC) that includes an associated memory management unit that can hold and process memory-protection and access-permission information. The MFC provides the primary method for data transfer, protection, and synchronization between main storage of the cell processor and the local storage of an SPE. An SFC command describes the transfer to be performed. Commands for transferring data are sometimes referred to as MFC direct memory access (DMA) commands (or MFC DMA commands).

Each MFC may support multiple DMA transfers at the same time and can maintain and process multiple MFC commands. Each MFC DMA data transfer command request may involve both a local storage address (LSA) and an effective address (EA). The local storage address may directly address only the local storage area of its associated SPE. The effective address may have a more general application, e.g., it may be able to reference main storage, including all the SPE local storage areas, if they are aliased into the real address space.

To facilitate communication between the SPEs 1006 and/or between the SPEs 1006 and the PPE 1004, the SPEs 1006 and PPE 1004 may include signal notification registers that are tied to signaling events. The PPE 1004 and SPEs 1006 may be coupled by a star topology in which the PPE 1004 acts as a router to transmit messages to the SPEs 1006. Alternatively, each SPE 1006 and the PPE 1004 may have a one-way signal notification register referred to as a mailbox. The mailbox can be used by an SPE 1006 to host operating system (OS) synchronization.

The cell processor 1000 may include an input/output (I/O) function 1008 through which the cell processor 1000 may interface with other modules, processors or peripheral devices. In one example, the I/O 1008 can interface with a graphics hardware engine 102 (of FIG. 1). An example commercially available processor (although others can also work), is a reality synthesizer (RSX).

In addition an Element Interconnect Bus 1010 may connect the various components listed above. Each SPE and the PPE can access the bus 1010 through a bus interface units BIU. The cell processor 1000 may also includes two controllers typically found in a processor: a Memory Interface Controller MIC that controls the flow of data between the bus 1010 and the main memory 1002, and a Bus Interface Controller BIC, which controls the flow of data between the I/O 1008 and the bus 1010. Although the requirements for the MIC, BIC, BIUs and bus 1010 may vary widely for different implementations, those of skill in the art will be familiar their functions and circuits for implementing them.

The cell processor 1000 may also include an internal interrupt controller IIC. The IIC component manages the priority of the interrupts presented to the PPE. The IIC allows interrupts from the other components the cell processor 1000 to be handled without using a main system interrupt controller. The IIC may be regarded as a second level controller. The main system interrupt controller may handle interrupts originating external to the cell processor.

In embodiments of the present invention, certain computations, such as the fractional delays described above, may be performed in parallel using the PPE 1004 and/or one or more of the SPE 1006. Each fractional delay calculation may be run as one or more separate tasks that different SPE 1006 may take as they become available.

The invention may be practiced with other computer system configurations including game consoles, gaming computers or computing devices, hand-held devices, microprocessor systems, microprocessor-based or programmable consumer electronics, minicomputers, mainframe computers and the like. The invention may also be practiced in distributing computing environments where tasks are performed by remote processing devices that are linked through a network. For instance, on-line gaming systems and software may also be used.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A system for conducting performance analysis on a frame of a multi-frame video sequence generated during execution of an application, the system including a processor, comprising:
   (i) a hardware engine configured to execute the application;
   (ii) a library capture module being configured to obtain push buffer data from the hardware engine, the push buffer data being for the frame, which is one frame of the multi-frame video sequence;
   (iii) a graphical user interface for presenting an interactive display of contents of the push buffer data, the contents defining a plurality of commands and data associated with each of the plurality of commands, the graphical user interface enabling access to make manual changes to the contents of the push buffer; and
   (iv) a replay module enabling re-execution of the push buffer data for the frame with any changes made through the graphical user interface;
   wherein the graphical user interface provides a plurality of performance analysis measurements that quantify differences in execution of the push buffer when changes to the push buffer are made;
   wherein the application includes a function call that can be triggered to cause a collection of push buffer data that is transferred to the library capture module;
   wherein the graphical user interface provides the access to make changes to the push buffer data without performing changes to the application, such that changes to the push buffer and re-execution of the push buffer with changes simulate performance of the application if modifications to the application had been made.

2. The system for conducting performance analysis as recited in claim 1, wherein the push buffer data is obtained from the transfer in an array of data.

3. The system for conducting performance analysis as recited in claim 2, wherein the library capture module generates a library populated with push buffer data that is obtained from the array of data.

4. The system for conducting performance analysis as recited in claim 3, wherein the library is accessed by the graphical user interface to populate the interactive display of contents of the push buffer data.

5. The system for conducting performance analysis as recited in claim 4, wherein the graphical user interface provides a plurality of menus and windows for representing the plurality of performance analysis measurements, and selected ones of the plurality of menus and windows enabling changes to the content of the push buffer data.

6. The system for conducting performance analysis as recited in claim 1, further comprising,
   what-if changes to the push buffer data, the what-if changes defining sets of changes to the push buffer data, the sets of changes being configured to simulate performance of the application if modification to the application had been made, but without changing code of the application.

7. A method for optimizing video frame rendering characteristics for a video frame of a plurality of video frames of an application, the method being executed by a processor, comprising:
   rendering the video frame;
   capturing push buffer settings representing the rendering of the video frame, the capturing being triggered by calling a function call communicated by a graphical user interface to the application;
   enabling manual modification of an aspect of the push buffer settings, the modifying bypassing the application;
   re-rendering the video frame with the modified aspect;
   comparing the rendering with the re-rendering; and
   presenting comparison results;
   wherein the function call is embedded in the application to copy the push buffer settings for the video frame, the push buffer settings being for the video frame that is one frame of the plurality of frames;
   wherein the graphical user interface provides access to make changes to the push buffer data without performing changes to the application, such that modifications to the push buffer and re-execution of the push buffer with the modifications simulate performance of the application if modifications to the application had been made, without making the modifications to the application;
   wherein the modifying includes selecting a "what if" modifier that includes predefined modifications that are to be applied to the push buffer.

8. The method of claim 7, wherein the modified aspect is selected from a group consisting of Redundant commands, Render state optimizations, Resource locations, Vertex array structure, Unused vertex array data, Constant vertex array data, Unused vertex program output data, Mesh optimization, Triangle trimming, Depth sorting, Depth-only pass, fragment program register count optimization, alternate texture compressed formats, texture memory grouping, vertex program grouping, render target tiling and depth cull areas, and vertex program optimization.

9. The method of claim 7, wherein the method is performed on successive frames.

10. The method of claim 7, wherein the method is performed on every $n^{th}$ frame where n is an integer greater than or equal to two.

11. The method of claim 7, further comprising
    modifying multiple aspects of the push buffer;
    classifying an impact of each individual modified aspect; and
    classifying a global impact of modification of the multiple aspects.

12. The method of claim 11, wherein the modifying multiple aspects is performed without changing code of the application.

13. The method of claim 8, wherein the re-rendering includes committing the modified aspect into the push buffer.

14. The method of claim 8, wherein the comparing includes calculating render times for the rendering and the re-rendering.

15. A system for conducting performance analysis on a frame of a multi-frame video sequence generated during execution of an application, the system including a processor, comprising:
  (i) a hardware engine being in communication with capture triggering hardware logic, the hardware engine being configured to at least partially execute the application;
  (ii) a library capture module being configured to obtain push buffer data from the hardware engine in response to processing a function call by the capture triggering hardware logic, the push buffer data being for the frame which is one frame of the multi-frame video sequence;
  (iii) a graphical user interface for presenting an interactive display of contents of the push buffer data, the contents defining a plurality of commands and data associated with each of the plurality of commands, the graphical user interface enabling access to make manual changes to the contents of the push buffer; and
  (iv) a replay module enabling re-execution of the push buffer data for the frame with any changes made through the graphical user interface;
  wherein the graphical user interface provides a plurality of performance analysis measurements that quantify differences in execution of the push buffer when changes to the push buffer are made, and the graphical user interface provides the access to make changes to the push buffer data without performing changes to the application, such that changes to the push buffer and re-execution of the push buffer with changes simulate performance of the application if modifications to the application had been made, without making the modifications to the application.

16. The system for conducting performance analysis as recited in claim 15, wherein the capture triggering hardware logic is integrated with the hardware engine or interfaced as separate logic with the hardware engine.

17. The system for conducting performance analysis as recited in claim 16, wherein the capture triggering hardware logic is configured to capture contents of the push buffer for one or more of selected frames of the multi-frame video sequence.

* * * * *